(12) United States Patent
Liu et al.

(10) Patent No.: US 12,261,814 B2
(45) Date of Patent: Mar. 25, 2025

(54) MESSAGE DISPLAY METHOD AND APPARATUS, TERMINAL, AND COMPUTER-READABLE STORAGE MEDIUM

(71) Applicant: Tencent Technology (Shenzhen) Company Limited, Guangdong (CN)

(72) Inventors: Liqiang Liu, Guangdong (CN); Xuejun Sun, Guangdong (CN); Xuan Luo, Guangdong (CN)

(73) Assignee: Tencent Technology (Shenzhen) Company Limited, Shenzhen (CN)

( * ) Notice: Subject to any disclaimer, the term of this patent is extended or adjusted under 35 U.S.C. 154(b) by 0 days.

(21) Appl. No.: 17/709,055

(22) Filed: Mar. 30, 2022

(65) Prior Publication Data
US 2022/0224663 A1 Jul. 14, 2022

Related U.S. Application Data

(63) Continuation of application No. PCT/CN2021/088042, filed on Apr. 19, 2021.

(30) Foreign Application Priority Data
May 14, 2020 (CN) .......................... 202010410263.5

(51) Int. Cl.
*G06F 3/048* (2013.01)
*G06F 3/0482* (2013.01)
(Continued)

(52) U.S. Cl.
CPC ............ *H04L 51/42* (2022.05); *G06F 3/0482* (2013.01); *H04L 51/21* (2022.05); *H04L 51/23* (2022.05); *H04L 51/234* (2022.05); *H04L 51/52* (2022.05)

(58) Field of Classification Search
None
See application file for complete search history.

(56) References Cited

U.S. PATENT DOCUMENTS 11,201,844 B2 * 12/2021 Kwatra ................. H04L 51/216
2012/0331399 A1 * 12/2012 Eidelson ................ G06Q 10/10
715/810
(Continued)

FOREIGN PATENT DOCUMENTS

CN 103744592 A 4/2014
CN 105530372 A 4/2016
(Continued)

OTHER PUBLICATIONS

International Search Report and Written Opinion mailed Feb. 8, 2021 for International Application No. PCT/CN2021/008042.
(Continued)

*Primary Examiner* — Thanh T Vu
(74) *Attorney, Agent, or Firm* — Crowell & Moring LLP

(57) ABSTRACT

This application provides a message display method and apparatus, a terminal, and a computer-readable storage medium. The method includes: displaying a session interface of a target session, and obtaining a message set of the target session; in response to that a plurality of continuous and repeated session messages are included in the message set, obtaining a target session message according to the plurality of continuous and repeated session messages; and replacing the plurality of continuous and repeated session messages in the message set with the target session message, and displaying a replaced message set in the session interface of the target session.

19 Claims, 34 Drawing Sheets

(51) Int. Cl.
*H04L 51/21* (2022.01)
*H04L 51/23* (2022.01)
*H04L 51/234* (2022.01)
*H04L 51/42* (2022.01)
*H04L 51/52* (2022.01)

(56) References Cited

U.S. PATENT DOCUMENTS

| | | | |
|---|---|---|---|
| 2018/0239495 A1* | 8/2018 | Sharifi | G06F 40/295 |
| 2018/0321806 A1 | 11/2018 | Rodriguez Virgen et al. | |
| 2019/0102061 A1* | 4/2019 | Fu | H04L 51/216 |
| 2019/0121907 A1* | 4/2019 | Brunn | G06F 16/353 |
| 2020/0314048 A1* | 10/2020 | Lee | H04L 51/216 |
| 2020/0374251 A1* | 11/2020 | Warshaw | H04L 51/56 |
| 2022/0392775 A1* | 12/2022 | Cue | G06F 3/0488 |

FOREIGN PATENT DOCUMENTS

| | | |
|---|---|---|
| CN | 108881624 A | 11/2018 |
| CN | 109587031 A | 4/2019 |
| CN | 105760104 A | 7/2019 |
| CN | 110048862 A | 7/2019 |
| CN | 110505141 A | 11/2019 |
| CN | 111614547 A | 9/2020 |
| CN | 111865758 A | 10/2020 |
| EP | 2699029 A1 | 2/2014 |
| JP | 2014-35770 | 2/2014 |

OTHER PUBLICATIONS

Office Action issued on Chinese application 202010410263.5 on Feb. 11, 2023, 10 pages.
Office Action issued on Japanese application JP2022-546110 on Sep. 13, 2023, 5 pages.

* cited by examiner

Left figure

Right figure

Left figure

Right figure

Left figure | Right figure

MESSAGE DISPLAY METHOD AND APPARATUS, TERMINAL, AND COMPUTER-READABLE STORAGE MEDIUM

RELATED APPLICATION

This application is a continuation application of International PCT Application No. PCT/CN2021/088042, filed with the National Intellectual Property Administration, PRC on Apr. 19, 2021, which is based on and claims priority to the Chinese Patent Application No. 202010410263.5, filed with the National Intellectual Property Administration, PRC on May 14, 2020. Both of these two prior patent applications are incorporated herein by reference in their entireties.

FIELD OF THE TECHNOLOGY

This application relates to the field of Internet technologies, to the field of computer technologies, and in particular, to a message display method, a message display apparatus, a terminal, and a computer-readable storage medium.

BACKGROUND OF THE DISCLOSURE

With the development of Internet technologies, social network clients are gradually widely used by users. The social network client is software (an application, APP) that implements information interaction between users through a network. The social network client may establish a target session between users, so that the users in the target session may perform information interaction through a session interface of the target session.

In the related technology, after obtaining a message set of a target session, the social network client generally sequentially displays messages in the message set directly in a session interface of the target session. This message display manner is relatively simple, and the utilization rate of graphics processing resources of a terminal in which the social network client is located is relatively low. In addition, the single message display manner causes a small quantity of times of human-computer interactions and relatively low user interest or viscosity of the social network client.

SUMMARY

Embodiments of this application provide a message display method and apparatus, a terminal, and a computer-readable storage medium, to improve the utilization rate of graphics processing resources of a terminal and a quantity of times of human-computer interactions, thereby effectively improving the user viscosity of a social network client run in the terminal.

The embodiments of this application provide a message display method, including:
  displaying a session interface of a target session, and obtaining a message set of the target session;
  in a case that a plurality of continuous and repeated session messages exist in the message set, obtaining a target session message according to the plurality of session messages; and
  replacing the plurality of continuous and repeated session messages in the message set with the target session message, and displaying a replaced message set in the session interface of the target session.
The embodiments of this application provide a message display apparatus, including:
  a display unit, configured to display a session interface of a target session; and
  an obtaining unit, configured to obtain a message set of the target session,
  the display unit being further configured to, in a case that a plurality of continuous and repeated session messages exist in the message set, obtain a target session message according to the plurality of session messages; and
  the display unit being further configured to replace the plurality of continuous and repeated session messages in the message set with the target session message, and display a replaced message set in the session interface of the target session.
The embodiments of this application provide a terminal, including:
  a processor and a memory, the memory storing at least one program code, the at least one program code being loaded and executed by the processor to implement the message display method provided in the embodiments of this application.
The embodiments of this application provide a computer-readable storage medium, storing at least one program code, the at least one program code being loaded and executed by a processor to implement the message display method provided in the embodiments of this application.

In this embodiment of this application, in a case that a plurality of continuous and repeated session messages exist in the message set of the target session, a target session message may be obtained according to the plurality of session messages; and the plurality of continuous and repeated session messages in the message set are replaced with the target session message, and a replaced message set is then displayed in the session interface of the target session. It can be learned that in the foregoing message display process, the social network client may replace the plurality of continuous and repeated session messages with the target session message in the session interface for display. In this way, the uninteresting screen swiping effect caused by directly displaying the plurality of session messages can be effectively reduced, the message display manner of the social network client can be enriched, and the utilization rate of graphics processing resources of the terminal and a quantity of times of human-computer interactions can be improved, and thereby effectively improving the user viscosity of the social network client.

DESCRIPTION OF EMBODIMENTS

The following disclosure describes technical solutions in embodiments of this application with reference to the accompanying drawings in the embodiments of this application.

Figure 1:
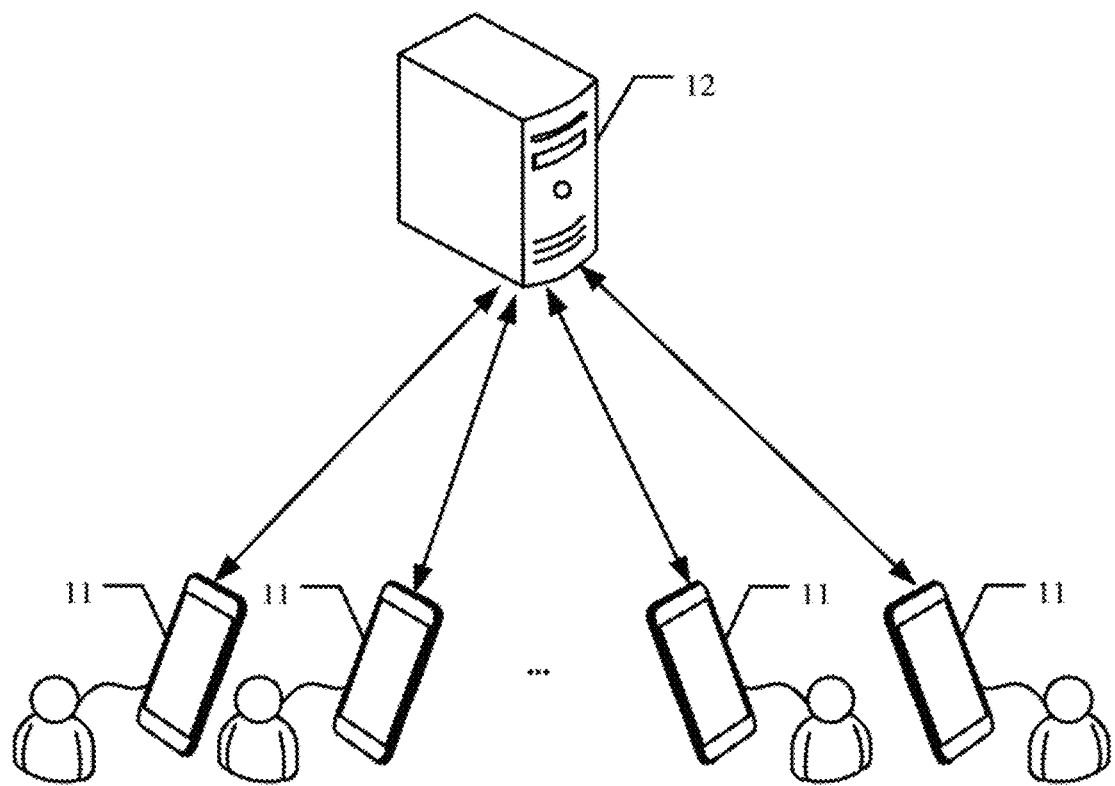
FIG. 1 is a system architecture diagram of a communication session system according to an embodiment of this application.

The embodiments of this application provide a message display solution and a corresponding communication session system, to enrich a message display manner of a social network client, improve the utilization rate of graphics processing resources of a terminal and a quantity of times of human-computer interactions, and improve the user viscosity of the social network client. Referring to FIG. 1, the communication session system provided in this embodiment of this application may include: at least two social network clients 11 and a server 12. The social network client 11 is software that implements information interaction between users through a network. The social network client 11 may include at least one of the following: an instant messaging client such as WeChat, WeCom, or Tencent QQ, an information communication client such as a microblog or a blog, or the like. Instant Messaging (IM) refers to a terminal service that allows two or more people to use a network to instantly transmit information such as texts, files, and perform audio and video communication. The social network client 11 may be run in any terminal, and the terminal herein may include, but not limited to, portable devices such as a smartphone, a laptop computer, and a tablet computer, or terminal devices such as a desktop computer. The server 12 is a device that may establish a communication session between the at least two social network clients 11 and provide a plurality of services such as data storage and message push for each social network client 11; and the server may include, but not limited to, a data server, a web server, an application server, or a cloud server. When the server 12 is physically deployed, the server may be deployed as an independent service device, or the server 12 may be deployed as a cluster device together formed by a plurality of service devices. This is not limited in this embodiment of this application.

During implementation, the message display solution provided in this embodiment of this application may be performed by any social network client 11 in the foregoing communication session system, or may be performed by a terminal device running any social network client 11. For ease of description, this embodiment of this application is described by using an example in which any social network client 11 performs the message display solution. In an actual application, the message display solution is applicable to a session scenario with a large quantity of continuous and repeated messages, such as a session scenario in which each user in a target session continuously sends a "received" because of replying to an announcement message, a session scenario in which each user in a target session continuously sends "happy birthday" because of expressing a birthday wish to a user, or a session scenario in which each user in a target session continuously sends a promotion message (such as "hamburger, you deserve it") because of promoting an enterprise. A general principle of the message display solution is as follows:

The server 12 may push various messages of a target session to the social network client 11, so that the social network client 11 may display various messages of the target session in a session interface for the user to view. When continuous and repeated session messages appear in the target session, and a quantity of the continuous and repeated session messages is greater than a preset quantity, the social network client 11 may obtain a target session message according to a plurality of continuous and repeated session messages. In an implementation, the target session message may include a reference session message and a first folding prompt, where the reference session message is selected from a plurality of session messages; the first folding prompt is obtained by folding remaining session messages other than the reference session message in the plurality of session messages, and the first folding prompt may include a folding identifier or a folding message; and the folding identifier herein is used for reflect a remaining quantity of the remaining session messages, and the folding message may be used for reflecting the remaining quantity and message content of the remaining session messages, and message transmission users of the remaining session messages. In another implementation, the target session message may include an image message, and the image message is a message generated according to the plurality of session messages and an image matching message content of the plurality of session messages. In another implementation, the target session message may include: key content extracted from message content of the plurality of session messages, and a quantity identifier generated according to a quantity of the plurality of session messages. Then, the plurality of continuous and repeated session messages are replaced with the target session message in the session interface for display. It can be learned that in the message display solution provided in this embodiment of this application, the plurality of continuous and repeated session messages may be replaced with the target session message for display, to reduce the uninteresting screen swiping effect caused by continuously displaying the plurality of repeated session messages. In this way, a good interactive communication atmosphere can be provided for the user, and a phenomenon that the user misses important session messages is reduced, thereby effectively improving the user viscosity of the social network client 11.

Figure 2:
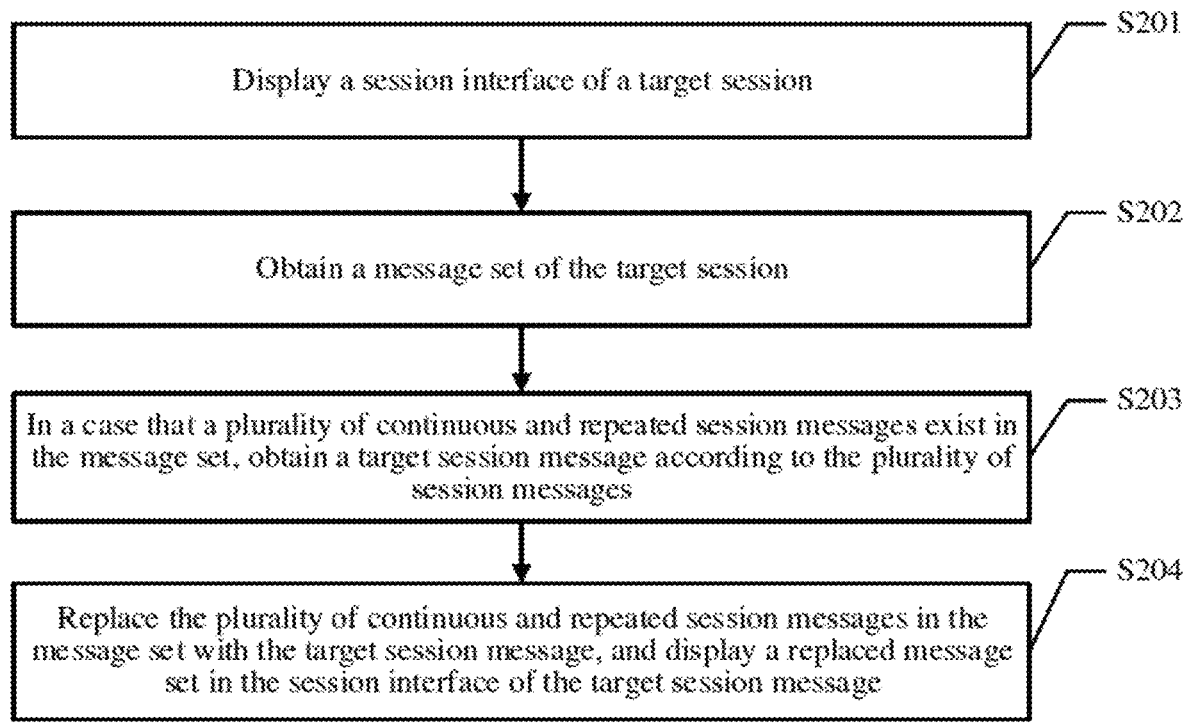
FIG. 2 is an example schematic flowchart of a message display method according to an embodiment of this application.

Based on the related description of the foregoing message display solution, the embodiments of this application provide a message display method. The message display method may be performed by any social network client in the communication session system mentioned above, or may be performed by the terminal running the social network client, or may be cooperatively implemented by the terminal and the server. For ease of description, this embodiment of this application is described by using an example in which the terminal implements the message display method, and the target session message includes the reference session message and the first folding prompt. Referring to FIG. 2, the message display method may include the following step S201 to step S204:

S201. A terminal displays a session interface of a target session.

The terminal herein is provided with a social network client, and the social network client may be an instant messaging client for message communication, a media information client for reading, viewing, or publishing of media information, or the like.

In this embodiment of this application, the target session may be established by the social network client. For example, any single chat session may be established by the social network client, or any group session may be established by the social network client. This is not limited herein. The single chat session is a session formed by two users, and the group session is a session formed by three or more users. During implementation, the social network client may detect whether there is a display trigger operation for a session interface of a target session; and may display the session interface of the target session if yes.

S202. Obtain a message set of the target session.

In some embodiments, the message set of the target session may include at least one of messages: a session message and a non-session message. The session message is a message sent by each user in the target session through the session interface, for example, may include at least one of the following: a message sent by a master state user in the target session, and a message sent by a guest state user. The master state user is a user corresponding to a social account that logs in to the social network client, that is, a login user; and the guest state user is a user other than the master state user in the target session, that is, a non-login user. Correspondingly, the non-session message is a message other than the session message in the message set, and may include, but not limited to, an announcement notification message and a system prompt message. The announcement notification message is a message published in a target session by the user in the target session through an announcement function provided by the social network client, for example, a group announcement message. The system prompt message is a message pushed by a server that detects that there is an information change in the target session. For example, when a new user joins the target session such that user information of the new user is added to the target session, the server pushes prompt information about the new user joining the target session. In another example, when a user (such as a user A) exits the target session such that user information of the user A is reduced in the target session, the server pushes prompt information about the user A exiting the target session. In another example, when a session name (for example, a group name) of the target session is modified, the server pushes prompt information about the session name being modified.

During actual implementation, each message in the message set may be pushed in real time by the server to the social network client. That is, the messages in the message set may be updated in real time. In addition, each message in the message set has a message reception time, and the message reception time is a system time at which the social network client receives the message pushed by the server. The messages in the message set may be arranged in chronological order of message reception times. After the message set of the target session is obtained, whether a plurality of continuous and repeated session messages exist in the message set may be detected. If the plurality of continuous and repeated session messages exist in the message set, step S203 may be performed. If the plurality of continuous and repeated session messages do not exist in the message set, each message in the message set is sequentially displayed in the session interface. In this case, the social network client may further receive a message pushed by the server to update the message set, continue to detect in real time whether a plurality of continuous and repeated messages exist in the updated message set, and perform step S203 after detecting the plurality of continuous and repeated session messages.

In some embodiments, the terminal may detect, in the following manners, whether a plurality of continuous and repeated session messages exist in the message set.

The terminal directly performs traversal detection on whether the plurality of continuous and repeated session messages exist in the message set. During actual implementation, all messages other than a first message may be sequentially traversed in the message set. If a currently traversed message is a session message, and message content of the currently traversed message is the same as message content of a previous message, a repeat count of a target session may be increased by one to update the repeat count. The repeat count herein is used for determining a quantity of the continuous and repeated session messages. If the currently traversed message is a session message and the message content of the currently traversed message is different from the message content of the previous message, or the currently traversed message is a non-session message, the repeat count is updated to an invalid value (for example, a value of 0). When each message in the message set is traversed, the traversal is ended and the updated repeat count is increased by one to obtain a quantity of the continuous and repeated session messages in the message set. If the quantity of the continuous and repeated session messages is greater than or equal to a preset quantity, it may be determined that the plurality of continuous and repeated session messages exist in the message set; and if the quantity of the continuous and repeated session messages is less than the preset quantity, it may be determined that the plurality of continuous and repeated session messages do not exist in the message set. The preset quantity may be set according to an experience value or a service requirement. For example, the preset quantity may be set to 5. The previous message mentioned in this implementation is a message whose arrangement position in the message set is located before an arrangement position of the currently traversed message and is adjacent to the arrangement position of the currently traversed message.

For example, assuming that the preset quantity is 5, and the message set sequentially includes the following messages: "received", "received", "xxuser joins the target session", "received", "received", and "received", a second message may be first traversed. Because the second message is a session message and message content of the second message is the same as the message content of the previous message (that is, the first message), the repeat count may be increased by one, so that the repeat count is updated from 0 to 1. Then, a third message may be traversed. Because the third message is a system prompt message, the repeat count may be updated from 1 to 0. Then, a fourth message is traversed. Because the fourth message is a session message and message content of the fourth message is different from message content of the previous message (that is, the third message), the repeat count may be updated to 0. Then, a fifth message is traversed. Because the fifth message is a session message and message content of the fifth message is the same as the message content of the previous message (that is, the fourth message), the repeat count may be increased by one, so that the repeat count is updated from 0 to 1, and the rest may be deduced by analogy. When all 6 messages in the message set are traversed, the traversal may end, and the updated repeat count that may be obtained in this case is 2. Then, the updated repeat count (2) may be increased by one, and an obtained quantity of continuous and repeated session messages in the message set is 3. Because the quantity of the continuous and repeated session messages (3) is less than a preset quantity (5), it may be determined that the plurality of continuous and repeated session messages do not exist in the message set.

In some embodiments, the terminal may detect, in the following manners, whether a plurality of continuous and repeated session messages exist in the message set.

The terminal detects, in a counting isolation manner, whether the plurality of continuous and repeated session messages exist in the message set. The counting isolation manner is a manner of isolating non-session messages in the message set, and performing traversal detection on only the session messages in the message set. For example, the message set may be first screened to obtain session messages, and a quantity of continuous and repeated session messages in the obtained session messages is calculated. For example, each session message other than the first session message in the obtained session messages may be sequentially traversed. If message content of a currently traversed session message is the same as message content of a previous session message, the repeat count may be increased by one to update the repeat count. If the message content of the currently traversed session message is different from the message content of the previous session message, the repeat count may be updated to an invalid value (for example, a value of 0). If all the obtained session messages are traversed, the traversal may end, and the updated repeat count may be increased by one to calculate a quantity of continuous and repeated session messages in the obtained session messages. In a case that the calculated quantity is greater than or equal to a preset quantity, it may be determined that a plurality of continuous and repeated session messages exist in the message set; and in a case that the calculated quantity is less than the preset quantity, it may be determined that the plurality of continuous and repeated session messages do not exist in the message set. The previous session message mentioned in this implementation is a session message whose arrangement position is located before an arrangement position of a currently traversed session message in the obtained session messages and is adjacent to the arrangement position of the currently traversed session message.

For example, still assuming that the preset quantity is 5, and the message set sequentially includes the following messages: "received", "received", "xxuser joins the target session", "received", "received", and "received", 5 session messages may be first obtained through screening from the message set: "received", "received", "received", "received", and "received". Then, a quantity of continuous and repeated session messages in the 5 obtained session messages is calculated. During actual implementation, a second session message of the 5 session messages may be first traversed. Because message content of the second session message is the same as message content of a previous session message (that is, a first session message), the repeat count may be increased by one, so that the repeat count is updated from 0 to 1. Then, a third session message in the 5 session messages is traversed. Because message content of the third session message is the same as the message content of the previous session message (that is, the second session message), the repeat count may be continuously increased by one, so that the repeat count is updated from 1 to 2. Then, a fourth session message in the 5 session messages is traversed. Because message content of the fourth session message is the same as the message content of the previous session message (that is, the third session message), the repeat count may be continuously increased by one, so that the repeat count is updated from 2 to 3, and the rest may be deduced by analogy. When all 5 session messages are traversed, the traversal ends, and the updated repeat count that may be obtained in this case is 4. Then, the updated repeat count may be increased by one to calculate a quantity of continuous and repeated session messages in the 5 obtained session messages being 5. Because the calculated quantity (5) is equal to a quantity threshold (5), it may be determined that a plurality of continuous and repeated session messages exist in the message set.

Based on the foregoing embodiments of this application, when detecting whether the plurality of continuous and repeated session messages exist in the message set, the terminal performs traversal detection only on the session messages in the message set, to implement counting isolation of the non-session messages in the message set. This avoids that the repeat count is reset due to the impact of the non-session messages, resulting in a problem that the repeat count needs to be performed again. It can truly make the continuous and repeated session messages count continuously, thereby improving the accuracy of a detection result. The foregoing examples of detecting whether a plurality of continuous and repeated session messages exist in the message set are all described by using an example in which the message content includes only texts. However, in an actual application, the message content is not limited to the texts, and may include at least one of the following content: texts, symbols, emojis, and the like. When the message content includes at least two types of content among texts, symbols, and emojis, each piece of content included in the message content participates in recognition. That is, in this embodiment of this application, texts (for example, Chinese characters), symbols (for example, spaces), and emojis included in the message content may all be recognized. If there is a content inconsistency, it may be considered that the message content is different. It can be learned that in this embodiment of this application, the granularity of recognizing the continuous and repeated session messages is relatively small. In this way, the accuracy of a detection result can be effectively improved. An order of performing step S201 and step S202 is not limited in this embodiment of this application.

S203. In a case that a plurality of continuous and repeated session messages exist in the message set, obtain a target session message according to the plurality of session messages.

In a case that the plurality of continuous and repeated session messages exist in the message set, message content of the plurality of continuous and repeated session messages is the same. To reduce the uninteresting screen swiping effect caused by directly displaying the plurality of continuous and repeated session messages in the session interface, in this embodiment of this application, the reference session message and the first folding prompt may be obtained as the target session message according to the plurality of session messages, to implement folding display of a part of continuous and repeated session messages.

During actual implementation, the obtaining a target session message according to the plurality of session messages may include the following step s11 to step s13:

s11. Select a reference session message from the plurality of session messages.

In an implementation, one session message or a preset quantity of session messages may be randomly selected from the plurality of session messages as a reference session message. That is, in this implementation, the reference session message is one or a preset quantity of session messages randomly selected from the plurality of session messages. In another implementation, each session message in the message set has a message reception time, and the social network client generally sequentially displays the session messages in chronological order of message reception times. Therefore, not to interrupt a display order of the session messages in the session interface, the social network client may further select a session message with an earliest message reception time as the reference session message from the plurality of session messages. That is, in this implementation, the reference session message is the session message with the earliest message reception time in the plurality of session messages. In another implementation, a preset quantity of session messages may alternatively be sequentially selected as the reference session messages from the plurality of session messages in chronological order of message reception times. That is, in this implementation, the reference session message includes the preset quantity of session messages sequentially selected from the plurality of session messages in chronological order of reception times. For ease of description, description is subsequently made by using an example in which the reference session message includes the preset quantity of session messages sequentially selected from the plurality of session messages in chronological order of reception times.

In some embodiments, if there is a session message sent by the master state user in the plurality of session messages, the session message sent by the master state user may be further used as the reference session message. To avoid the social network client subsequently folds the session message sent by the master state user, the session message sent by the master state user may be directly displayed in the session interface. In this way, a user experience that the session message sent by the master state user is stably reserved when the master state user participates in message screen swiping can be created, to help the master state user view the session message sent by the master state user, and improve a quantity of times of human-computer interactions and the user viscosity of the social network client.

s12. Fold remaining session messages other than the reference session message in the plurality of session messages, to obtain a first folding prompt.

It can be learned from the above that the first folding prompt may include a folding message and a folding identifier. Correspondingly, in a case that the first folding prompt includes the folding message, an implementation of step s12 may be: first generating prompt content according to the remaining quantity of the remaining session messages other than the reference session message in the plurality of session messages, and message content of the remaining session messages. The prompt content may be used for prompting that there are a remaining quantity of users who continuously transmit the message content, or may be used for prompting that there are a remaining quantity of continuous messages that include the message content. For example, assuming that a remaining quantity of remaining session messages is 8 and message content of the remaining session messages is "received", prompt content may be "8 friends continuously reply "received""; or prompt content may be ""received" are continuously replied in following 8 messages". When there are more content (such as texts, symbols, and emojis) included in the message content, the social network client may alternatively generate prompt content only according to the remaining quantity of the remaining session messages other than the reference session message in the plurality of session messages when performing step s12. In this case, the prompt content may be used for prompting that there are a remaining quantity of users who continuously send messages the same as the reference session message, or may be used for prompting that there are a remaining quantity of continuous messages the same as the reference session message. Alternatively, when performing step s12, the social network client may alternatively generate prompt content according to the remaining quantity of remaining session messages other than the reference session message in the plurality of session messages, partial message content of the remaining session messages, and a content ellipsis. The content ellipsis is used for prompting the message content of the remaining session messages is not fully displayed. For example, assuming that a remaining quantity of remaining session messages is 8 and message content of the remaining session messages is "received, be on time tomorrow otherwise there is a punishment! hahahahaha, agree!", the prompt content may be "8 friends continuously reply to the foregoing message"; or the prompt content may be ""received, be on time tomorrow . . . " is continuously replied in following 8 messages". " . . . " is the content ellipsis.

Figure 3A:
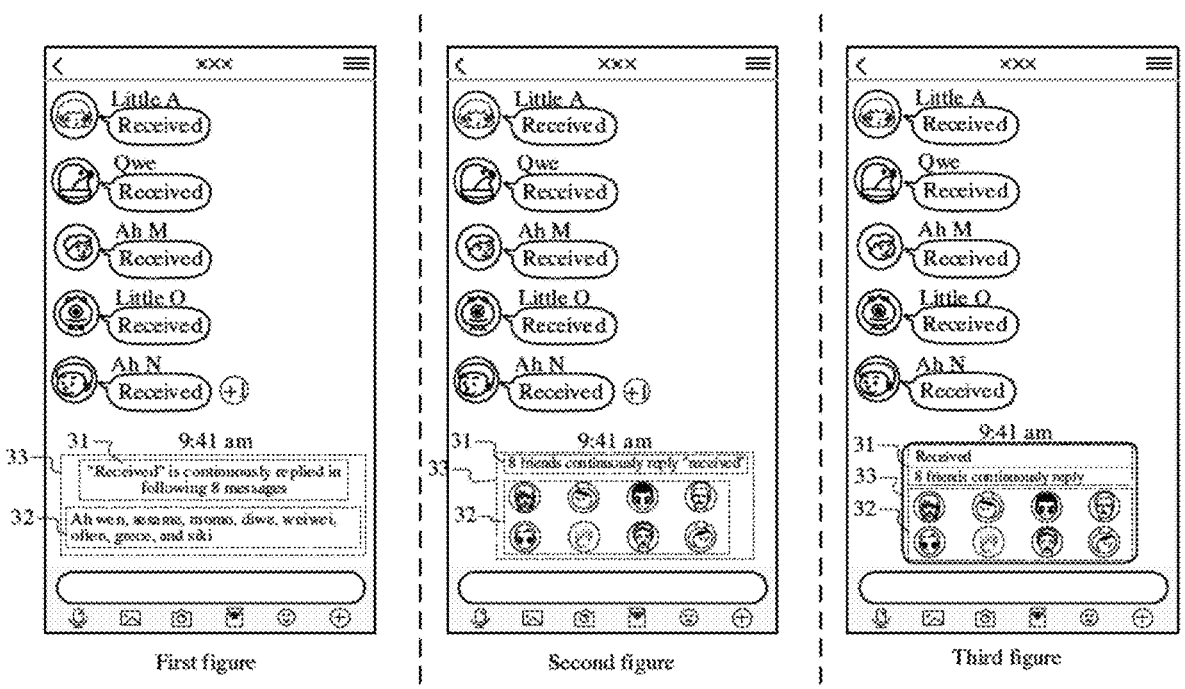
FIG. 3A is an example schematic diagram of a folding message according to an embodiment of the present application.
Figure 3B:
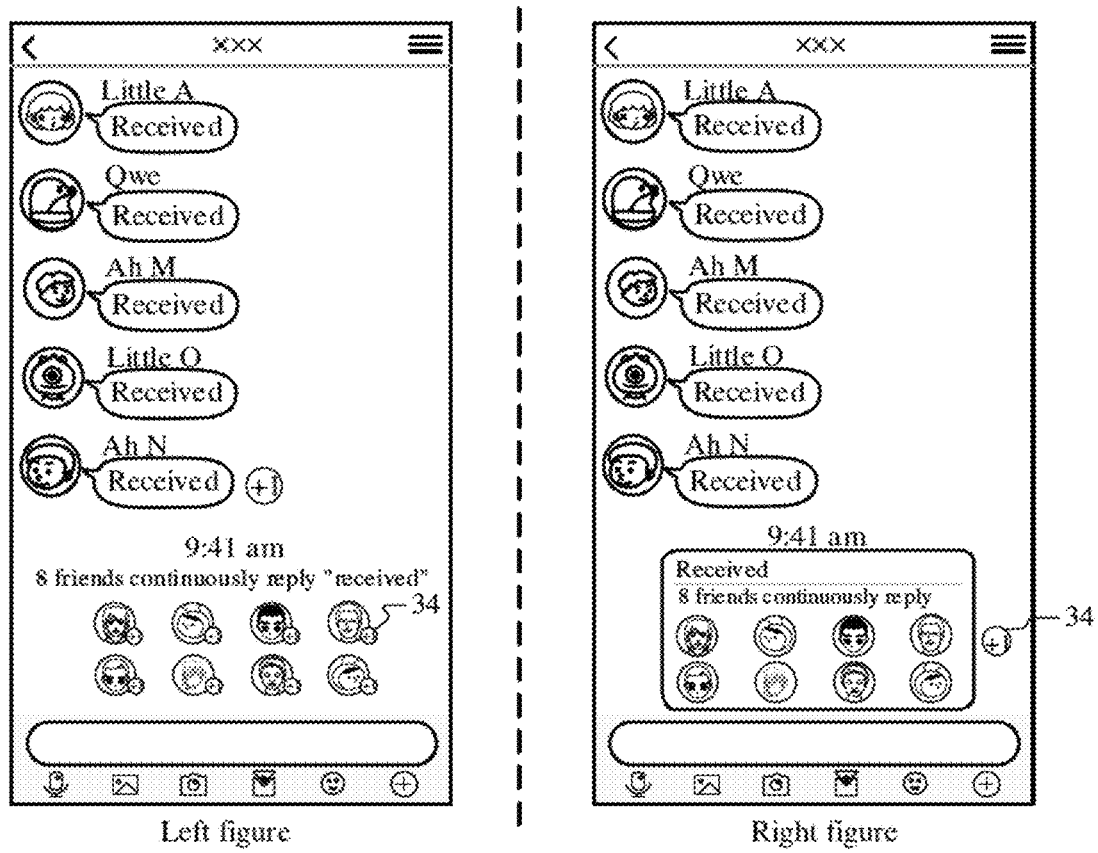
FIG. 3B is an example schematic diagram of another folding message according to an embodiment of this application.

In addition to generating the prompt content, the social network client may further obtain user identifiers of message transmission users corresponding to the remaining session messages. The user identifier includes at least one of the following: a user name and a user mark image. The user name herein may include, but not limited to, a network nickname (a name used by a user in a social network, for example, a user name in the instant messaging client), and a session name (a remark name used by a user in a target session). The user mark image may be a user avatar of the message transmission user. Then, the social network client may generate a folding message according to the obtained user identifiers and the prompt content, which may at least include the following several implementations:

In an implementation, a folding message may be directly generated according to the obtained user identifiers and the prompt content. During actual implementation, if the prompt content 31 is used for prompting that there are a remaining quantity of continuous messages including the message content, and the user identifier 32 includes a user name, for a schematic diagram of a generated folding message 33, refer to a first figure in FIG. 3A. If the prompt content 31 is used for prompting there are a remaining quantity of users who continuously send the message content, and the user identifier 32 includes a user mark image, for a schematic diagram of a generated folding message 33, refer to a second or third figure in FIG. 3A. The three figures in FIG. 3A are exemplarily used for representing a display form of the folding message 33 in this embodiment of this application, but this is not exhaustive. In some example implementations, for the folding message shown in the second figure or the third figure in FIG. 3A, the social network client may further display one or more message sending buttons 34 in a display region of the folding message, as shown in the second figure shown in FIG. 3B. If the social network client detects a trigger operation (such as a click operation or a press operation) performed by the master state user on any message sending button 34, message content of a plurality of session messages may be copied to generate a new session message, and the new session message is sent to a target session.

In another implementation, if a quantity of obtained user identifiers is greater than a quantity threshold, to avoid that the folding message occupies a relatively large display area in the session interface, in this embodiment of this application, some user identifiers and prompt content may be selectively used to generate a folding message, to reduce the display area of the folding message. During actual implementation, one or more user identifiers may be first selected from the obtained user identifiers as to-be-displayed user identifiers; and a folding message is then generated according to the to-be-displayed user identifiers, the prompt content, and an identifier ellipsis. The identifier ellipsis is used for prompting that the obtained user identifiers are not fully displayed, and the identifier ellipsis may be used for triggering display of remaining user identifiers that are not displayed in the obtained user identifiers. A display form of the identifier ellipsis may be set according to a service requirement. For example, " . . . " or "V" may be used in the folding message for representing an identifier ellipsis 35. Correspondingly, for a schematic diagram of the folding message, refer to two figures in FIG. 3C.

In another implementation, considering that the master state user may have a requirement of viewing the remaining session messages, therefore, in this embodiment of this application, when the folding message is obtained according to the obtained user identifiers and the prompt content, a message link used for triggering the display of the remaining messages may be further inserted into the folding message, so that the master state user may subsequently view the remaining session messages through the message link. During actual implementation, a folding message may be generated by using the obtained user identifiers, the prompt content, and a message link 36. Correspondingly, for a schematic diagram of the folding message, refer to the left figure in FIG. 3D. If the quantity of the obtained user identifiers is greater than a quantity threshold, one or more user identifiers may be first selected from the obtained user identifiers as to-be-displayed user identifiers; and a folding message is then generated according to the to-be-displayed user identifiers, the prompt content, the identifier ellipsis, and the message link 36. The prompt content herein may include a remaining quantity of the remaining session messages, partial message content of the remaining session messages, and the content ellipsis; or includes a remaining quantity and complete message content. An example in which the prompt content includes a content ellipsis 37 is used. Correspondingly, for a schematic diagram of the folding message, refer to the right figure in FIG. 3D.

It can be learned from the above that in this embodiment of this application, when it is detected whether a plurality of continuous and repeated session messages exist in the message set, detection is performed by using a session message as a unit. If there are a plurality of repeated session messages continuously sent by the same user in a target session, the plurality of session messages sent by the user may be further folded for display. In this case, user identifiers included in the folding message may be continuously the same, as shown in FIG. 3E.

When a first folding prompt includes a folding identifier, an implementation of step s12 may include:
  determining a remaining quantity of the remaining session messages other than the reference session message in the plurality of session messages; and then generating a folding identifier according to the remaining quantity of the remaining session messages. A display form of the folding identifier is not limited in this embodiment of this application. For example, the folding identifier 38 may be a value corresponding to the remaining quantity, as shown in the left figure in FIG. 3F. In another example, the folding identifier 38 may be an identifier image formed by using a value corresponding to the remaining quantity and a preset image, as shown in the right figure in FIG. 3F.
  s13. Form the target session message by using the reference session message and the first folding prompt.
  S204. Replace the plurality of continuous and repeated session messages in the message set with the target session message, and display a replaced message set in the session interface of the target session message.

It can be learned from the above that there is no chronological order between step S201 and step S202 mentioned in this embodiment of this application, and the message set is updated in real time. It is detected that the plurality of continuous and repeated session messages exist in the message set, and a time point at which the target session message is obtained according to the plurality of session messages may be a time point before the session interface of the target session is displayed, or may be a time point after the session interface of the target session is displayed. In an application scenario, if the time point at which the target session message is obtained is the time point before the session interface of the target session is displayed, the social network client may replace the plurality of continuous and repeated session messages in the message set with the target session message before displaying the session interface. In this application scenarios, after displaying the session interface, the social network client may directly display the target session message in the session interface. In another application scenario, if the time point at which the target session message is obtained is the time point after the session interface of the target session is displayed, the social network client may sequentially display the messages in the message set of the target session in the session interface in real time after displaying the session interface of the target session.

In some embodiments, after obtaining the target session message through step S203, the social network client may directly perform step S204, that is, may directly update the plurality of session messages in the message set with the target session message (that is, a reference session message 41 and a first folding prompt 42), and display messages in the updated message set in the session interface. The first folding prompt 42 herein includes any of the folding messages shown in FIG. 3A to FIG. 3E, or the folding identifier shown in FIG. 3F. An example in which the first folding prompt 42 includes the folding message shown in the left figure shown in FIG. 3D is used. For a schematic diagram of displaying the target session message, refer to FIG. 4A. It can be learned that in a process of displaying the messages in the message set in the session interface, by using this processing logic, the social network client may create a first folding prompt and update an interface of stock messages (that is, displayed messages) and a new first folding prompt in the session interface only when detecting the plurality of continuous and repeated session messages.

In some other embodiments, after obtaining the target session message through step S203, the social network client may continue to sequentially display the messages in the message set in the session interface, and after detecting an operation that the master state user exits and reopens the session interface of the target session, then perform step S204, so that the target session message (that is, the reference session message 41 and the first folding prompt 42) is directly displayed in the redisplayed session interface. An example in which the first folding prompt 42 includes the folding message shown in the left figure shown in FIG. 3D is still used. For a schematic diagram of displaying the target session message, refer to FIG. 4B.

Figure 4A:
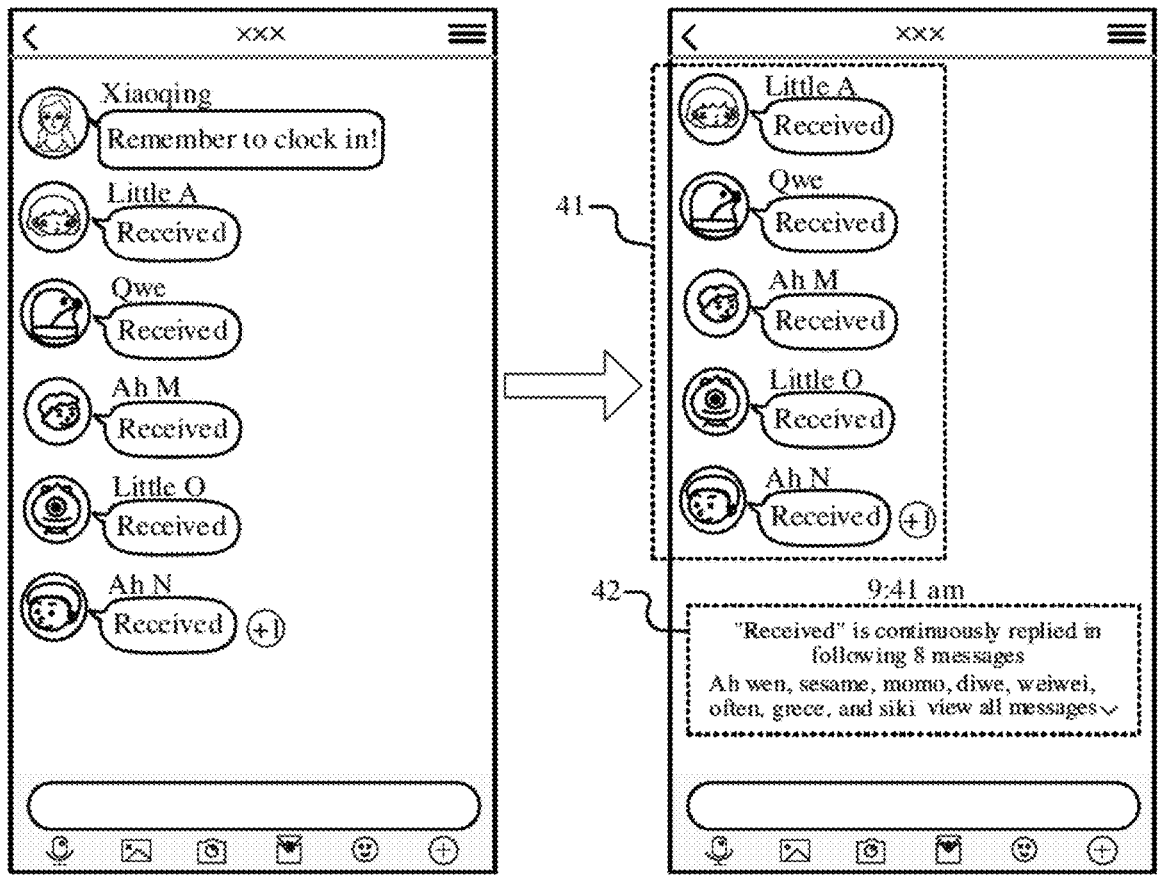
FIG. 4A is an example schematic display diagram of a target session message including a folding message and a reference session message according to an embodiment of this application.
Figure 4B:
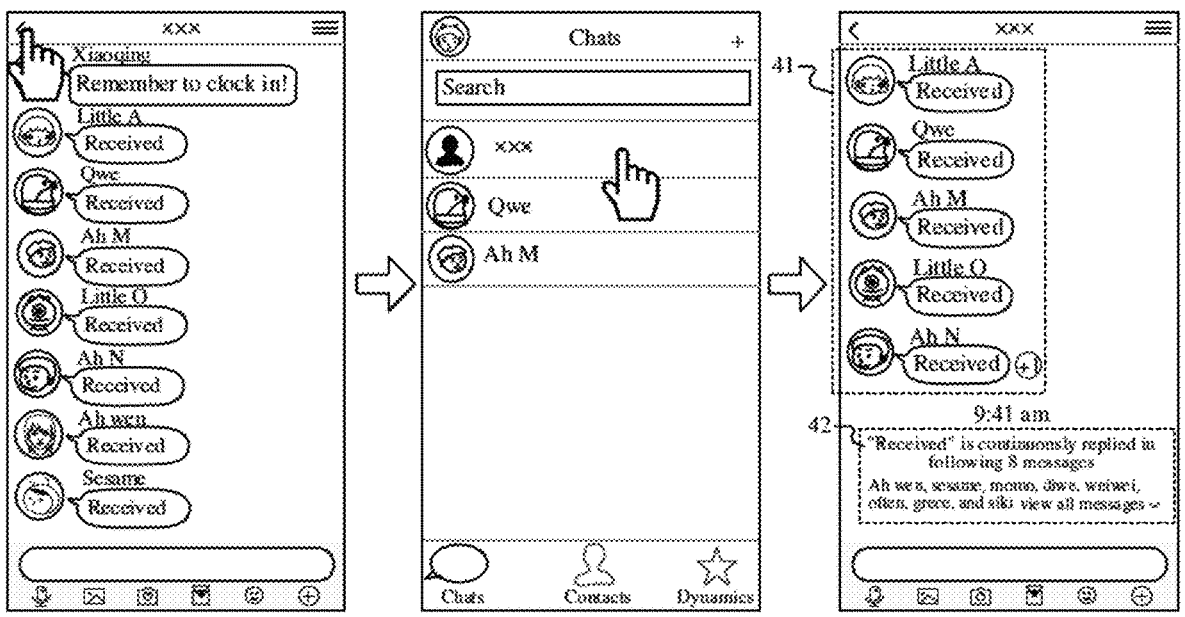
FIG. 4B is an example schematic display diagram of another target session message including a folding message and a reference session message according to an embodiment of this application.
Figure 4C:
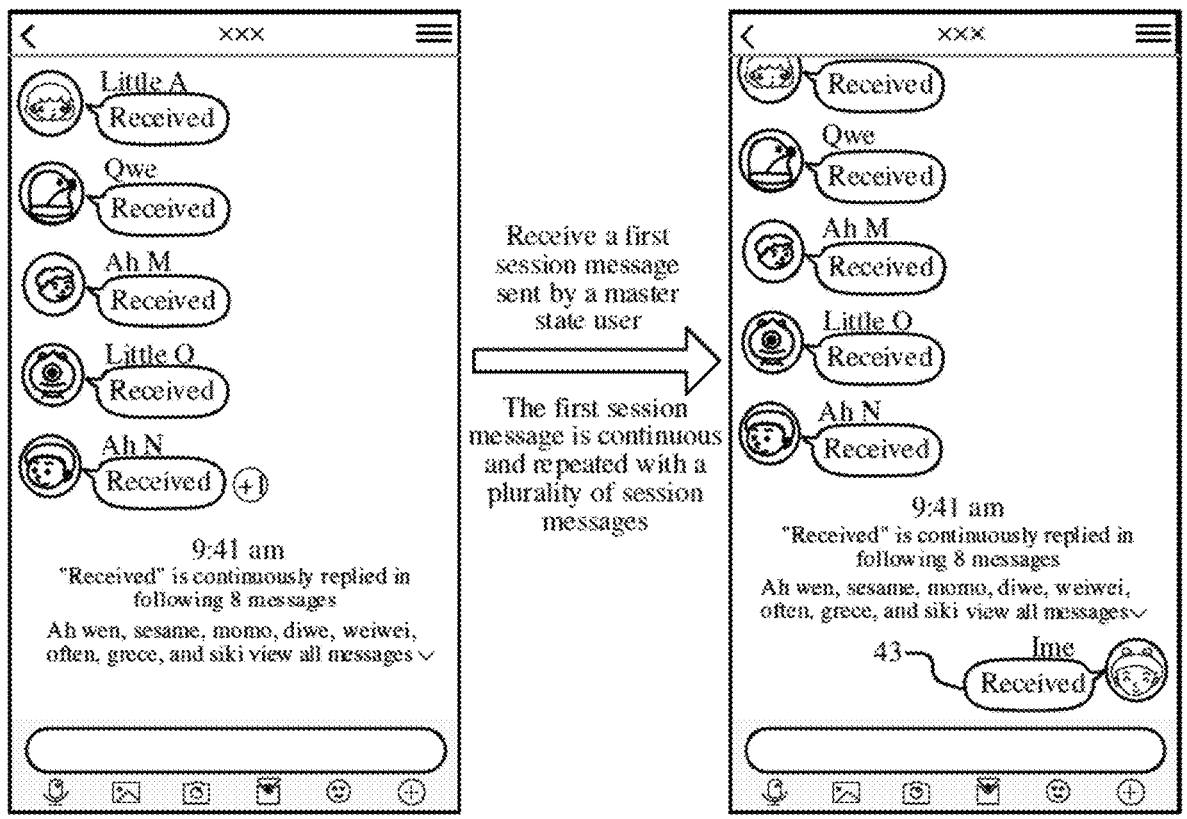
FIG. 4C is an example schematic diagram of displaying a new first session message according to an embodiment of this application.
Figure 4D:
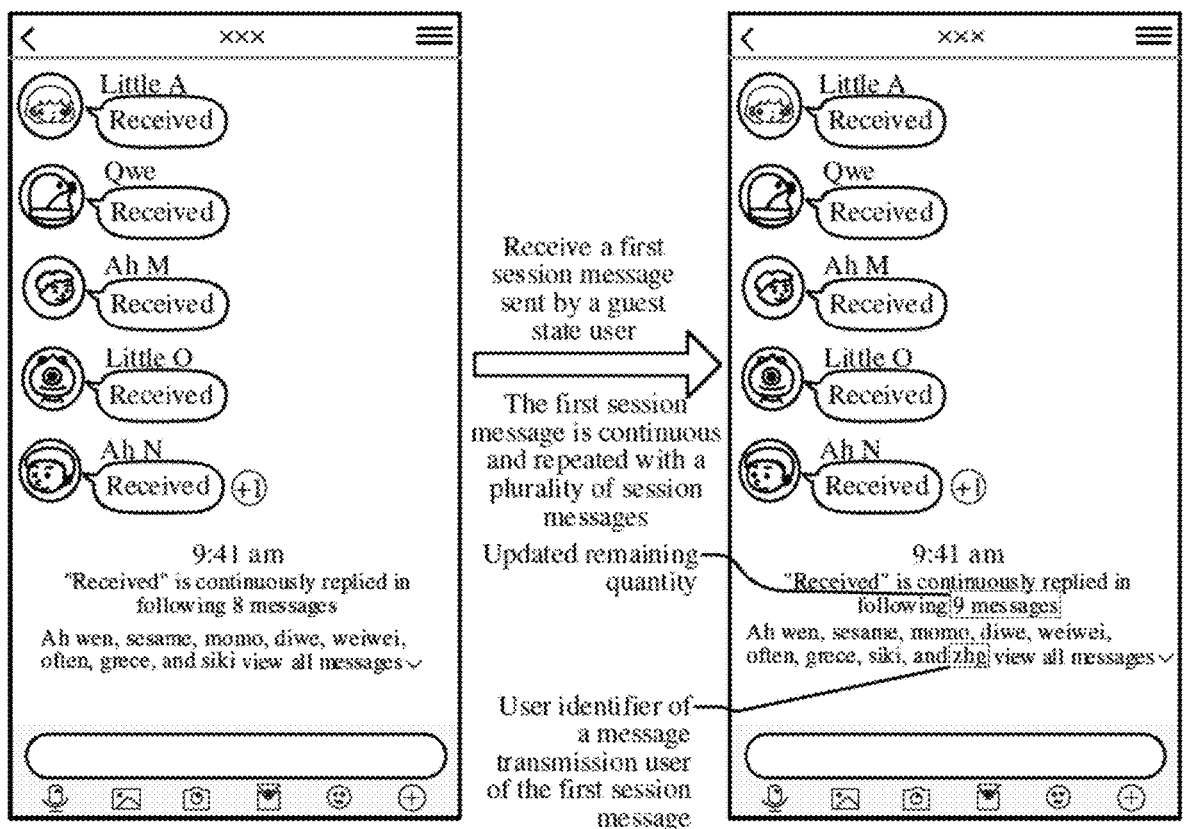
FIG. 4D is another example schematic diagram of displaying a new first session message according to an embodiment of this application.

After displaying the target session message in the session interface, the social network client may further detect in real time whether there is a new first session message in the target session. If the new first session message is detected, whether the first session message is continuous and repeated with the plurality of session messages is detected. If the first session message is repeated and continuous, the first session message may be added to the plurality of session messages, and the first folding prompt in the target session message is directly updated with the first session message. During actual implementation, if the first folding prompt includes the folding identifier, a value in the folding identifier may be directly increased by one to update the folding identifier. If the first folding prompt includes a folding message, the remaining quantity included in the folding message may be increased by one, and a user identifier of a message transmission user of the first session message may be added to the folding message. In some embodiments, to create a user experience that the session message of the master state user participating in screen swiping is stably reserved, if the session message is continuous and repeated, whether the message transmission user of the new session message is the master state user or the guest state user may be further detected. If the message transmission user is the master state user, the first session message 43 may be directly displayed in the session interface, as shown in FIG. 4C. In this case, after receiving the first session message, the social network client receives a second session message again with message content sent by a specific guest state user the same as the message content of the plurality of session messages. Because the second session message is continuous and repeated with the first session message and the plurality of session messages, the second session message may be added to the plurality of session messages, and the first folding prompt is updated with the second session message. If the message transmission user is the guest state user, the first folding prompt may be updated with the first session message. An example in which the first folding prompt includes the folding message is used. For a schematic diagram of updating the folding message with the first session message, refer to FIG. 4D. As shown in FIG. 4D, the updated folding message includes the user identifier of the message transmission user of the first session message, and a remaining quantity included in prompt content in the updated folding message also changes.

Figure 4E:
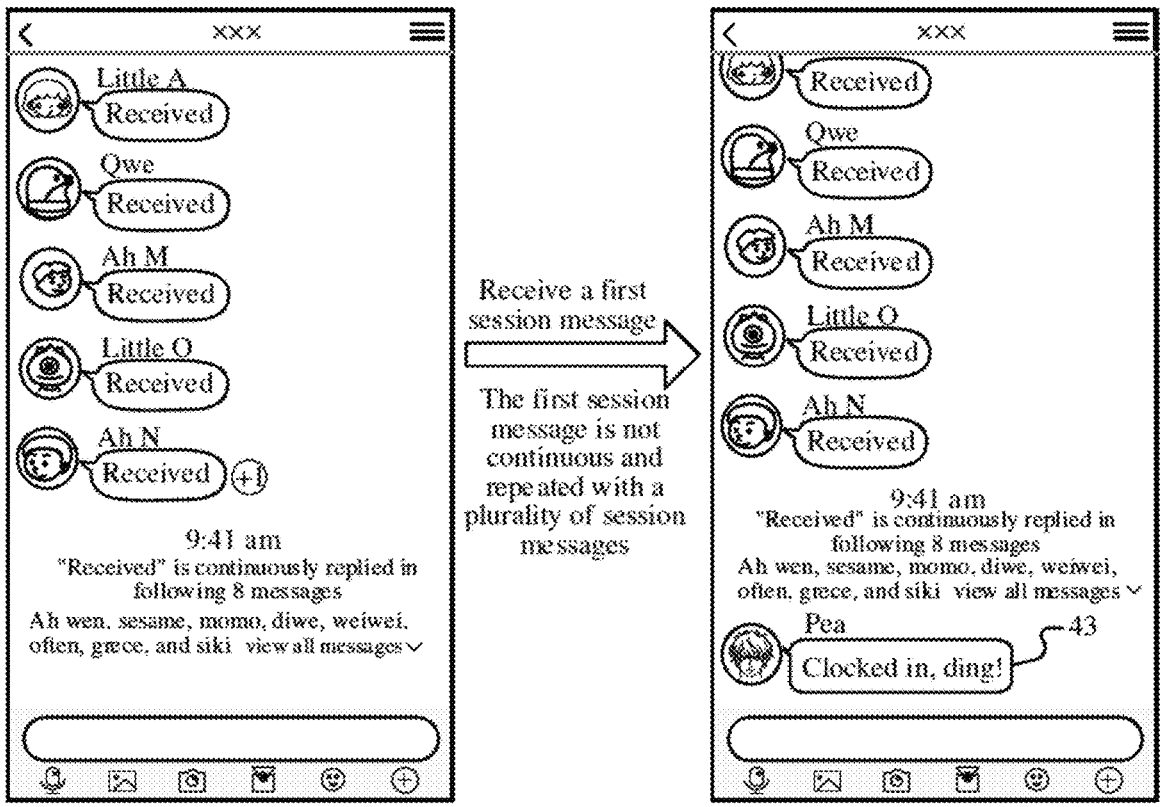
FIG. 4E is another example schematic diagram of displaying a new first session message according to an embodiment of this application.
Figure 4F:
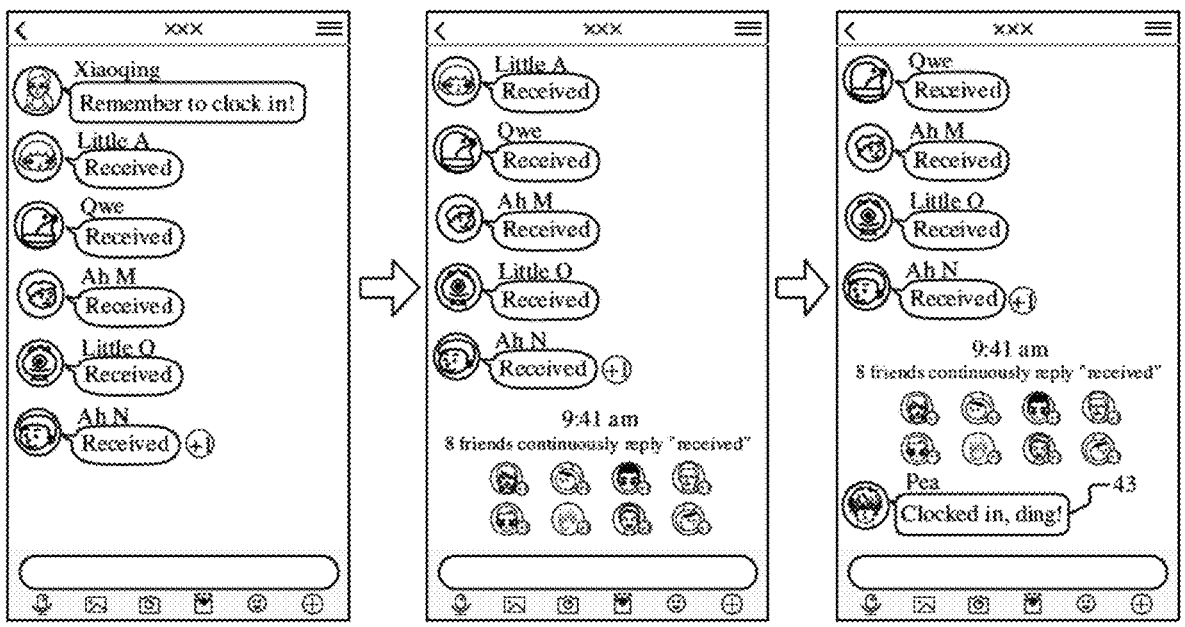
FIG. 4F is another example schematic diagram of displaying a new first session message according to an embodiment of this application.
Figure 4G:
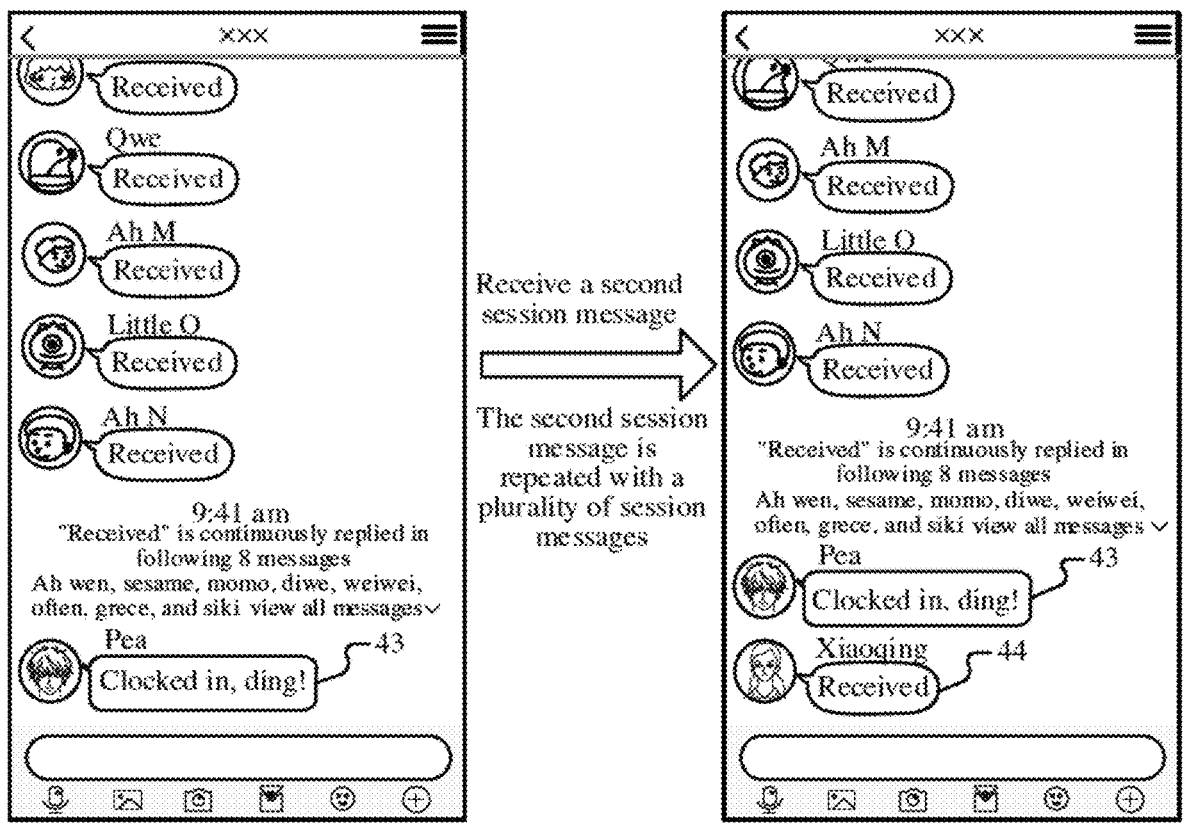
FIG. 4G is an example schematic diagram of displaying a new second session message according to an embodiment of this application.

If the session message is not continuous and repeated, no matter whether the message transmission user of the first session message is the master state user or the guest state user, the social network client may always directly display the first session message in the session interface, as shown in FIG. 4E or FIG. 4F. In addition, in a case that the session message is not continuous and repeated, after receiving the first session message, the social network client receives a second session message with message content the same as the message content of the plurality of session messages. Because the first session message interrupts the continuity between the second session message and the plurality of session messages, the second session message 44 may be directly displayed in the session interface, as shown in FIG. 4G. In this case, after redetecting a plurality of session messages that are continuous and repeated with the second session message, the social network client needs to obtain a new target session message according to the redetected plurality of session messages, and replaces the redetected plurality of session messages with the new target session message in the session interface for display.

Figure 3C:
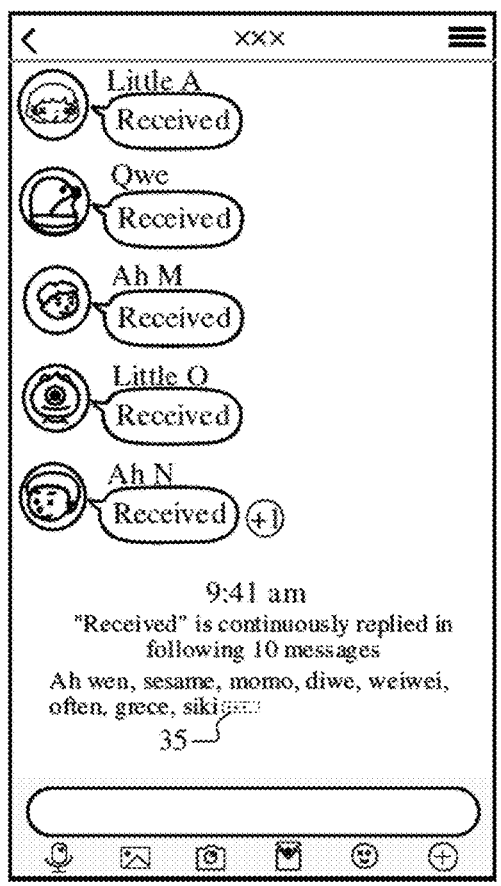
FIG. 3C is an example schematic diagram of another folding message according to an embodiment of this application.
Figure 3C:
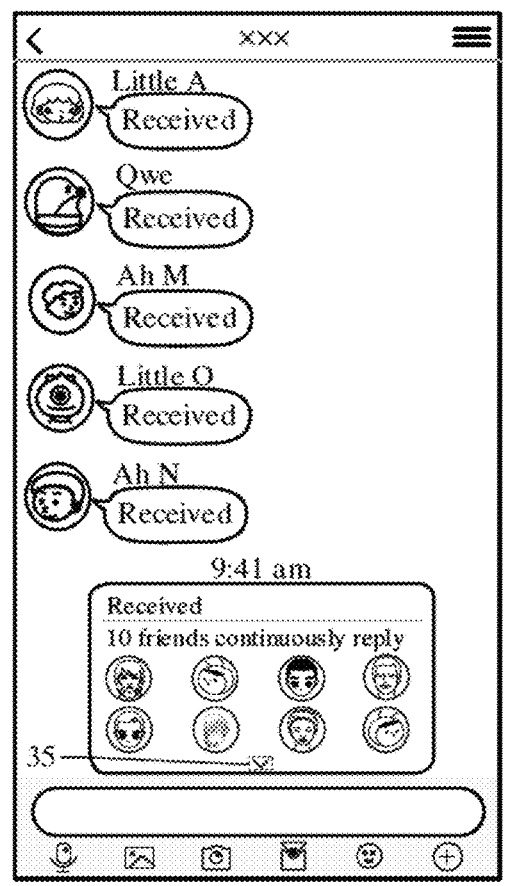
Figure 3D:
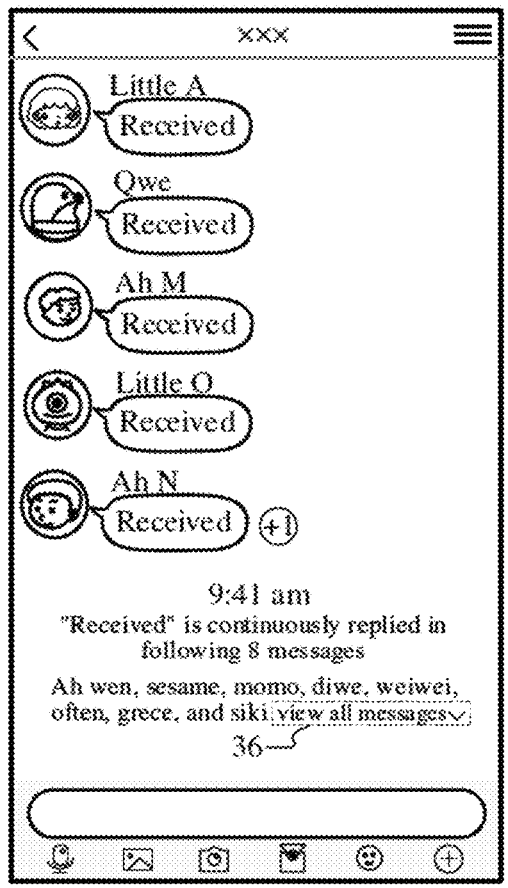
FIG. 3D is an example schematic diagram of another folding message according to an embodiment of this application.
Figure 3D:
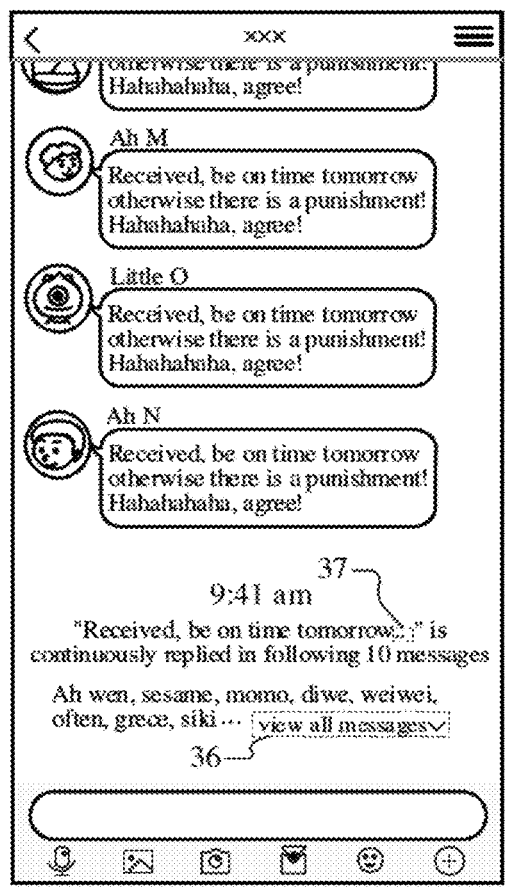
Figure 3E:
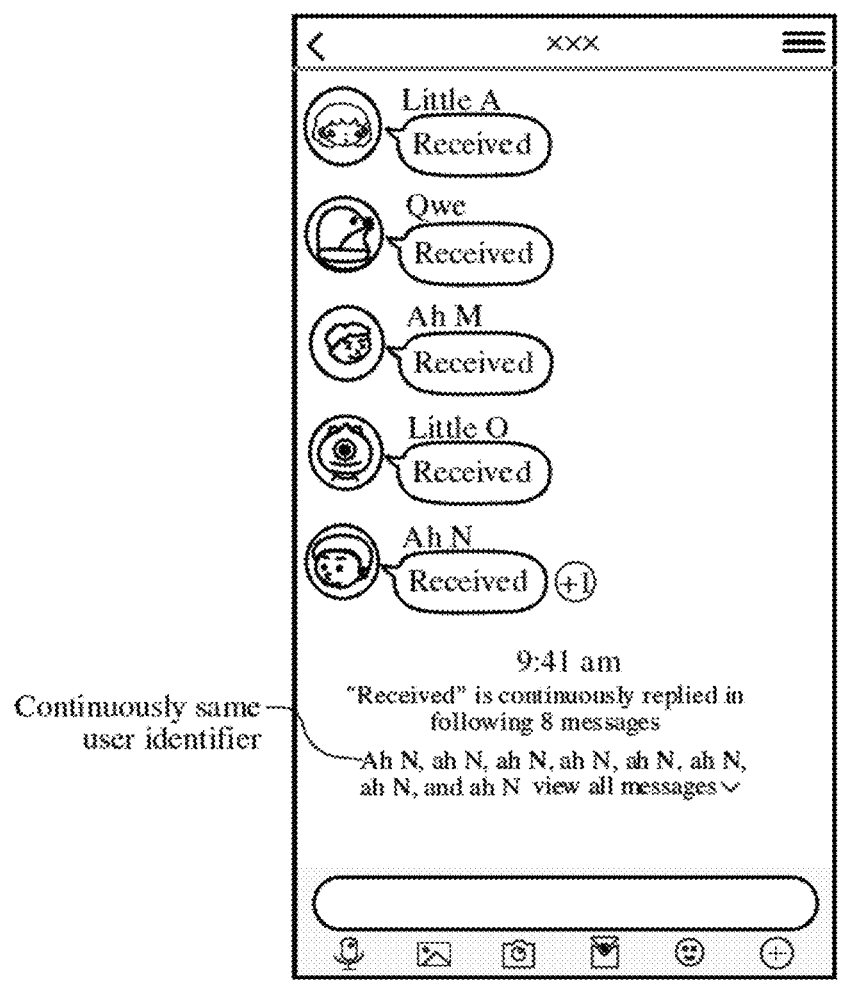
FIG. 3E is an example schematic diagram of another folding message according to an embodiment of this application.
Figure 3F:
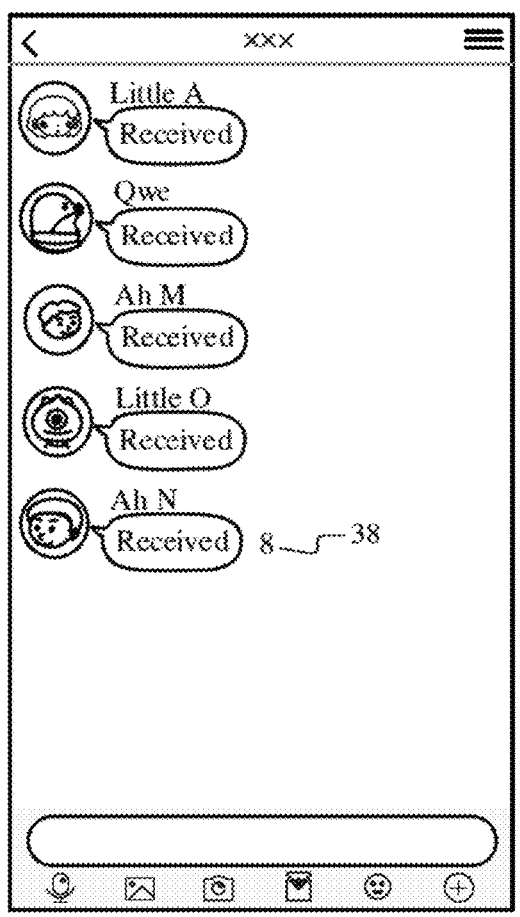
FIG. 3F is an example schematic diagram of a folding identifier according to an embodiment of this application.
Figure 3F:
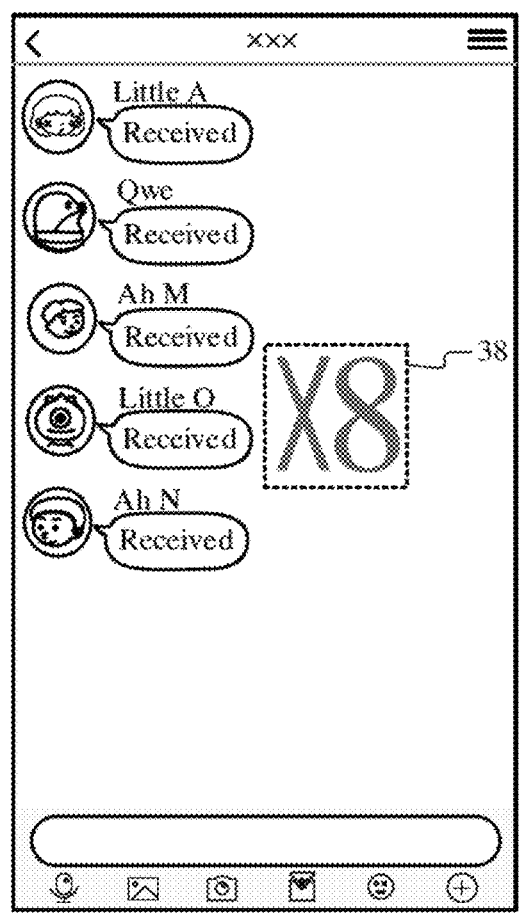
Figure 4H:
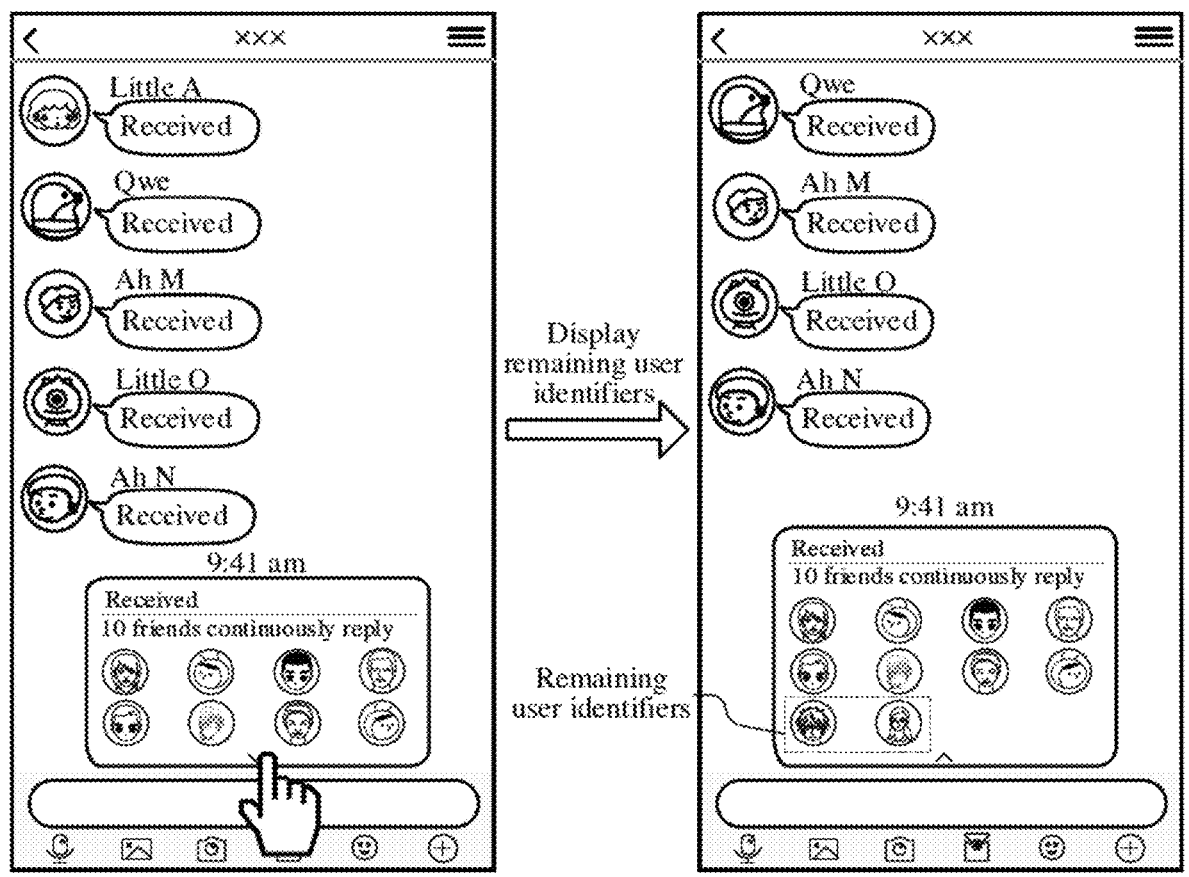
FIG. 4H is an example schematic diagram of displaying remaining user identifiers according to an embodiment of this application.

In addition, when the first folding prompt includes a folding message, it can be learned from the related description of the foregoing step s12 and the folding messages shown in FIG. 3A to FIG. 3E, the folding message may include: functional components such as an identifier ellipsis used for triggering the display of the remaining user identifiers that are not displayed in the obtained user identifiers, and a message link used for triggering the display of the remaining messages. After the folding message in the target session message is displayed, the master state user may further perform a trigger operation on the identifier ellipsis in the folding message, to trigger the social network client to display the remaining user identifiers that are not displayed in the obtained user identifiers in the session interface. Correspondingly, when detecting that the identifier ellipsis is triggered, the social network client may display the remaining user identifiers in the session interface. An example in which the folding message shown in the right in FIG. 3C is used. For a schematic diagram of triggering the display of the remaining user identifiers, refer to FIG. 4H.

Figure 4I:
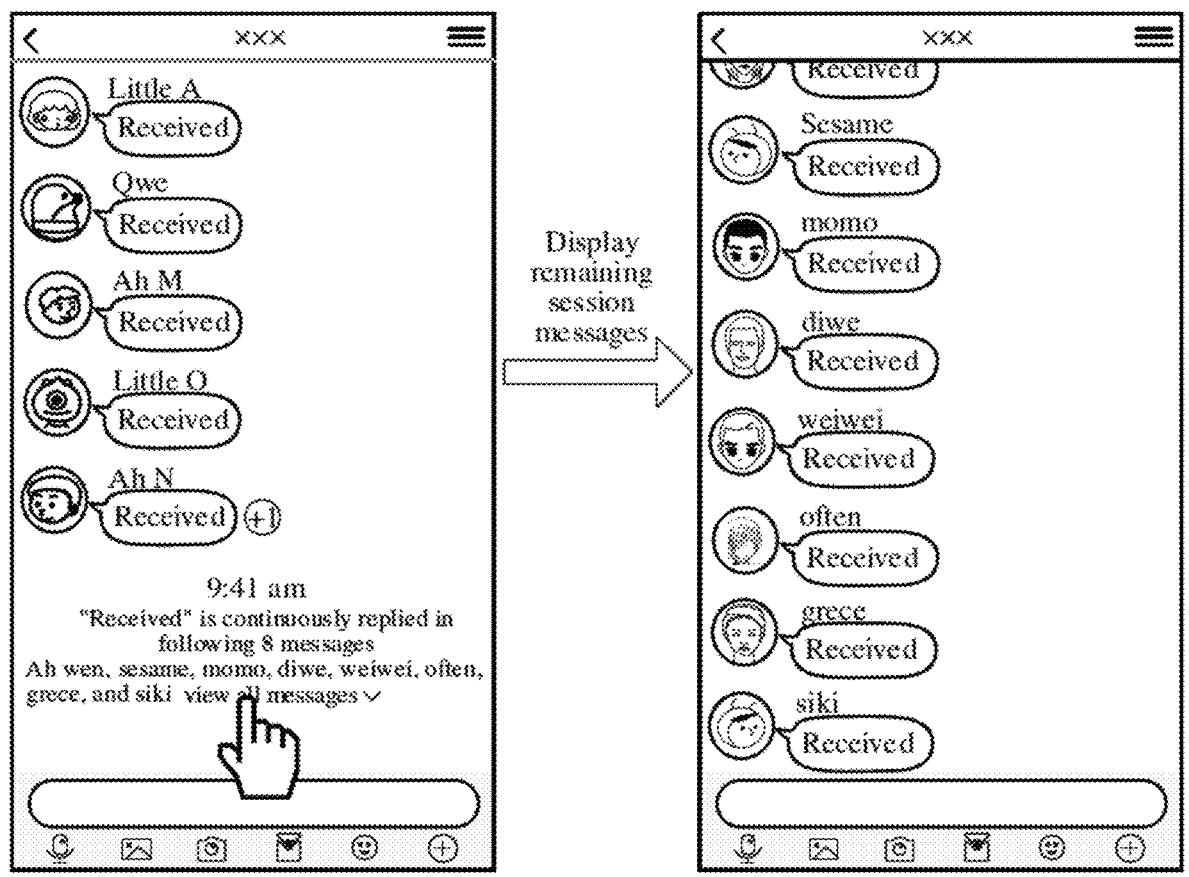
FIG. 4I is an example schematic diagram of displaying remaining session messages according to an embodiment of this application.
Figure 4J:
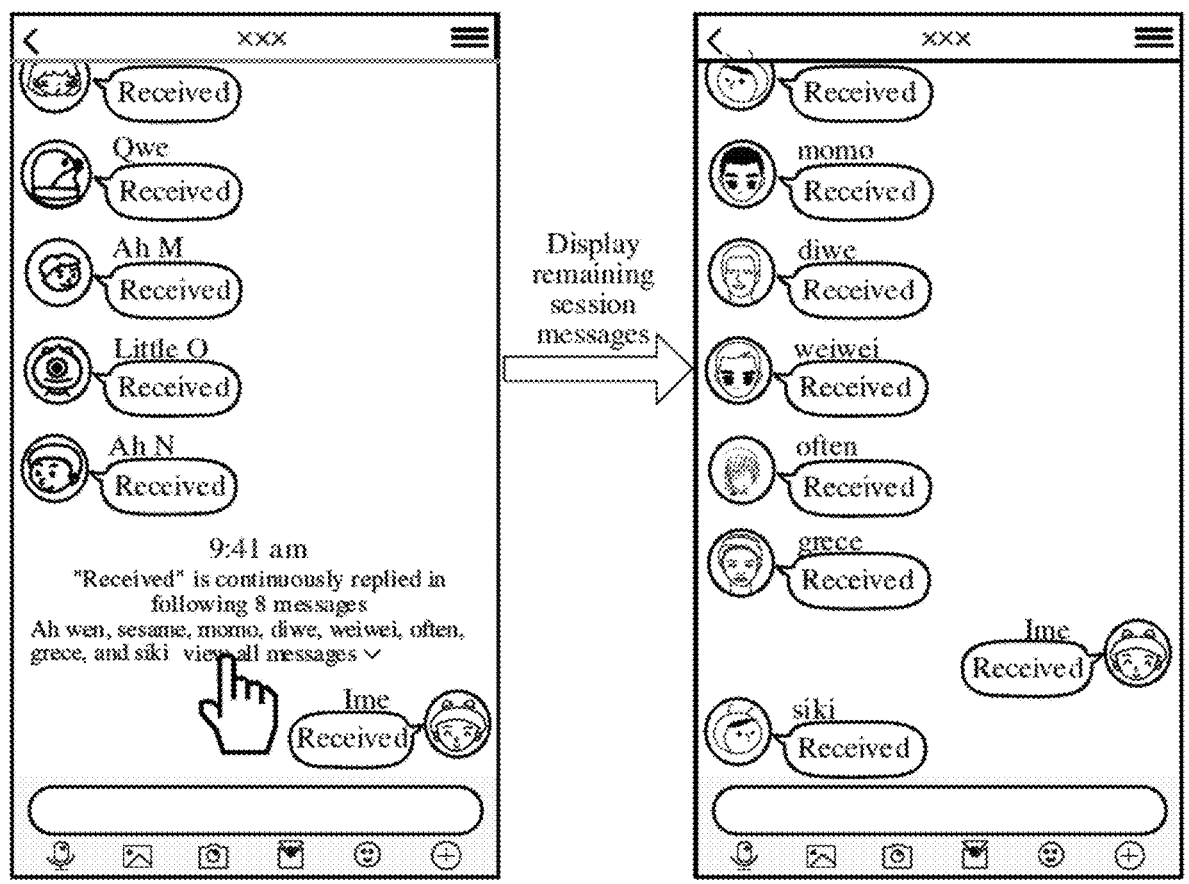
FIG. 4J is another example schematic diagram of displaying remaining session messages according to an embodiment of this application.

Similarly, the master state user may further perform a trigger operation on a message link in the folding message (for example, an operation of clicking or pressing a message link), to trigger the social network client to display the remaining session messages. In an implementation, in a case that the message link in the folding message is triggered, the social network client may display the remaining session messages and user identifiers of corresponding message transmission users in the session interface. During actual implementation, this embodiment of this application is described by using an example in which the reference session message includes a preset quantity of session messages sequentially selected from the plurality of session messages in chronological order of reception times. Therefore, the message reception time of the reference session message is necessarily earlier than message reception times of the remaining session messages. Even if the remaining session messages are directly displayed, a display order of the reference session messages does not affected. Therefore, the social network client may sequentially display the remaining session messages and user identifiers of corresponding message transmission users in the session interface in chronological order of the message reception times, as shown in FIG. 4I. In some embodiments, in a case that the message link in the folding message is triggered, the social network client may output a message display window 45 in the session interface, and display the remaining session messages and user identifiers of corresponding message transmission users in the message display window 45. During actual implementation, the social network client may sequentially display the remaining session messages and user identifiers of corresponding message transmission users in the message display window 45 in chronological order of the message reception times, as shown in FIG. 4J.

Figure 4K:
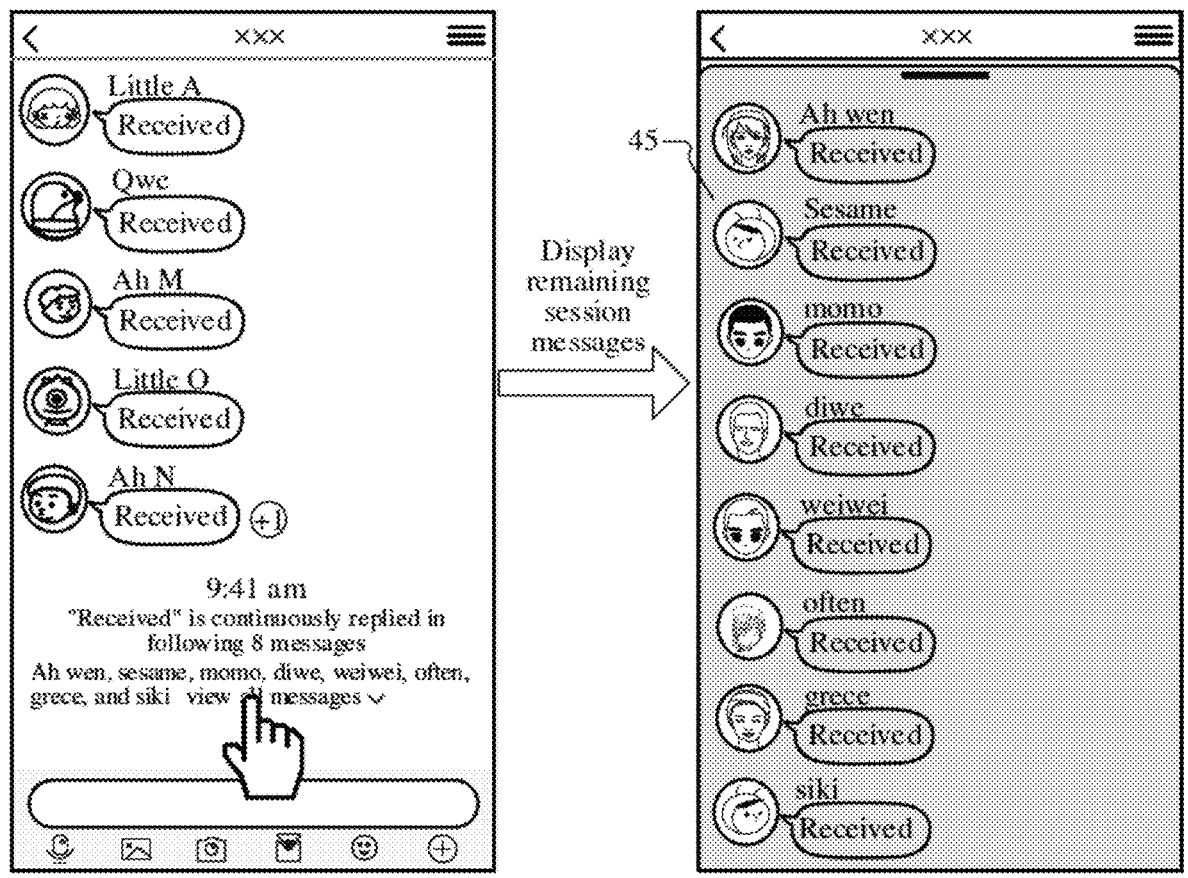
FIG. 4K is another example schematic diagram of displaying remaining session messages according to an embodiment of this application.
Figure 4L:
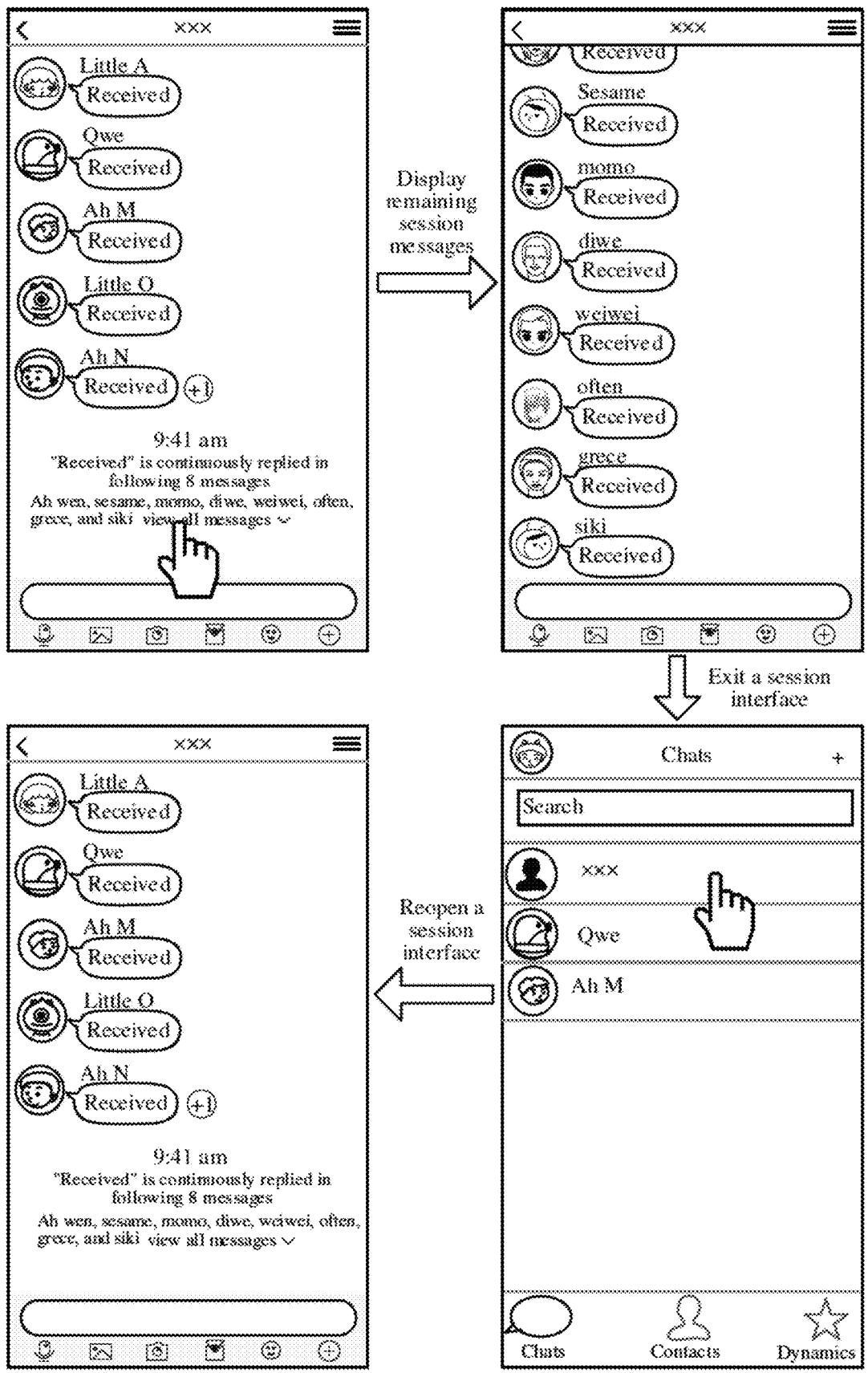
FIG. 4L is an example schematic diagram of performing folding display of remaining session messages again after the remaining session messages are displayed according to an embodiment of this application.

In an actual application, when the reference session message is selected, the session message sent by the master state user may also be used as the reference session message. In this case, a message reception time of the session message sent by the master state user may be later than the message reception times of some remaining session messages. If the remaining session messages are directly displayed, an order of displaying the messages may be wrong. Therefore, in this case, the social network client may sequentially display continuous and repeated session messages and user identifiers of corresponding message transmission users in the session interface in chronological order of the message reception times, to display the remaining session messages, as shown in FIG. 4K. After displaying the remaining session messages, if detecting that the master state user exits and reopens the session interface of the target session, the social network client may obtain the target session message again according to the plurality of session messages and directly display the target session message in the session interface, to implement the folding display of the remaining session messages again. An example in which the target session message includes the reference session message and the folding message is used. For a schematic diagram, refer to FIG. 4L. FIG. 4L is a schematic diagram of exemplarily indicating that the master state user exits the session interface by only using an interface switching process of switching from the session interface to a main interface, but this does not limit this operation that the master state user exits the session interface. For example, the master state user switches from the session interface to a web interface of a browser, which may also be regarded as the master state user exiting the session interface of the target session.

In this embodiment of this application, the session interface of the target session may be displayed, and when the plurality of continuous and repeated session messages exist in the message set of the target session, the plurality of continuous and repeated session messages may be replaced with the reference session message and the first folding prompt in the session interface for display. Because the reference session message is selected from the plurality of session messages, the message content of the reference session message is the same as the message content of the plurality of session messages. By displaying the reference session message, it can be ensured that the message content is completely displayed. In addition, because the first folding prompt is obtained by folding the remaining session messages other than the reference session message in the plurality of session messages, the remaining session messages are replaced with the first folding prompt for display, to effectively reduce the screen swiping effect caused by displaying the plurality of session messages. It can be learned that by displaying the reference session message and the first folding prompt, the message display manner of the social network client can be enriched, the utilization rate of graphics processing resources of the terminal and a quantity of times of human-computer interactions can be improved, and the user viscosity of the social network client can be further effectively improved.

This embodiment of this application shown in FIG. 2 mainly embodies that the social network client may automatically perform folding display on a part of session messages that are continuous and repeated. However, in an actual application, the social network client may further support the user to manually fold one or a plurality of displayed session messages in the session interface of the target session, to help the user subsequently manage and search the messages. In an application scenario, if the plurality of continuous and repeated session messages exist in the message set of the target session, and the social network client automatically performs folding display on the remaining session messages other than the reference session message in the plurality of session messages through step S203 and step S204, the displayed session messages in the session interface may include: session messages other than the remaining session messages in the message set. In another application scenario, if the plurality of continuous and repeated session messages exist in the message set of the target session, and the remaining session messages in the plurality of session messages are triggered for display, or the plurality of continuous and repeated session messages do not exist in the message set, the displayed session messages in the session interface may include each session message in the message set. For ease of description, an example in which the displayed session messages in the session interface may include each session message in the message set is subsequently used for description.

Figure 5A:
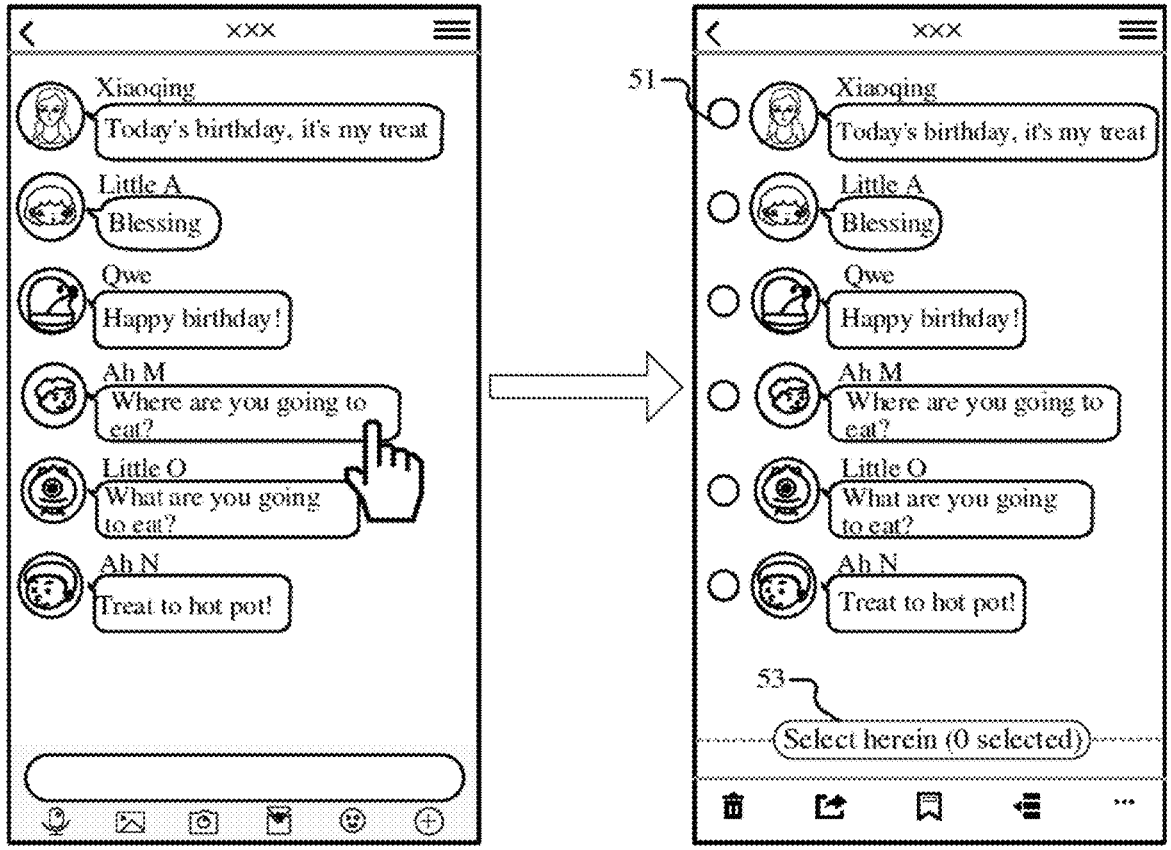
FIG. 5A is an example schematic diagram of outputting a message option according to an embodiment of this application.
Figure 5B:
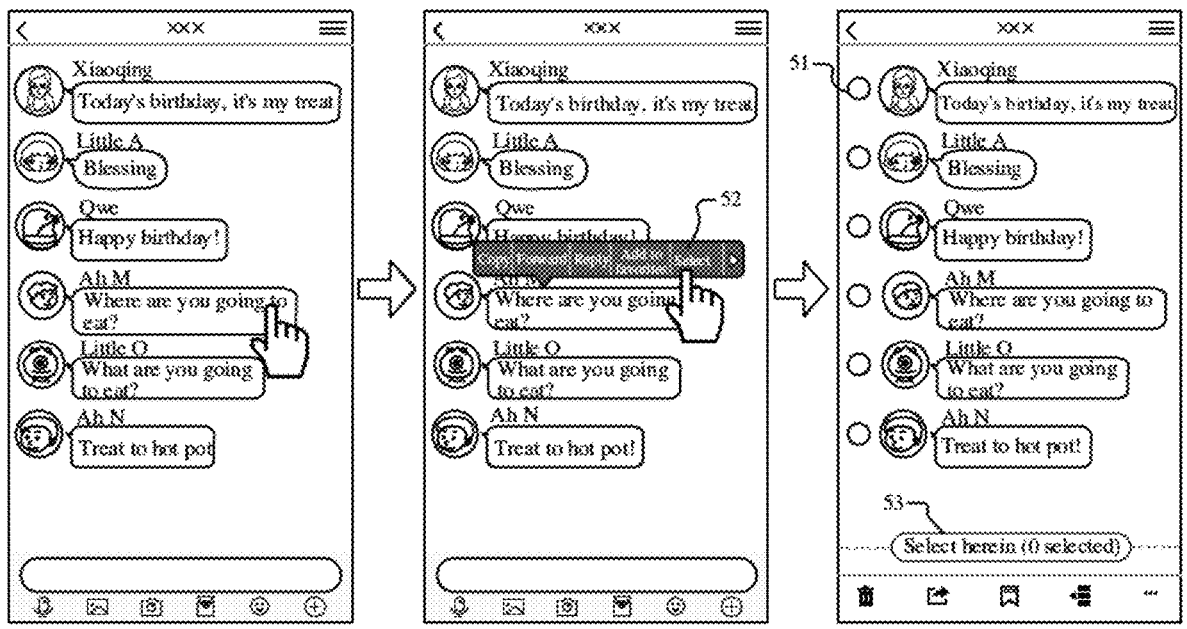
FIG. 5B is another example schematic diagram of outputting a message option according to an embodiment of this application.

During actual implementation, if intending to manually fold a displayed session message in the session interface, the master state user may input a selection trigger event for a displayed session message in the session interface to the social network client. Correspondingly, in a case that a selection trigger event for a displayed session message in the session interface is detected, the social network client may output a message option of each displayed session message in the session interface, the message option being used for selecting the displayed session message. In an implementation, the selection trigger event may include an event of detecting that the session interface is pressed. In this implementation, for a schematic diagram of outputting a message option 51, refer to FIG. 5A. In another implementation, the social network client may provide a selection trigger button 52 for the master state user. The selection trigger button 52 may be triggered for display through a trigger operation such as clicking or pressing the session interface. The corresponding selection trigger event may include an operation of detecting that the selection trigger button 52 is triggered. In this implementation, for a schematic diagram of outputting a message option 51, refer to FIG. 5B.

The master state user may select a message option of each session message according to actual requirement of the master state user. Correspondingly, the social network client may use a displayed session messages corresponding to a selected message option as a folded session message according to a selection operation for the message option in the session interface. After selecting the message option, the master state user may click or press a selection end button 53 in the session interface to input a selection completion event to the client. The selection completion event herein is an event that the selection end button is clicked or pressed. Correspondingly, in a case that a selection completion event is detected, the social network client may create a folded message according to the folded session message; and replace the folded session message with the folded message in the session interface for display. During actual implementation, an implementation of the creating, in a case that a selection completion event is detected, a folded message according to the folded session message may be as follows: In a case that the selection completion event is detected, the social network client may directly obtain or generate a system message name randomly, and generate a folded message 54 according to the system message name and a user identifier of a message transmission user of the folded session message. In this case, an example in which the system message name is a "folded message 1" is used. For a schematic diagram of outputting a folded message 54, refer to FIG. 5C.

In some embodiments, an implementation of the creating, in a case that a selection completion event is detected, a folded message according to the folded session message may be: in a case that the selection completion event is detected, outputting a message name-setting window 55. The message name-setting window 55 may include a name setting region 56 and a name confirmation button 57. The master state user may set a custom message name for the folded session message in the name setting region 56 in the message name-setting window 55. Correspondingly, the social network client may obtain a custom message name set for the folded session message in the message name-setting window 55; and in a case that a confirmation operation for the custom message name is detected, may generate a folded message 54 according to the custom message name and a user identifier of a message transmission user of the folded session message. A confirmation operation for the custom message name may include a click or press operation for the name confirmation button 57 in the message name-setting window 55. In this case, for a schematic diagram of outputting a folded message 54, refer to FIG. 5D.

Figure 5C:
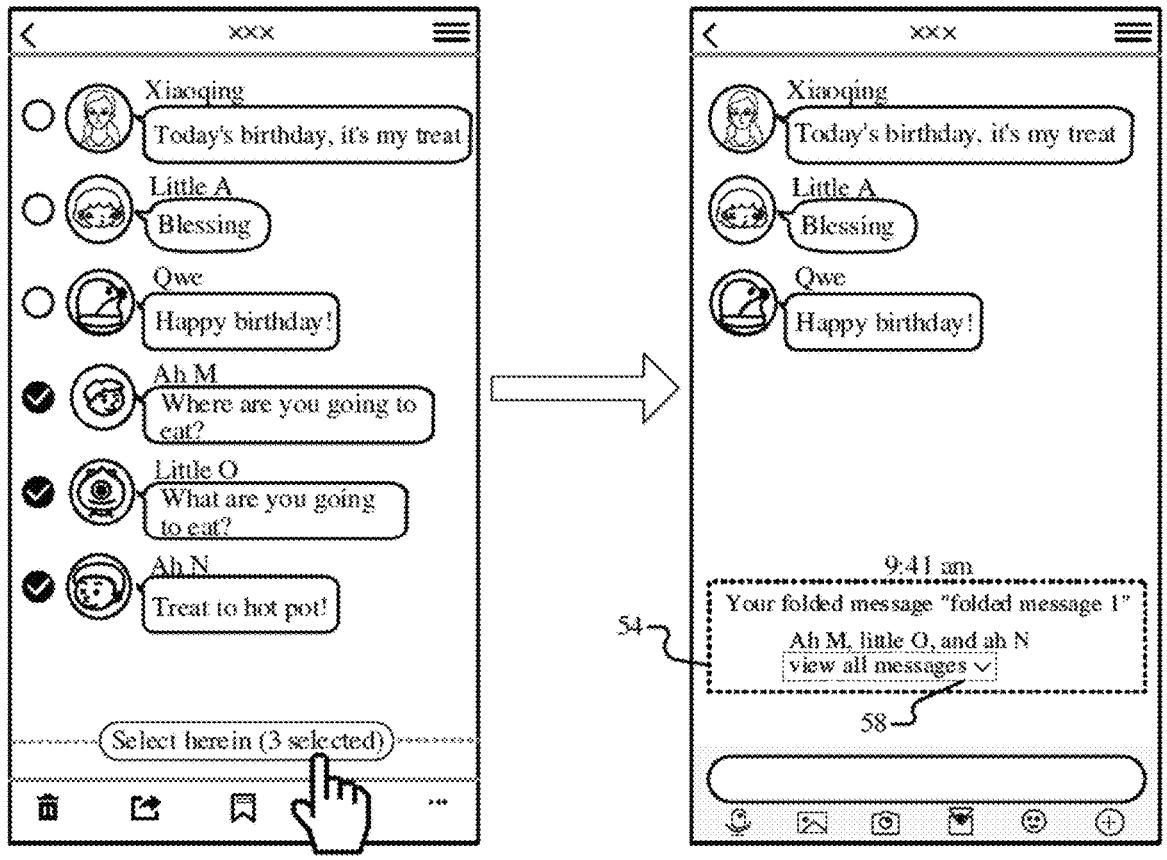
FIG. 5C is an example schematic diagram of outputting a folded message according to an embodiment of this application.
Figure 5D:
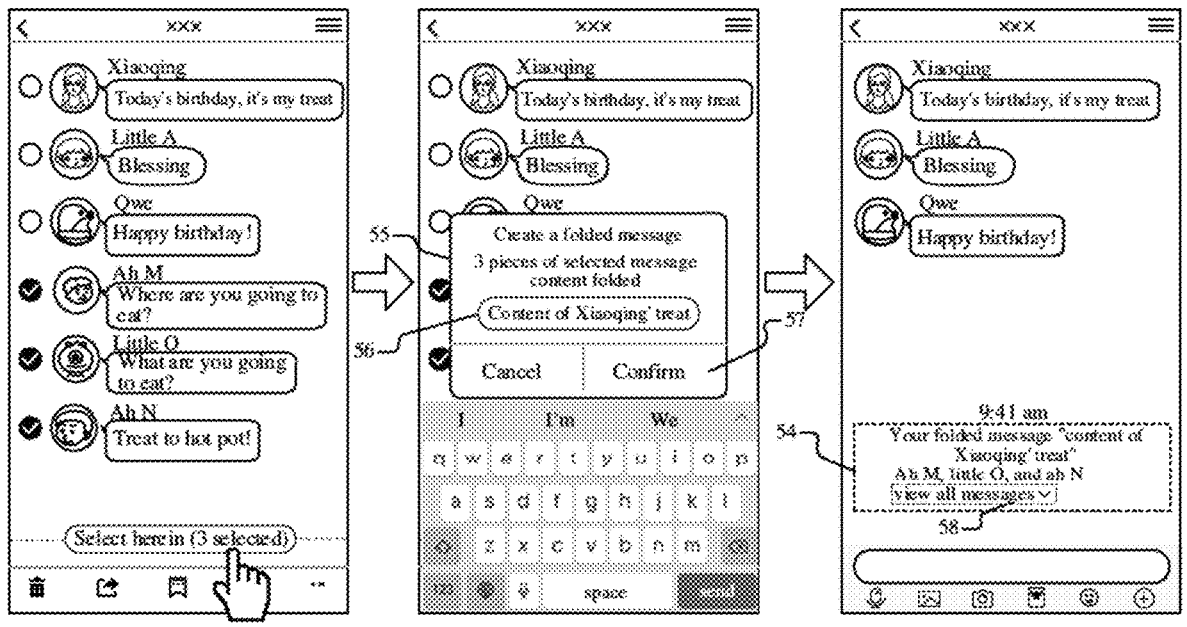
FIG. 5D is another example schematic diagram of outputting a folded message according to an embodiment of this application.
Figure 5E:
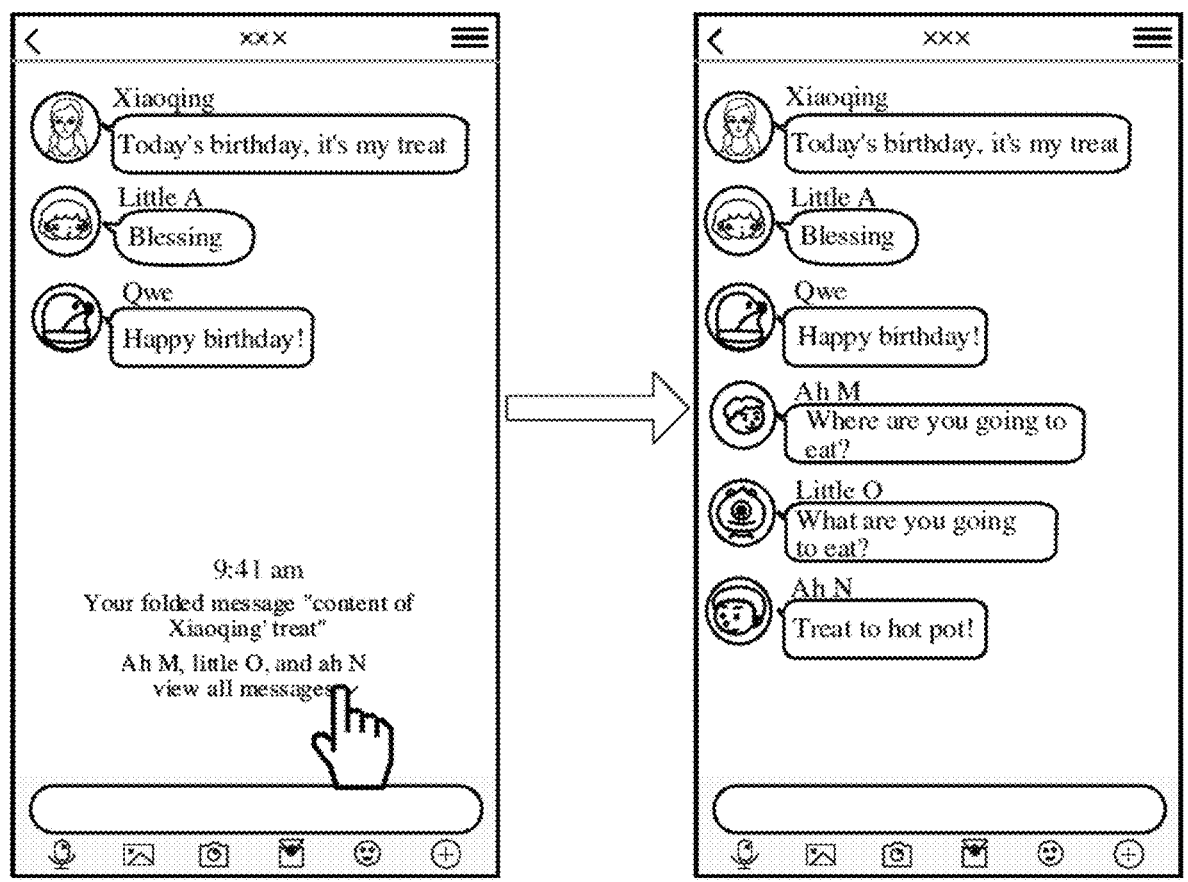
FIG. 5E is an example schematic diagram of displaying a folded session message according to an embodiment of this application.
Figure 5F:
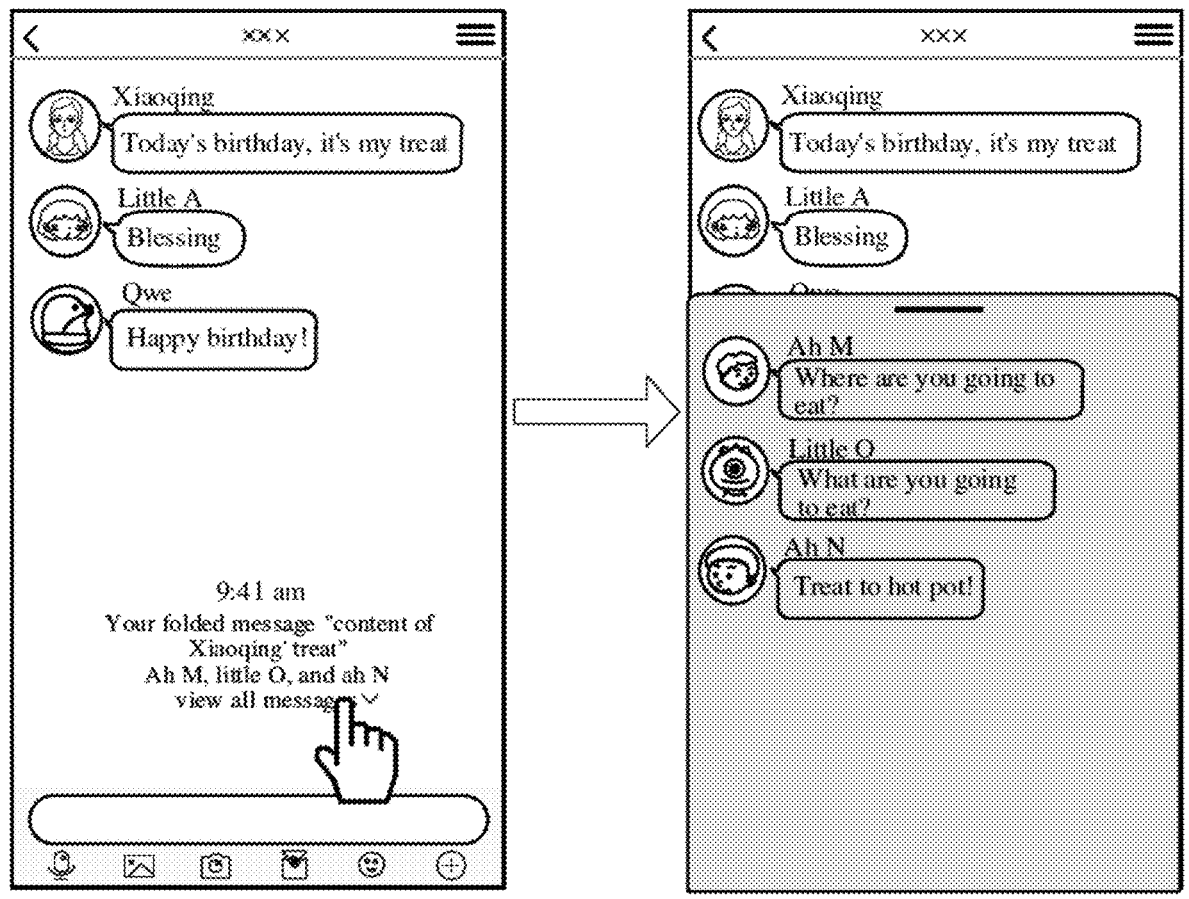
FIG. 5F is another example schematic diagram of displaying a folded session message according to an embodiment of this application.

In an implementation, it can be learned from the folded message referring to FIG. 5C or FIG. 5D that, the folded message may further include a message button 58 for triggering the folded session message for display. The master state user may trigger the message button 58, so that the social network client displays the folded session message. Correspondingly, when detecting that the message button 58 is triggered, the social network client may display the folded session message in the session interface, as shown in FIG. 5E. When detecting that the message button 58 is triggered, the social network client may output a message display window, and display the folded session message in the message display window, as shown in FIG. 5F.

Figure 5G:
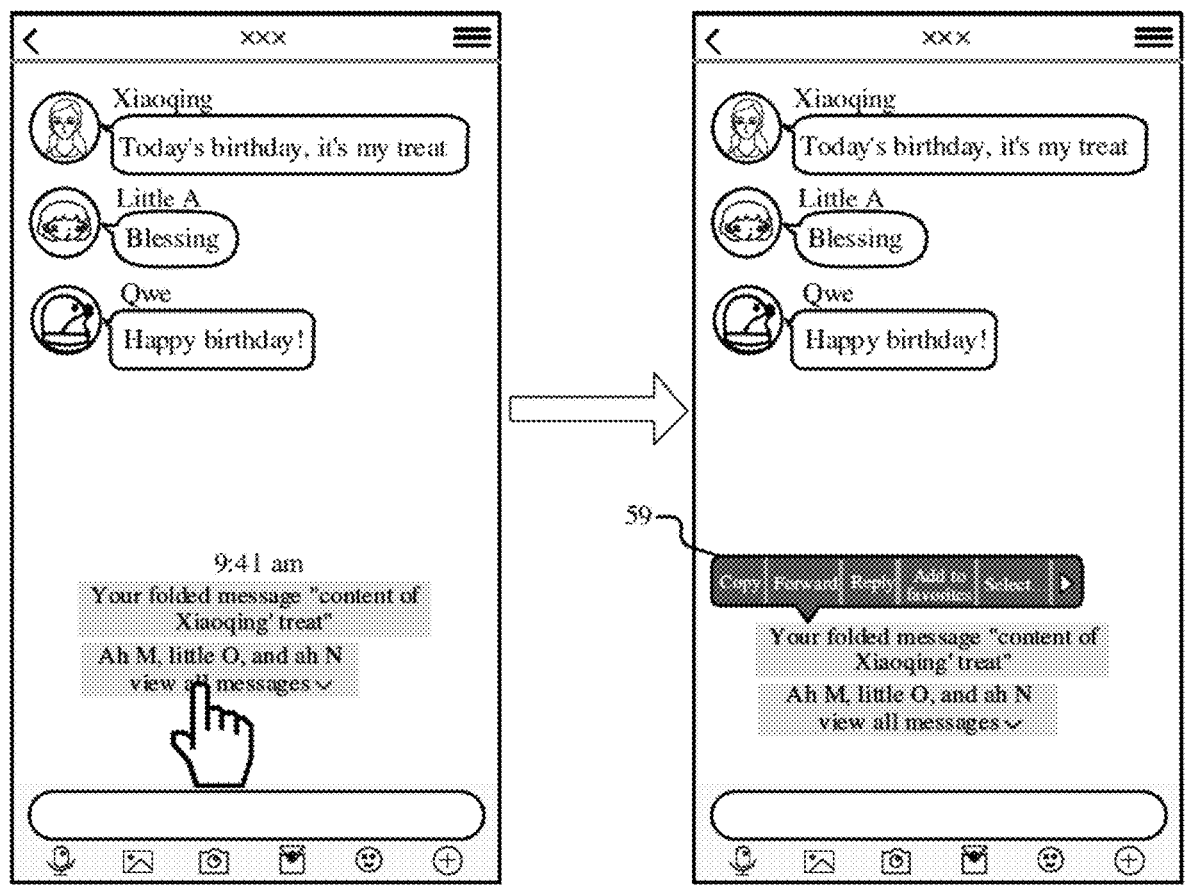
FIG. 5G is an example schematic diagram of outputting an operation option window of a folded message according to an embodiment of this application.

In another implementation, for the folded message, the social network client may further provide functions such as copying, forwarding, replying, and adding to favorites. When intending to perform operations such as copying, forwarding, replying, and adding to favorites on the folded message, the master state user may perform a trigger operation on the folded message. Correspondingly, when the folded message is triggered, the social network client may output an operation option window 59 for the folded message, as shown in FIG. 5G. The operation option window 59 includes at least one of the following operation options: a copy option, a forward option, a reply option, an option of adding to favorites, and a selection option. Next, the social network client may determine a selected operation option from the operation option window according to a selection operation detected in the operation option window; and then, perform a corresponding operation on the folded message according to the selected operation option. For example, if the selected operation option is the forward option, an executed corresponding operation is an operation of outputting a forward interface. The master state user may select a target user through the forward interface, and trigger the social network client to send the folded session message to the target user. In another example, if the selected operation option is the option of adding to favorites, an executed corresponding operation is an operation of adding the folded session message to the favorites. In another example, if the selected operation option is the copy option, an executed corresponding operation is an operation of copying the folded session message. In an actual application, for the first folding prompt obtained through automatic folding, the social network client may also provide functions such as copying, forwarding, replying, and adding to favorites. This implementation is similar to the implementation for the folded message, and details are not described herein again. In addition, when the target session message includes an image message, or key content extracted from the message content of the plurality of session messages, and a quantity identifier generated according to a quantity of the plurality of session messages, the manual folding function mentioned above is also applicable. By providing the manual folding function, the message display manner of the social network client can be enriched, thereby improving the user viscosity of the social network client.

The message display method shown in FIG. 2 is applicable to a session message of any message type. The message type herein may include: a first type or a second type, where message content of a session message corresponding to the first type does not include a keyword, and message content of a session message corresponding to a second type includes a keyword. In an actual application, the keyword may be set according to a service requirement. For example, in this embodiment of this application, a plurality of types of keywords, such as a blessing type of a keyword and a keyword of an enterprise promotion type, may be set. The keyword of the blessing type is a keyword used for expressing blessing, and may include, but not limited to, a keyword for a holiday wish and a keyword for a birthday wish. The keyword of the enterprise promotion type is a keyword used for promoting a target enterprise, and may include, but not limited to, an enterprise name and a product attribute of a product operated by a target enterprise (such as a product name or a product category). For example, if the product operated by the target enterprise is a hamburger, the keyword of the enterprise type may be a name of a specific hamburger. To improve the operation capability and user viscosity of the social network client, the embodiments of this application further provide a message display method shown in FIG. 6. The message display method shown in FIG. 6 mainly adopts a display manner of a new image message to display the plurality of continuous and repeated session messages, thereby enriching the display form of the session message. The image message is a message generated according to the plurality of session messages and an image matching message content of the plurality of session messages. In an actual application, the social network client may also apply the message display method shown in FIG. 6 to any message type of a session message. For example, after detecting the plurality of continuous and repeated session messages, the social network client may also detect a message type of the plurality of session messages. During actual implementation, whether the plurality of session messages include a keyword may be detected; if the plurality of session messages do not include the keyword, it is determined that the message type of the plurality of session messages is a first type; and If the plurality of session messages include the keyword, it is determined that the message type of the plurality of session messages is a second type. Then, different message display manners are selected for different message types in some embodiments. When the message type of the plurality of continuous and repeated session messages is the first type, the plurality of session messages may be displayed by selecting the display manner of folding a part of session messages, that is, the plurality of session messages may be displayed by selecting the message display method shown in FIG. 2. When the message type of the plurality of continuous and repeated session messages is the second type, the plurality of session messages may be displayed by selecting the display manner of the new image message, that is, the plurality of session messages may be displayed by selecting the message display method shown in FIG. 6.

Figure 6:
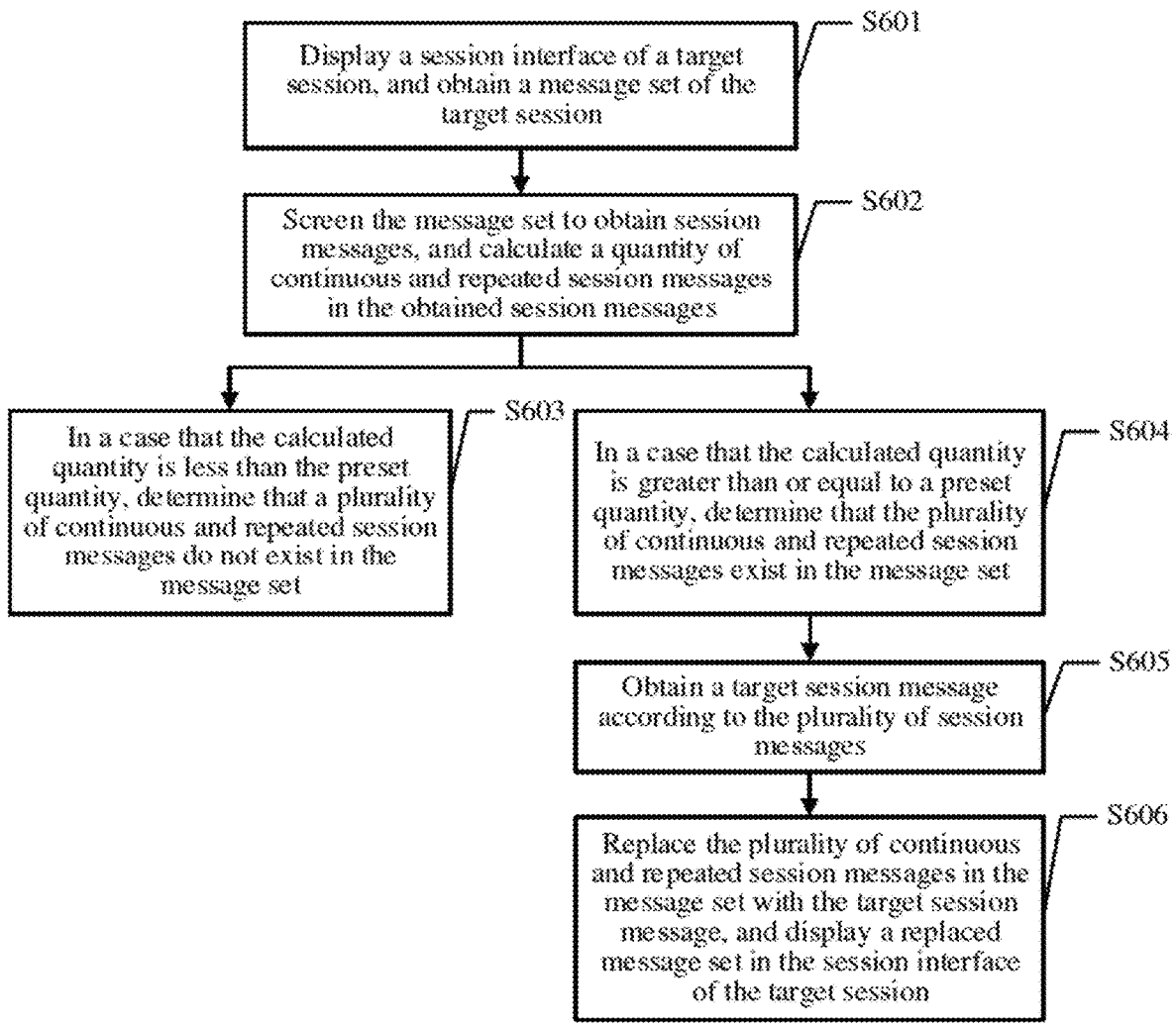
FIG. 6 is an example schematic flowchart of a message display method according to an embodiment of this application.

In some embodiments, the message display method shown in FIG. 6 may be performed by any social network client in the communication session system mentioned above, or may be performed by the terminal running the social network client. For ease of description, this embodiment of this application is described by using an example in which the social network client performs the message display method, and the target session message includes the image message. Referring to FIG. 6, the message display method may include the following step S601 to step S606:

S601. A terminal displays a session interface of a target session, and obtains a message set of the target session.

S602. Screen the message set to obtain session messages, and calculate a quantity of continuous and repeated session messages in the obtained session messages.

S603. In a case that the calculated quantity is less than the preset quantity, determine that a plurality of continuous and repeated session messages do not exist in the message set.

S604. In a case that the calculated quantity is greater than or equal to a preset quantity, determine that a plurality of continuous and repeated session messages exist in the message set. In this case, step S605 and step S606 may continue to be performed. Step S602 to step S604 (that is, the counting isolation manner) are exemplarily used in this embodiment of this application to describe how to detect the plurality of continuous and repeated session messages. The non-counting isolation manner mentioned in the foregoing step S202 may alternatively be used in an actual application to detect whether the plurality of continuous and repeated session messages exist in the message set.

S605. In a case that a plurality of continuous and repeated session messages exist in the message set, obtain a target session message according to the plurality of session messages.

Figure 7A:
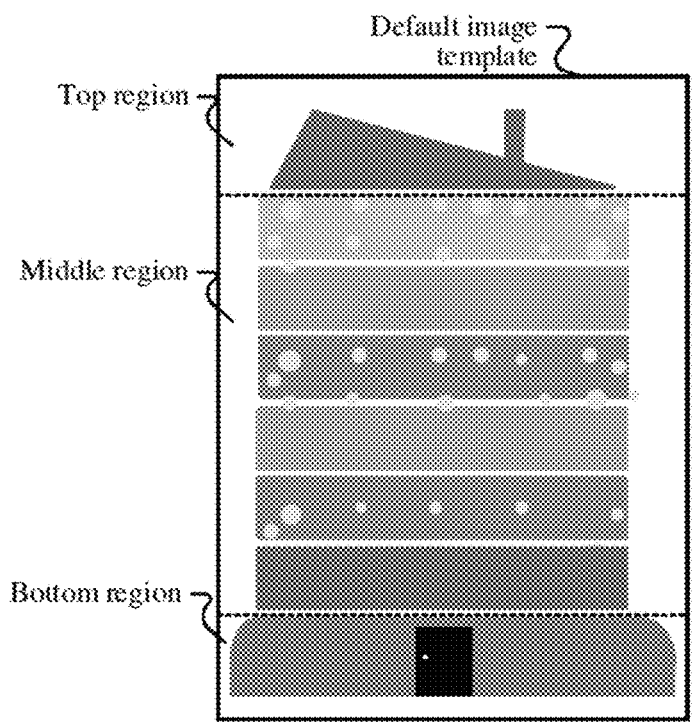
FIG. 7A is an example schematic diagram of a default image template according to an embodiment of this application.

During actual implementation, the terminal first obtains a message presentation template matching the message content of the plurality of session messages, the message presentation template including the following three regions: a top region, a middle region, and a bottom region, and an image matching the message content being displayed in each region. In a case, if the message type of the plurality of session messages is the first type, that is, the message content of the plurality of session messages does not include the keyword, the social network client may directly obtain a default image template as a message presentation template. The default image template includes three regions: a top region, a middle region and a bottom region; and an image in the top region of the default image template may be a roof image used for representing a house roof, and an image in the middle region of the default image template may be a floor image used for representing a house floor, and an image in the bottom region of the default image template may be a bottom image used for representing a house bottom, as shown in FIG. 7A.

In some embodiments, if the message type of the plurality of session messages is the second type, that is, the message content of the plurality of session messages includes the keyword, the message presentation template may be obtained in the following manners:

pre-configuring a message presentation template for each keyword. The social network client may obtain a matching message presentation template according to the keyword included in the message content of the plurality of session messages.

Figure 7B:
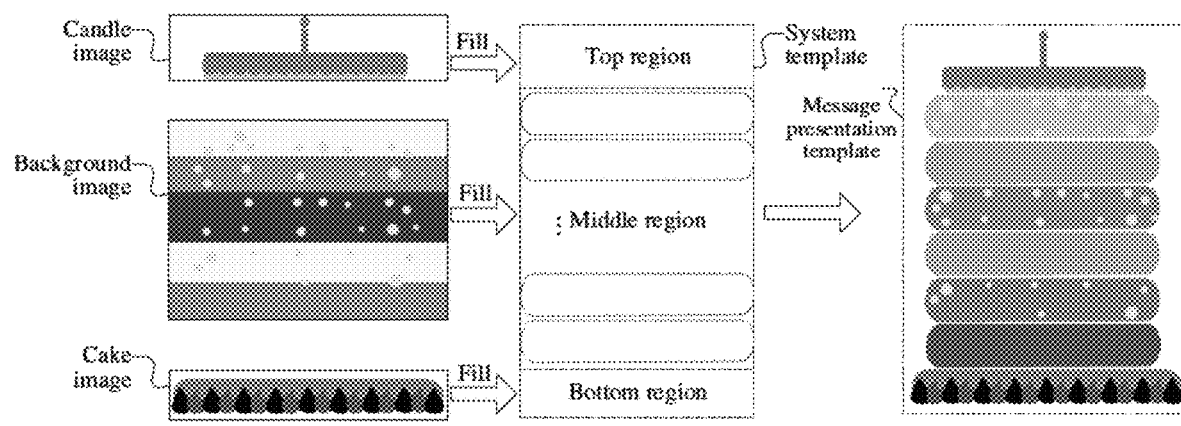
FIG. 7B is an example schematic diagram of generating a message presentation template according to an embodiment of this application.
Figure 7C:
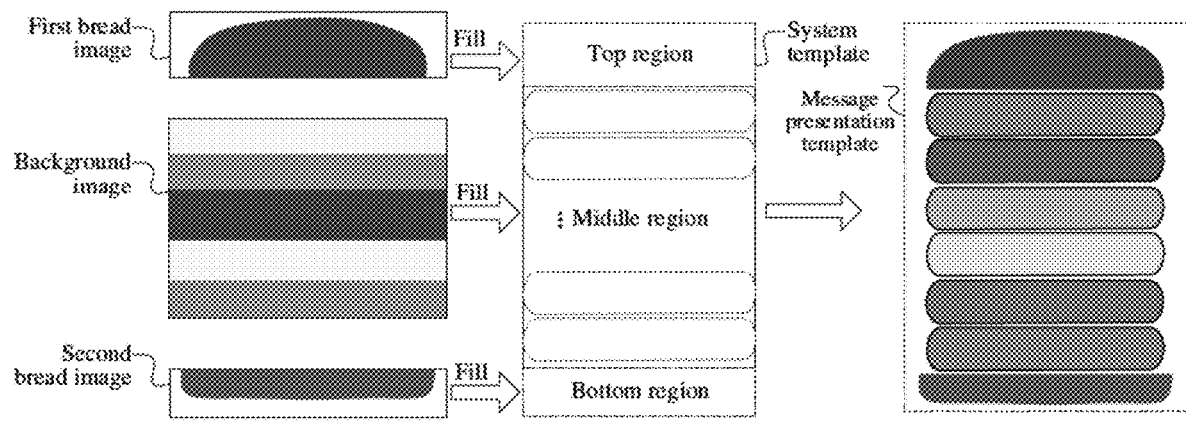
FIG. 7C is another example schematic diagram of generating a message presentation template according to an embodiment of this application.

In some embodiments, if the message type of the plurality of session messages is the second type, that is, the message content of the plurality of session messages includes the keyword, the message presentation template may be obtained in the following manners:

first obtaining a system template, the system template including the following three regions: a top region, a middle region, and a bottom region. Next, according to the keyword in the message content of the plurality of messages, an image used for filling each region in the system template may be separately obtained. Then, the obtained image may be separately filled into each region of the system template to obtain a message presentation template. For example, assuming that the message content of the plurality of session messages is "Xiaoqing, happy birthday!", the keyword of the message content is "happy birthday". In this case, an image corresponding to each region obtained according to the keyword "happy birthday" may be an image used for representing a composition of a cake, such as a candle image used for representing a top of the cake, a background image used for representing a middle of the cake, or a cake image used for representing a bottom of the cake. Then, the candle image, the background image, and the cake image may be sequentially filled into the top region, the middle region, and the bottom region, to obtain a message presentation template, as shown in FIG. 7B. In another example, assuming that the message content of the plurality of session messages is "hamburger, you deserve it!", the keyword of the message content is "hamburger". In this case, an image corresponding to each region obtained according to the keyword "hamburger" may be an image used for representing a composition of a hamburger, such as a first bread image used for representing a top of the hamburger, a background image used for representing a middle of the hamburger, or a second bread image used for representing a bottom of the hamburger. Then, the first bread image, the background image, and the second bread image may be sequentially filled into the top region, the middle region, and the bottom region, to obtain a message presentation template, as shown in FIG. 7C. It can be learned that in this embodiment of this application, a style of the message presentation template may be configured according to the message content of the plurality of session messages, so that the message presentation template may dynamically respond to various operation scenarios. For example, for an operation scenario of happy birthday, the style of the message presentation template may be visually expressed as a cake layer. For an operation scenario promoted by a target enterprise, the style of the message presentation template may reveal related information of the target enterprise. In addition, in this embodiment of this application, in the manner of generating the message presentation template by filling each region in the system template with the image, the versatility of the system template can be effectively improved.

After the message presentation template is obtained, the plurality of session messages may be filled into the middle region of the message presentation template, to obtain an image message; and the image message is added to the target session message.

Figure 7D:
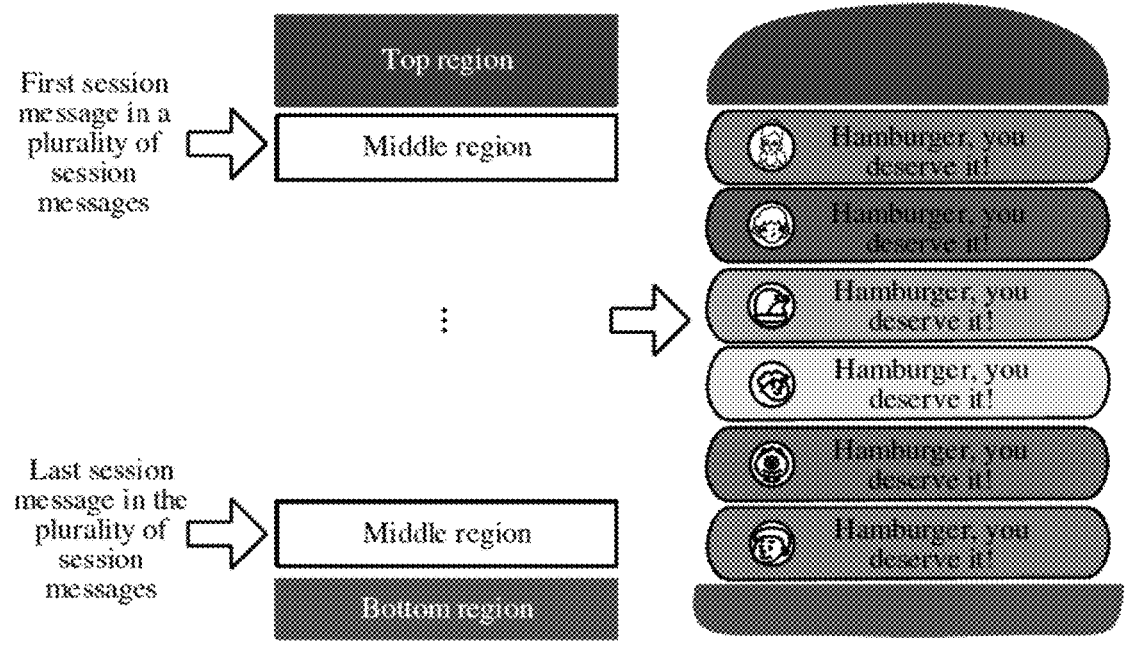
FIG. 7D is an example schematic diagram of filling session messages into a message presentation template according to an embodiment of this application.

In some embodiments, the social network client may fill the plurality of session messages into the middle region of the message presentation template in the following manners, to obtain an image message:

sequentially filling the plurality of session messages into the middle region of the message presentation template in chronological order of the message reception times, to obtain an image message. An example in which the message presentation template shown in FIG. 7C is used. For a schematic diagram of filling each session message, refer to FIG. 7D. In this implementation, the target session message may include only the image message.

In some embodiments, the social network client may further fill the plurality of session messages into the middle region of the message presentation template in the following manners, to obtain an image message.

Figure 7E:
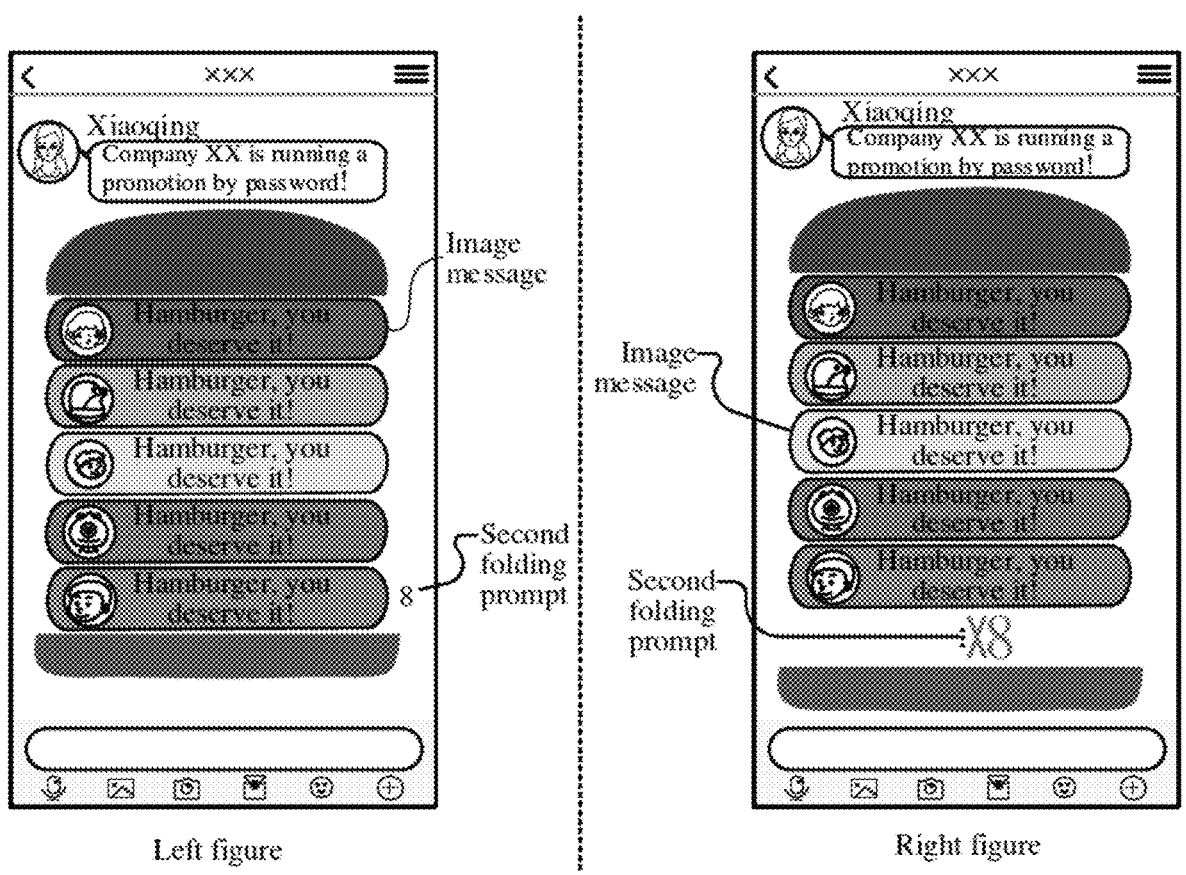
FIG. 7E is an example schematic diagram of a target session message including an image message and a second folding prompt according to an embodiment of this application.

When there is a relatively large quantity of the plurality of continuous and repeated session messages, a part of session messages may be further selected from the plurality of session messages and are add to the image message, and folding display is performed on unselected session messages in the plurality of session messages, to reduce a display area of the image message. During actual implementation, the social network client may first sequentially select a preset quantity of session messages from the plurality of session messages in chronological order of message reception times; and then fill the selected session messages into the middle region of the message presentation template, to obtain an image message. In this implementation, the target session message may include only the image message. In this implementation, the social network client may further fold unselected session messages in the plurality of session messages, to obtain a second folding prompt; and add the second folding prompt to the target session message. That is, the target session message in this implementation may include the image message and the second folding prompt. The message presentation template shown in FIG. 7C is still used as an example, and a preset quantity is 5. If the quantity of the plurality of session messages is 13, for a schematic diagram of a target session message in this implementation, refer to two figures in FIG. 7E. A manner of obtaining the second folding prompt is similar to the manner of obtaining the first folding prompt. Therefore, for an implementation of how to fold unselected session messages in the plurality of session messages, to obtain a second folding prompt, refer to the related description of step s12 in the foregoing method embodiment, and details are not described herein again. In addition, FIG. 7E only exemplarily represents a display form of the second folding prompt, which is not limited. For the display form of the second folding prompt, refer to the display form of the folding message or the folding identifier shown in FIG. 3A to FIG. 3F.

In an actual application, the social network client may further select one implementation from the foregoing two implementations according to the message type of the plurality of session messages to complete the message filling of the plurality of session messages. When the message type of the plurality of session messages is the first type, one implementation may be selected from the foregoing two implementations to complete the filling of the plurality of session messages. When the message type of the plurality of session messages is the second type, it can be learned from the above that in this embodiment of this application, a plurality of types of keywords, such as a blessing type of a keyword and a keyword of an enterprise promotion type, may be set. Correspondingly, the second type may also be subdivided into the following types according to different types of the keywords: a blessing message type, a promotion message type, and the like, where message content of a session message corresponding to the blessing message type includes a keyword of a blessing type; and message content of a session message corresponding to the promotion message type includes a keyword of an enterprise promotion type. Based on this, when the message type of the plurality of session messages is the second type, the social network client may further select different implementations for different second types to complete the filling of the plurality of session messages. During actual implementation, a type of the second type may be first recognized according to the type of the keyword included in the message content of the plurality of session messages. If the second type is the blessing message type, because the blessing may bring a pleasant feeling to the user, an implementation 1 may be selected to complete the filling of the plurality of session messages. That is, the plurality of session messages may be directly and wholly filled into the middle region of the message presentation template, to obtain an image message, so that the master state user may view all continuous and repeated session messages through the image message. If the second type is the promotion message type, because the promotion effect can generally be achieved when a specific quantity of session messages are displayed continuously and repeatedly in the session interface, an implementation 2 is selected to complete the filling of the plurality of session messages. That is, a preset quantity of session messages may be selected from the plurality of session messages and are filled into the middle region of the message presentation template, to obtain an image message. In this way, the promotion effect can be achieved, and the screen swiping effect caused by displaying the plurality of continuous and repeated messages can also be avoided.

S606. Replace the plurality of continuous and repeated session messages in the message set with the target session message, and display a replaced message set in the session interface of the target session.

Figure 7F:
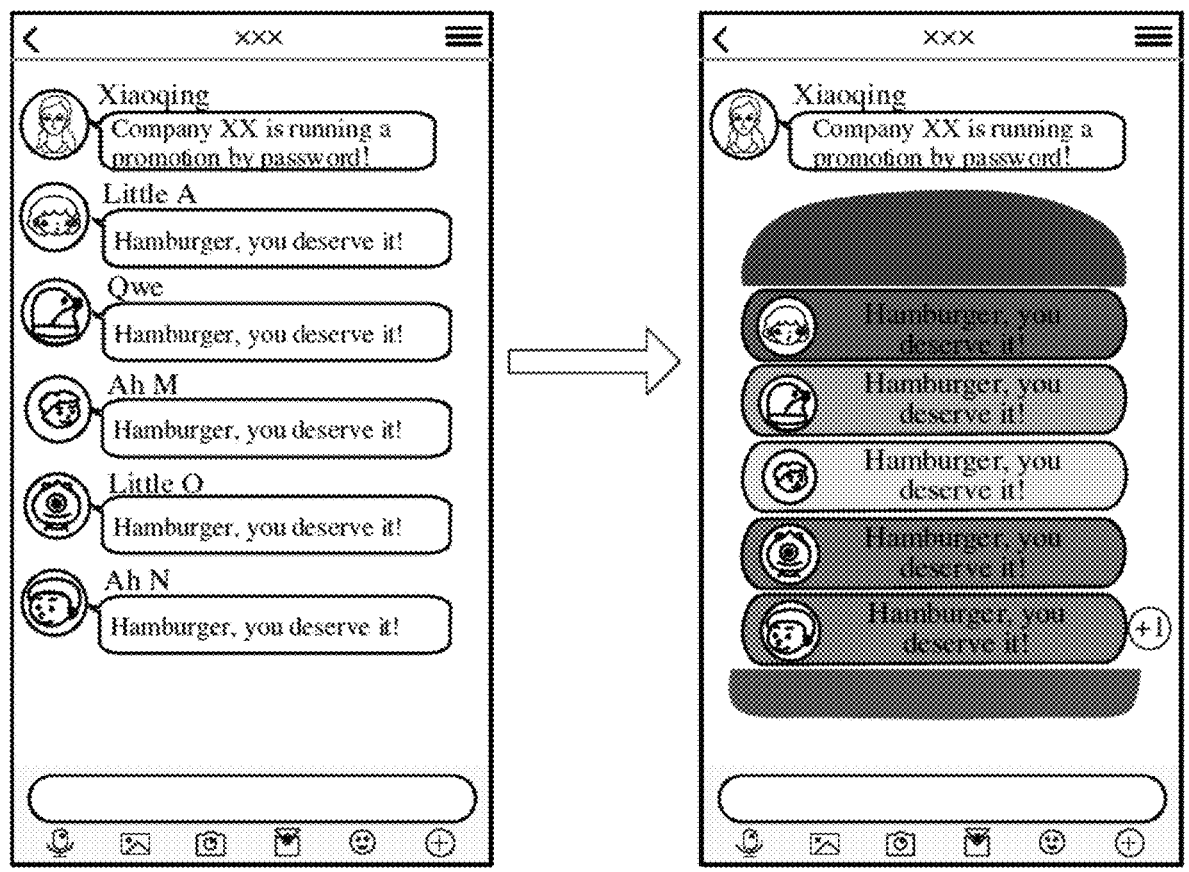
FIG. 7F is an example schematic display diagram of a target session message including an image message according to an embodiment of this application.
Figure 7G:
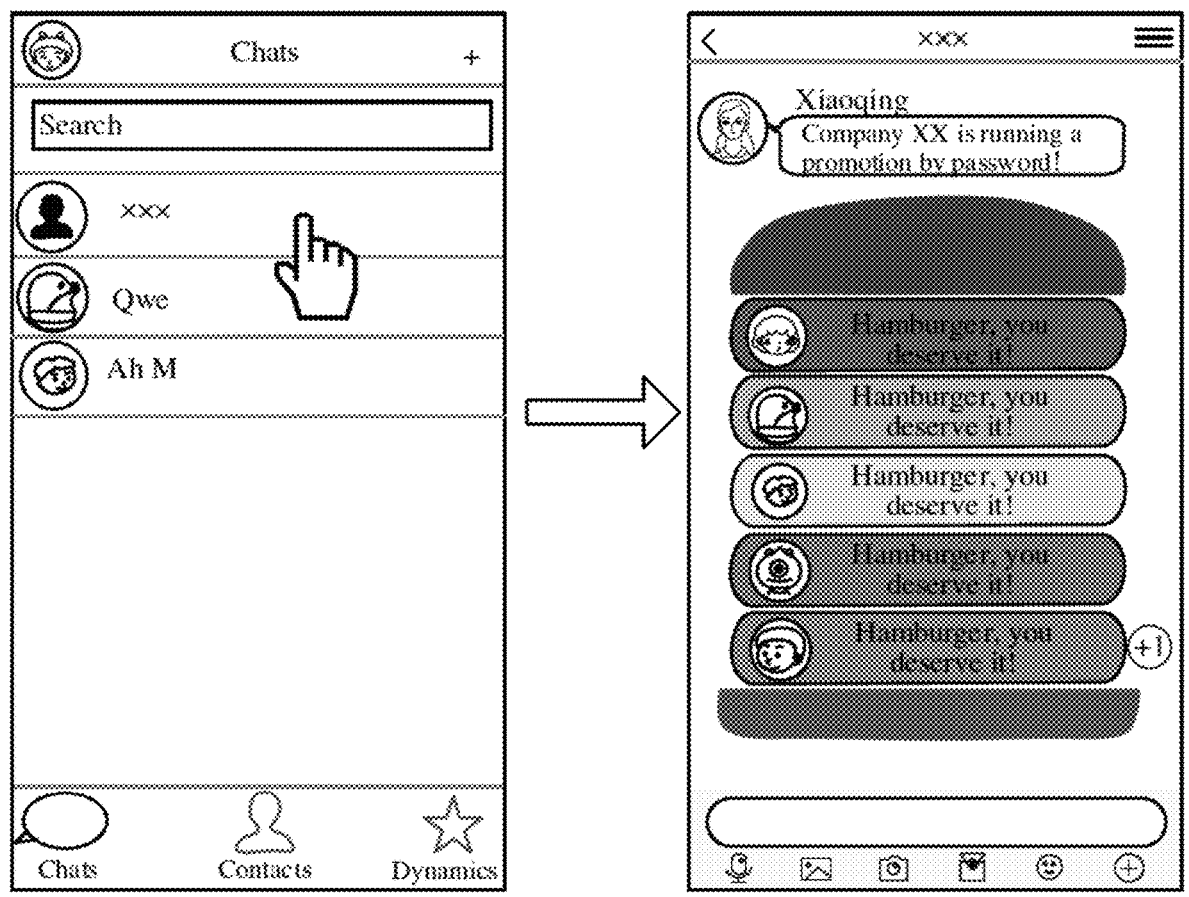
FIG. 7G is an example schematic display diagram of a target session message including an image message according to an embodiment of this application.

After the target session message is obtained, the target session message may be displayed in the session interface. It can be learned from the above that, the target session message herein may include: the image message, or the image message and the second folding prompt. Because the message set of the target session is obtained in real time, the session messages included in the message set may be updated in real time. Therefore, in an application scenario, in the process of sequentially displaying the messages in the message set in the session interface, if the social network client detects that the plurality of continuous and repeated session messages exist in the message set and obtains the target session message according to the plurality of session messages, the social network client may directly perform step S606, so that the plurality of continuous and repeated session messages in the session interface may be directly replaced with the target session message. An example in which the target session message includes only the image message, and the keyword included in the message content of the plurality of session messages is "hamburger" is used. For a schematic diagram of displaying the target session message corresponding to the keyword, refer to FIG. 7F. In another application scenario, before displaying the session interface, if the social network client has detected that the plurality of continuous and repeated session messages exist in the message set and obtains the target session message according to the plurality of session messages, the social network client may directly display the target session message after displaying the session interface. An example in which the target session message includes only the image message, and the keyword included in the message content of the plurality of session messages is "hamburger" is still used. For a schematic diagram of displaying the target session message corresponding to the keyword, refer to FIG. 7G. It can be learned that in this embodiment of this application, in a case that the plurality of continuous and repeated session messages exist in the message set, the message content of the plurality of session messages may be recombined for visual repainting. By presenting a more visually expressive image message in the session interface, the interactive atmosphere of the target session can be effectively improved, and the users in the target session can be stimulated to add a boost to the plurality of continuous and repeated session messages, thereby increasing the activity of the target session.

Figure 7H:
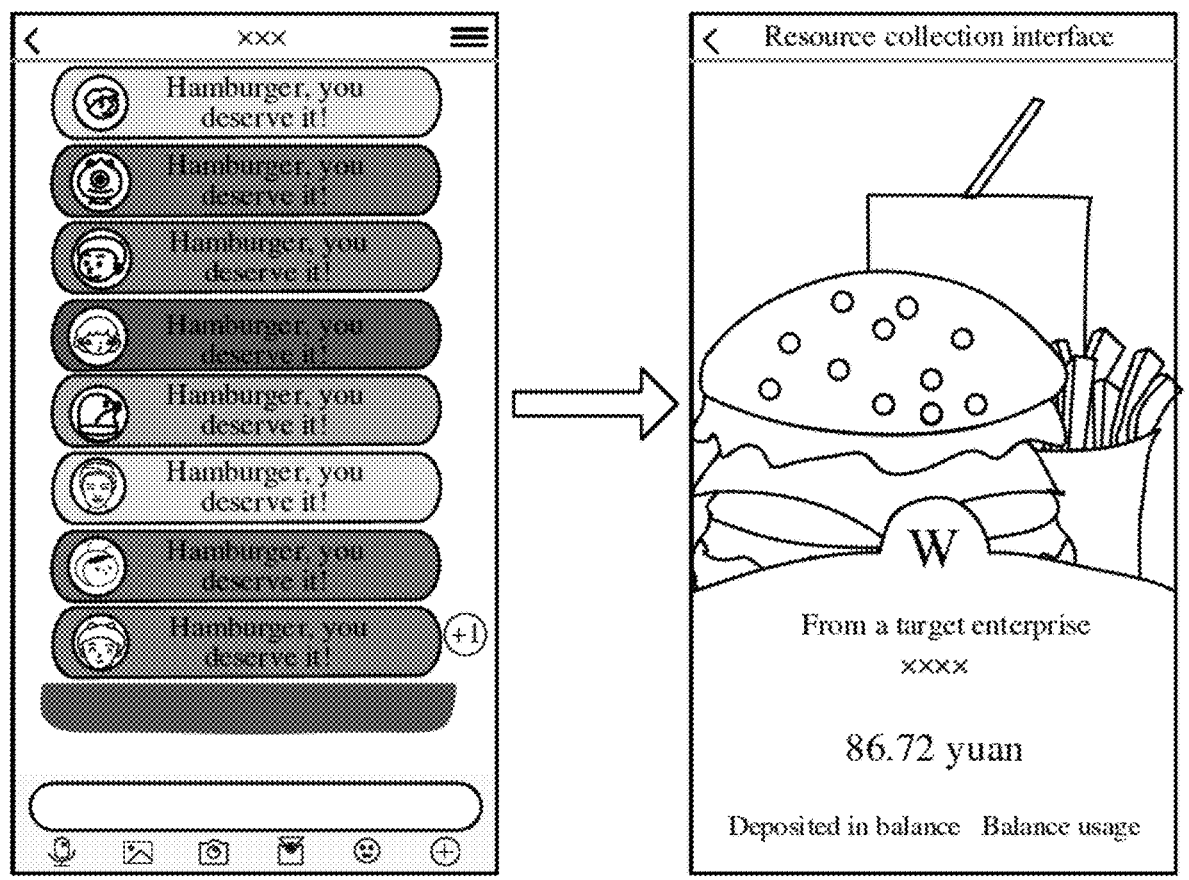
FIG. 7H is an example schematic diagram of switching from a session interface to a resource collection interface according to an embodiment of this application.

In an implementation, to better stimulate the users in the target session to add a boost to the plurality of continuous and repeated session messages, and increase the activity of the target session, a message egg reward may be further set in this embodiment of this application, so that when the quantity of the continuous and repeated session messages is greater than the quantity threshold, the message transmission user corresponding to each session message in the plurality of session messages may obtain a corresponding resource reward. Based on this, for the master state user, in a case that the plurality of session messages include a session message transmitted by a master state user, in a case that the quantity of the plurality of session messages is greater than the quantity threshold, the social network client may further obtain an electronic resource collection amount corresponding to the master state user, the electronic resource collection amount being calculated according to a total amount of electronic resources issued by a resource issuing user for the plurality of session messages. The resource issuing user herein may be any user. For example, if the message type of the plurality of session messages is the blessing message type, the resource issuing user may be a blessed target user in the target session. In another example, if the message type of the plurality of session messages is the promotion message type, the resource issuing user may be a target enterprise. After obtaining an electronic resource collection amount, the social network client may switch from the session interface to a resource collection interface, and display the electronic resource collection amount and a user identifier of the resource issuing user in the resource collection interface. An example in which the message type of the plurality of continuous and repeated session messages is the promotion message type, and the resource issuing user is the target enterprise is used. For a schematic diagram of switching from the session interface to the resource collection interface, refer to FIG. 7H.

Figure 7I:
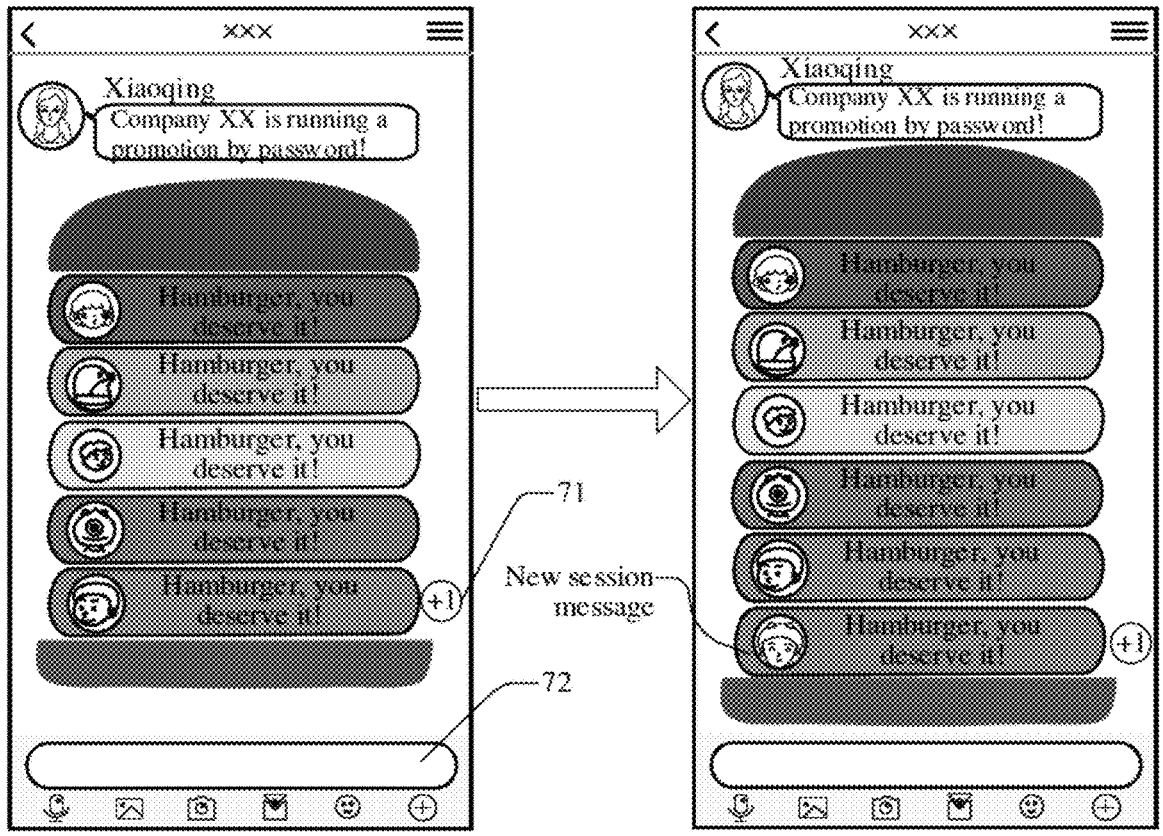
FIG. 7I is an example schematic diagram of displaying a new session message in an image message included in a target session message according to an embodiment of this application.
Figure 7J:
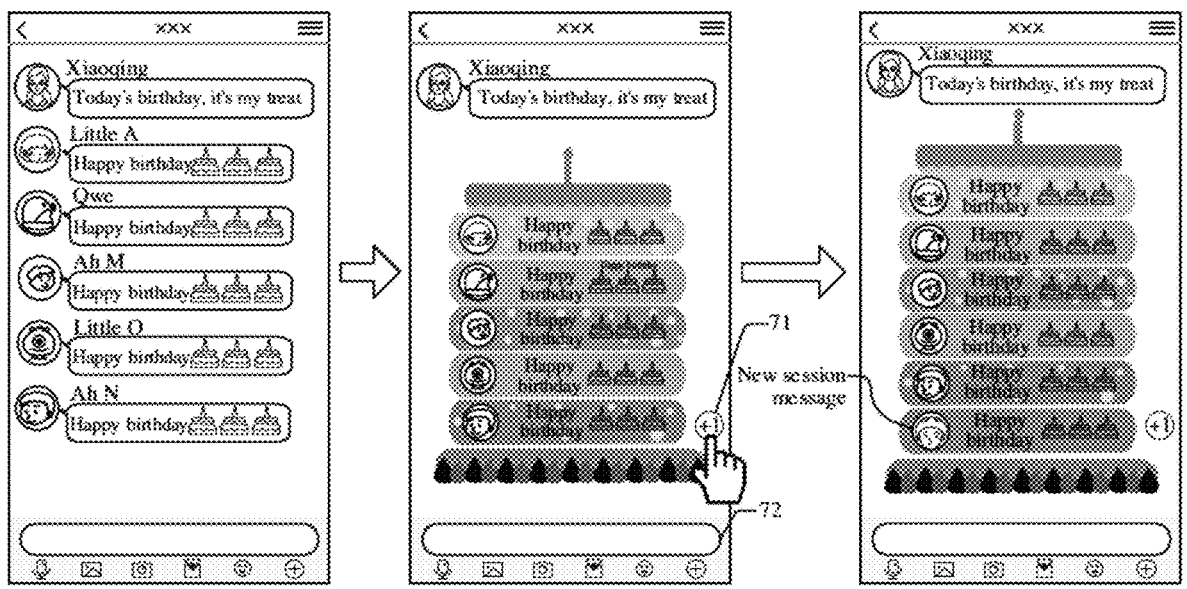
FIG. 7J is an example schematic diagram of displaying a new session message in an image message included in a target session message according to an embodiment of this application.

In an implementation, to help the master state user quickly and conveniently add a boost to the plurality of continuous and repeated session messages, the social network client may further display a message sending button 71 at a display position of the image message. If the social network client detects a trigger operation performed by the master state user for the message sending button 71, the plurality of session messages may be copied to obtain a new session message, and the new session message may be directly displayed in the image message; or if the image message already includes the preset quantity of the session messages, the second folding prompt may be updated with the new session message to implement the folding display on the new session message. For this update manner, refer to the update manner of the first folding prompt mentioned above, and details are not described herein again. An example in which the new session message is directly displayed in the image message is used. Assuming that the plurality of session messages are "hamburger, you deserve it!", the master state user may trigger, by clicking the message sending button 71, the social network client to send a new session message with message content "hamburger, you deserve it!". In this case, the new session message may be displayed in the image message, as shown in FIG. 7I. In another example, assuming that the plurality of session messages are "happy birthday [cake] [cake] [cake]", the master state user may trigger, by clicking the message sending button 71, the social network client to send a new session message with message content "happy birthday [cake] [cake] [cake]". In this case, the new session message may be displayed in the image message, as shown in FIG. 7J. The master state user may alternatively manually input the message content in a message input region 72 in the session interface. In this case, the social network client may obtain the message content inputted by the master state user in the message input region, and generate a new session message according to the obtained message content; and if the obtained message content is the same as the message content of the plurality of session messages, the new session message is displayed in the image message.

Figure 7K:
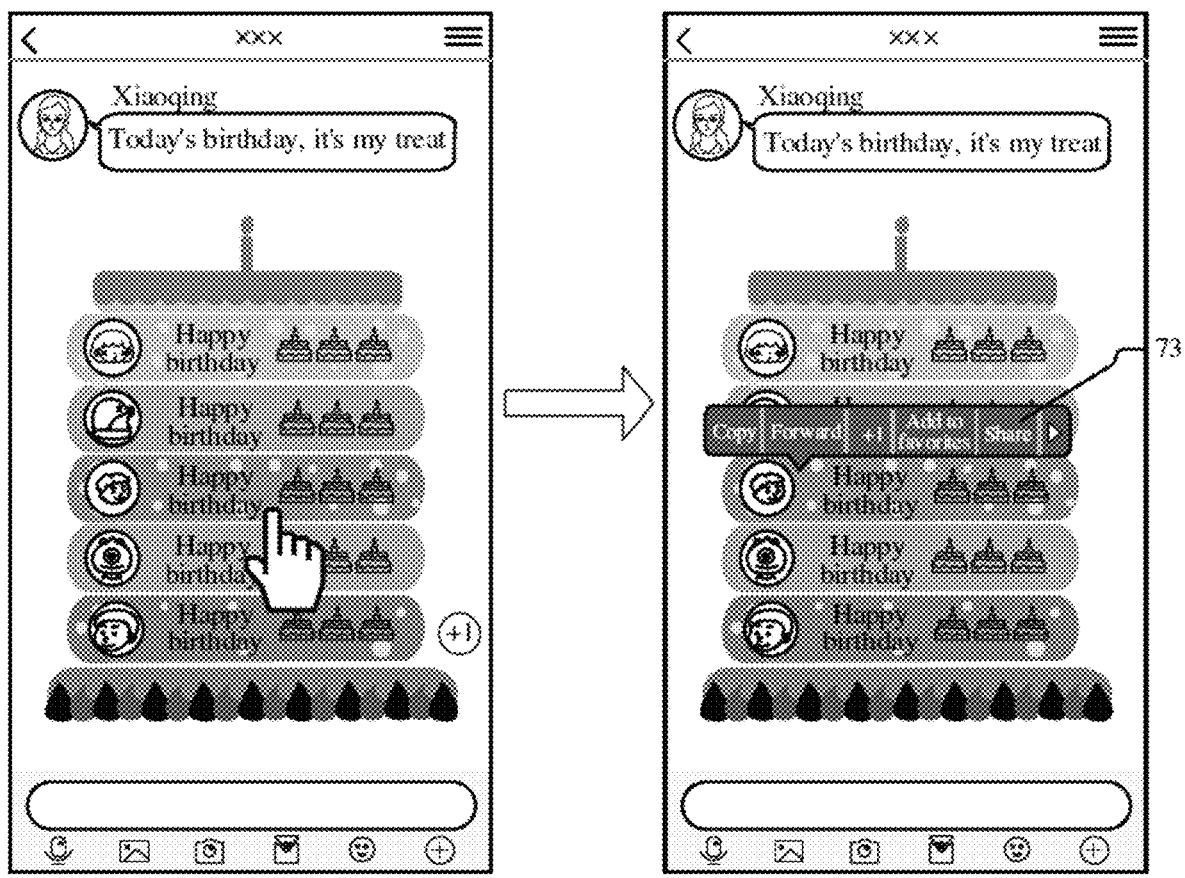
FIG. 7K is an example schematic diagram of outputting a message sharing button according to an embodiment of this application.
Figure 7L:
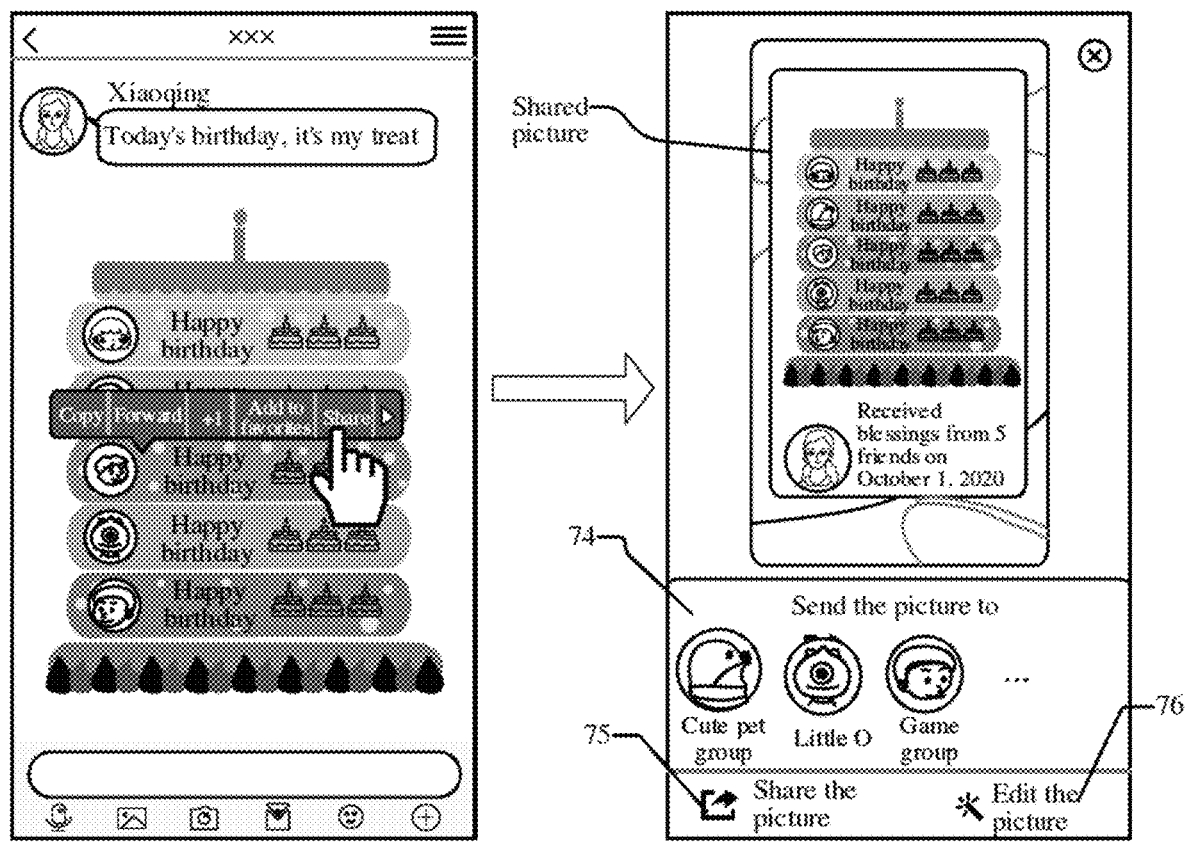
FIG. 7L is an example schematic diagram of switching from a session interface to a sharing interface according to an embodiment of this application.

In another implementation, when the target session message includes the image message or includes the image message and the second folding prompt, the social network client may further support the target session message to be shared with other users in the form of a picture. In an actual application, if intending to share the target session message with other users in the form of the picture, the master state user may perform a sharing operation on the target session message. Correspondingly, in a case that a sharing operation for the target session message is detected, the social network client may generate a shared picture according to the target session message. The sharing operation may include any of the following: an operation detected used for indicating to share a user voice of the target session message, or an operation detected that a physical button in a terminal is long-pressed, or a click or press operation detected on a message sharing button 73 for the target session message. The message sharing button 73 herein is outputted to the session interface when the social network client detects that the target session message is triggered, as shown in FIG. 7K. In an implementation, the social network client may directly generate a shared picture by using the target session message. In another implementation, if the message type of the plurality of session messages is the second type, and the second type is the blessing message type, the social network client may first obtain a user identifier of a blessed target user when generating a shared picture according to the target session message; and then generate the shared picture according to the user identifier of the target user and the image message. After the shared picture is generated, the session interface may be switched to a sharing interface, and the shared picture is displayed in the sharing interface, as shown in FIG. 7L. Referring to FIG. 7L, the sharing interface may further include a user selection region 74, a picture sharing button 75, and a picture editing button 76. The master state user may select, from the user selection region 74, a user who receives the shared picture, and then click the picture sharing button 75 to trigger the social network client to send the shared picture to the user selected by the master state user. Alternatively, the master state user may also edit the shared picture through the picture editing button 76, and send the edited shared picture to other users.

In this embodiment of this application, in a case that a plurality of continuous and repeated session messages exist in the message set of the target session, the image message may be generated according to the plurality of session messages and the image matching the plurality of session messages; and the plurality of continuous and repeated session messages in the message set are replaced with the image message in the session interface. In this way, the display form of the plurality of continuous and repeated session messages can be enriched, the uninteresting screen swiping effect caused by directly displaying the plurality of session messages can be effectively reduced, the message display manner of the social network client can be enriched, and the user viscosity of the social network client can be effectively improved.

Figure 8A:
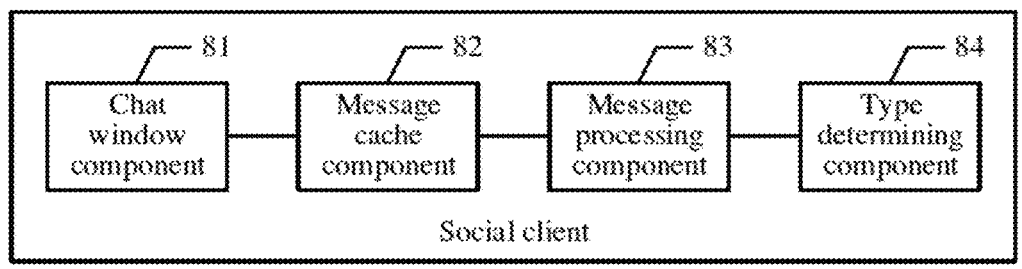
FIG. 8A is an example schematic structural diagram of a social network client according to an embodiment of this application.

Based on the related description of the foregoing method embodiments, to enable the social network client to better perform the message display method shown in FIG. 2 and FIG. 6, the embodiments of this application further provide a social network client shown in FIG. 8A. Referring to FIG. 8A, the social network client in this embodiment of this application may at least include the following functional components: a chat window component 81, a message cache component 82, a message processing component 83, and the like. The chat window component 81 is a component that may interact with the user, record each message in a session, and draw and display a session interface. In an implementation, the chat window component 81 may be a public chat window component (all in one, AIO). The AIO is a chat window component shared by different sessions. The social network client 81 may regard all behavior habits such as an input operation and a click operation of the user detected by the AIO in different sessions as consistent, thereby providing a unified interactive experience for the user. The message cache component 82 is a component that may read each message of the target session from the chat window component, and cache the read message. The message processing component 83 is a component formed by an abstract model with a repeated message processor, is mainly configured to use each message cached in the message cache component 82 as an input, performs partial folding or combination processing on a plurality of continuous and repeated session messages through internal operations, and replaces an original plurality of continuous and repeated session messages with a target session message generated through folding or combination processing, so that the chat window component 81 displays a locally generated target session message in a session interface.

Compared with a common social network client, in this embodiment of this application, an abstract model with a repeated message processor is added, and the abstract model is built in the social network client as a message processing component 83. Therefore, there is no need to modify code logic of the message cache component 82 in the server and the social network client, but it only needs to extend code logic for presenting a target session message at a user interface (UI) layer, so that a function that the social network client detects the plurality of continuous and repeated session messages, and folds or combines the plurality of continuous and repeated session messages for display can be implemented. It can be learned that in this embodiment of this application, the message processing component 83 is added to the social network client to fold or combine the session messages for display, to reduce the modification of the code logic to some extent, and effectively save labor costs.

Figure 8B:
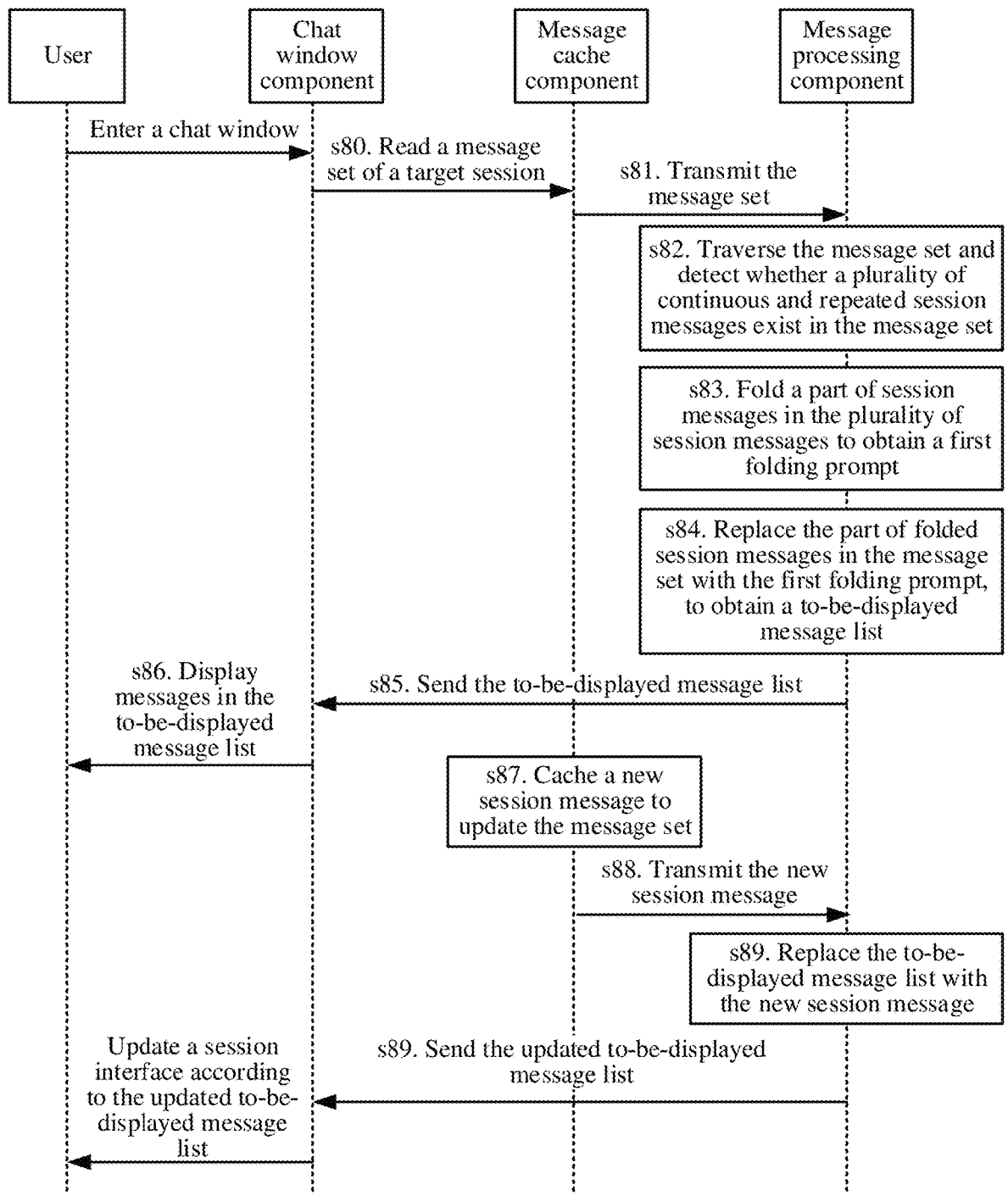
FIG. 8B is an example schematic flowchart of a message display method according to an embodiment of this application.

Based on the social network client shown in FIG. 8A and the message display method shown in FIG. 2 and FIG. 6, a working procedure of each functional component in the social network client is exemplarily explained below with reference to the schematic diagram of the method shown in FIG. 8B.

When intending to view a session message of a target session, the user may open the session interface of the target session to enter the chat window. Correspondingly, if detecting an opening operation performed by the user for the session interface of the target session, the social network client may invoke the internal message cache component 82 through step s80 to read a message set of the target session from the chat window component 81. Each message in the message set is pushed to the chat window component 81 by the server. Then, the social network client may transfer the message set as an input to the message processing component 83 through step s81. After receiving the message set, the message processing component 83 may traverse the message set through step s82 and detect whether a plurality of continuous and repeated session messages exist in the message set. During actual implementation, whether continuous and repeated N or more session messages exist in the message set may be detected. A value of N may be set according to an experience value or a service requirement. For example, N=5 may be set. If the continuous and repeated N or more session messages exist, it may be determined that the plurality of continuous and repeated session messages exist in the message set. In this case, the part of session messages in the plurality of session messages may be folded through step s83 to obtain a first folding prompt. Then, through step s84, the part of folded session messages in the message set are replaced with the first folding prompt, to obtain a to-be-displayed message list; and the to-be-displayed message list is sent to the chat window component 81 through step s85. Correspondingly, the chat window component 81 may sequentially traverse and display messages in the to-be-displayed message list in the session interface through step s86; and if a first folding prompt in the to-be-displayed message list is traversed, this message is displayed in a style of the folding prompt.

If the target session receives a new session message, the social network client may first cache the new session message in the message set through the message cache component 82 in step s87 to update the message set, to ensure that the message set cached by the message cache component 82 completely includes all the messages of the target session. Then, in step s88, the new session message is transmitted to the message processing component 83 through the message cache component 82. Correspondingly, after receiving the new session message, the message processing component 83 may update the to-be-displayed message list with the new session message in step s89, and send the updated to-be-displayed message list to the chat window component 81, so that the chat window component 81 perform UI updating on the session interface according to the updated to-be-displayed message list. An implementation for updating the to-be-displayed message list with the new session message may be: if a last message other than a system prompt message in the to-be-displayed message list is a first folding prompt, detecting whether the new session message is repeated with the folded session message; if the new session message is repeated, updating the first folding prompt with the new session message to update the to-be-displayed message list; and if the new session message is not repeated, adding the new session message to an end of the to-be-displayed message list to update the to-be-displayed message list. If the last message other than the system prompt message in the to-be-displayed message list is a session message, whether there are continuous (N−1) session messages repeated with the new session message is detected in the to-be-displayed message list in reverse chronological order. If yes, a part of session messages in the (N−1) session messages and the new session message are folded, to obtain a first folding prompt, and the first folding prompt is added to the to-be-displayed message list to update the to-be-displayed message list. If not, the new session message is added to the end of the to-be-displayed message list to update the to-be-displayed message list.

Figure 8C:
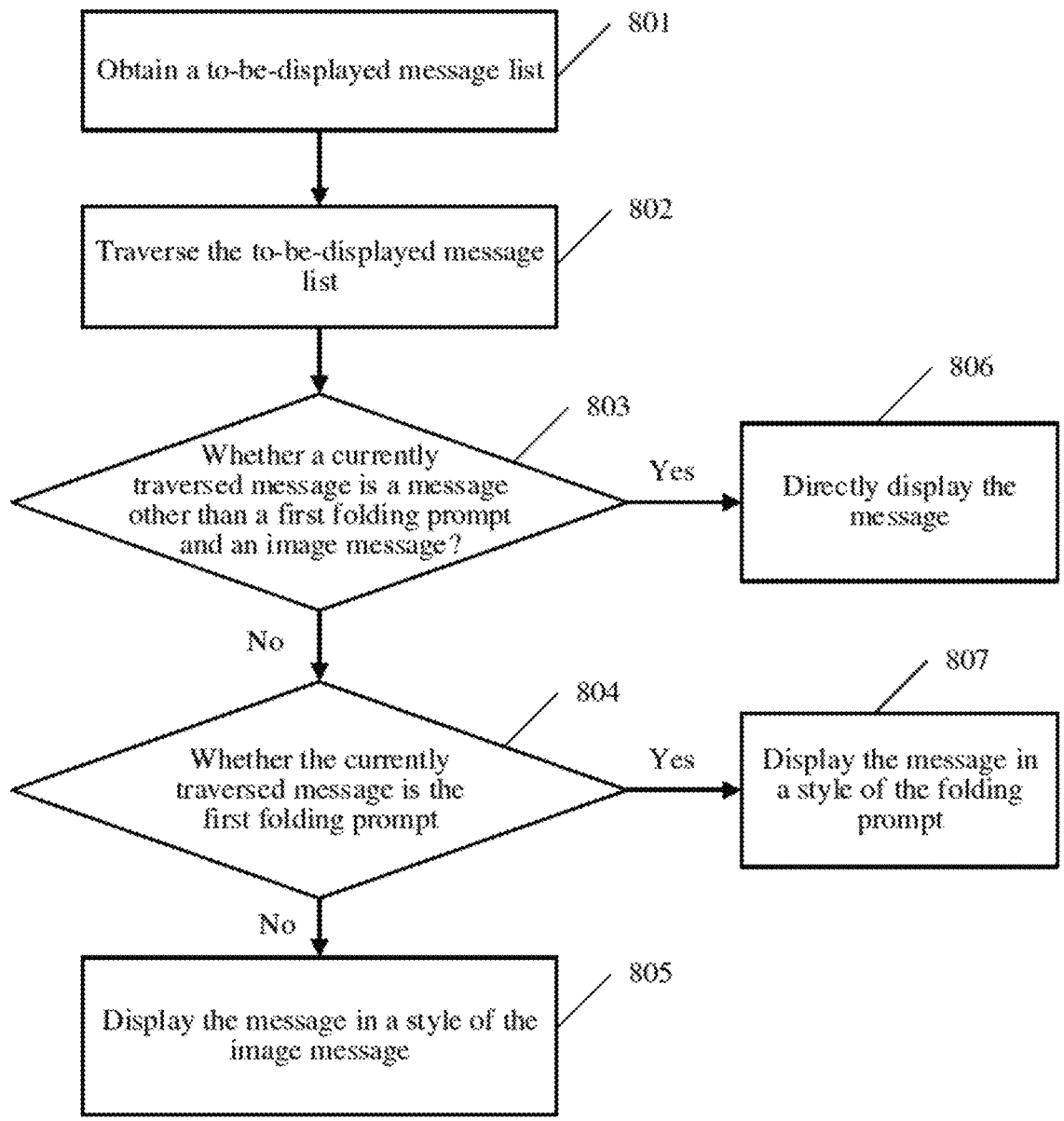
FIG. 8C is an example schematic diagram of message display logic according to an embodiment of this application.

In another embodiment, it can be learned from the message display method shown in FIG. 6 that the social network client may further detect a message type of the plurality of session messages. Based on this, in this embodiment of this application, a type determining component 84 may be further built in the social network client. In this case, if the message processing component 83 detects through step s83 that a plurality of continuous and repeated session messages exist in the message set, the message processing component 83 may send the plurality of session messages to the type determining component 84. Correspondingly, after receiving the plurality of session messages, the type determining component 84 may determine the message type of the plurality of session messages in a manner of matching a keyword, where the message type may include a first type or a second type; and then feed the message type of the plurality of session messages back to the message processing component 82. If the message type is a first type, steps s83 to steps s85 may be performed. If the message type is the second type, an image message may be generated according to the plurality of session messages. An example in which the image message includes all the continuous and repeated session messages is used herein for description. Next, the plurality of continuous and repeated session messages in the message set may be replaced with the image message to obtain a to-be-displayed message list. Then, the to-be-displayed message list is sent to the chat window component 81 through step s86. In this case, the chat window component 81 may sequentially traverse and display messages in the to-be-displayed message list in the session interface by using the display logic shown in FIG. 8C. During actual implementation, referring to FIG. 8C, the displaying, by the chat window component 81, messages in the to-be-displayed message list may include steps:

Step 801: Obtain a to-be-displayed message list.

Step 802: Traverse the to-be-displayed message list.

Step 803: Determine whether a currently traversed message is a message other than a first folding prompt and an image message, and if not, perform step 804; otherwise, perform step 806.

Step 804: Determine whether the currently traversed message is the first folding prompt, and if not, perform step 805; otherwise, perform step 807.

Step 805: Display the message in a style of the image message.

Step 806: Directly display the message.

Step 807: Display the message in a style of the folding prompt.

It can be learned that according to the message display logic in this embodiment of this application, when continuous and repeated session messages exist in the target session, and a quantity of the continuous and repeated session messages reaches a preset quantity (N pieces), by displaying a part of the continuous and repeated session messages, not only the complete display of message content of the session message is ensured, but also another part of the continuous and repeated session messages are automatically folded, and one first folding prompt is inserted into the session interface for display. In this way, the uninteresting screen swiping effect in the session interface can be effectively reduced, thereby reducing a phenomenon that the user misses important session messages, and effectively improving the user viscosity of the social network client.

Figure 9:
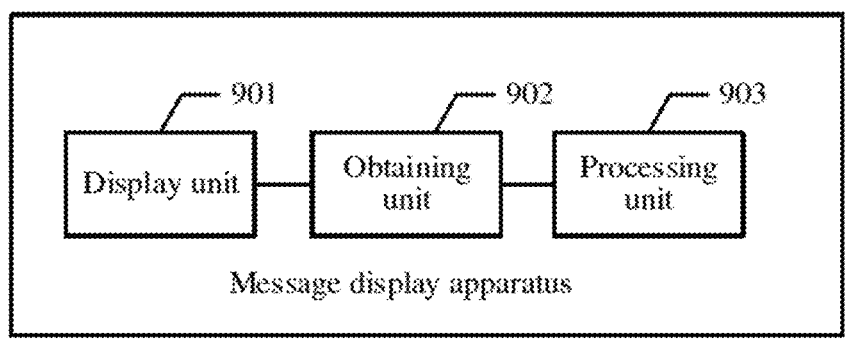
FIG. 9 is an example schematic structural diagram of a message display apparatus according to an embodiment of this application.

Based on the foregoing description of the embodiments of the message display method, the embodiments of this application further provide a message display apparatus. The message display apparatus may be a computer program (including program code) run on a terminal. The message display apparatus may perform the method shown in FIG. 2 or FIG. 6. Referring to FIG. 9, the message display apparatus may operate the following units:

a display unit 901, configured to display a session interface of a target session; and an obtaining unit 902, configured to obtain a message set of the target session, the display unit 901 being further configured to, in a case that a plurality of continuous and repeated session messages exist in the message set, obtain a target session message according to the plurality of session messages; and the display unit 901 being further configured to replace the plurality of continuous and repeated session messages in the message set with the target session message, and display a replaced message set in the session interface of the target session.

In an implementation, the display unit 901 may be configured to: select a reference session message from the plurality of session messages when obtaining a target session message according to the plurality of session messages;

fold remaining session messages other than the reference session message in the plurality of session messages, to obtain a first folding prompt; and form the target session message by using the reference session message and the first folding prompt.

In another implementation, each session message in the message set has a message reception time. Correspondingly, when selecting a reference session message from the plurality of session messages, the display unit 901 may be configured to: select a session message with an earliest message reception time as the reference session message from the plurality of session messages; or sequentially select a preset quantity of session messages as the reference session messages from the plurality of session messages in chronological order of message reception times.

In another implementation, when selecting a reference session message from the plurality of session messages, the display unit 901 is configured to, in a case that there is a session message transmitted by a master state user in the plurality of session messages, use the session message transmitted by the master state user as the reference session message, the target session being established by a social network client, the master state user being a user corresponding to a social account that logs in to the social network client.

In another implementation, the first folding prompt includes a folding identifier. Correspondingly, when folding remaining session messages other than the reference session message in the plurality of session messages, to obtain a first folding prompt, the display unit 901 is configured to: determine a remaining quantity of the remaining session messages other than the reference session message in the plurality of session messages; and generate a folding identifier according to the remaining quantity of the remaining session messages.

In another implementation, the first folding prompt includes a folding message. Correspondingly, when folding remaining session messages other than the reference session message in the plurality of session messages, to obtain a first folding prompt, the display unit 901 is configured to: generate prompt content according to the remaining quantity of the remaining session messages other than the reference session message in the plurality of session messages, and message content of the remaining session messages, the prompt content being used for prompting that there are a remaining quantity of users who continuously transmit the message content, or being used for prompting that there are a remaining quantity of continuous messages that include the message content;

obtain user identifiers of message transmission users corresponding to the remaining session messages, the user identifier including at least one of the following: a user name and a user mark image; and generate a folding message according to the obtained user identifiers and the prompt content.

In another implementation, the folding message includes a message link for triggering display of the remaining messages. Correspondingly, the display unit 901 may be further configured to:

in a case that the message link in the folding message is triggered, display the remaining session messages and user identifiers of corresponding message transmission users in the session interface; or in a case that the message link in the folding message is triggered, output a message display window in the session interface, and display the remaining session messages and user identifiers of corresponding message transmission users in the message display window.

In another implementation, the target session message includes an image message, and the image message is a message generated according to the plurality of session messages and an image matching message content of the plurality of session messages. Correspondingly, when obtaining a target session message according to the plurality of session messages, the display unit 901 is configured to: obtain a message presentation template matching the message content of the plurality of session messages, the message presentation template including the following three regions: a top region, a middle region, and a bottom region, and an image matching the message content being displayed in each region;

fill the plurality of session messages into the middle region of the message presentation template, to obtain an image message; and add the image message to the target session message.

In another implementation, each session message in the message set has a message reception time. Correspondingly, when filling the plurality of session messages into the middle region of the message presentation template, to obtain an image message, the display unit 901 is configured to: sequentially select a preset quantity of session messages from the plurality of session messages in chronological order of message reception times; and fill the selected session messages into the middle region of the message presentation template, to obtain an image message.

Correspondingly, the display unit 901 may be further configured to: fold unselected session messages in the plurality of session messages, to obtain a second folding prompt; and add the second folding prompt to the target session message.

In another implementation, the display unit 901 may be further configured to:

in a case that a sharing operation for the target session message is detected, generate a shared picture according to the target session message; and switch from the session interface to a sharing interface, and display the shared picture in the sharing interface.

In another implementation, the plurality of session messages include a session message transmitted by a master state user. Correspondingly, the obtaining unit 902 may be further configured to: in a case that a quantity of the plurality of session messages is greater than a quantity threshold, obtain an electronic resource collection amount corresponding to the master state user, the electronic resource collection amount being calculated according to a total amount of electronic resources issued by a resource issuing user for the plurality of session messages; and the display unit 901 may be further configured to: switch from the session interface to a resource collection interface, and display the electronic resource collection amount and a user identifier of the resource issuing user in the resource collection interface.

In another implementation, the display unit 901 may be further configured to:

in a case that a selection trigger event for a displayed session message in the session interface is detected, output a message option of each displayed session message in the session interface, the message option being used for selecting the displayed session message;

use a displayed session messages corresponding to a selected message option as a folded session message according to a selection operation for the message option in the session interface; and create, in a case that a selection completion event is detected, a folded message according to the folded session message, and replace the folded session message with the folded message in the session interface for display.

In another implementation, when creating, in a case that a selection completion event is detected, a folded message according to the folded session message, the display unit 901 is configured to: in a case that the selection completion event is detected, output a message name-setting window;

obtain a custom message name set for the folded session message in the message name-setting window; and in a case that a confirmation operation for the custom message name is detected, generate a folded message according to the custom message name and a user identifier of a message transmission user of the folded session message.

In another implementation, the display unit 901 may be further configured to: in a case that the folded message is triggered, output an operation option window for the folded message, the operation option window including at least one of the following operation options: a copy option, a forward option, a reply option, an option of adding to favorites, and a selection option;

The message display apparatus may further include a processing unit 903. The processing unit 903 may be configured to: determine a selected operation option from the operation option window according to a selection operation detected in the operation option window; and perform a corresponding operation on the folded message according to the selected operation option.

In another implementation, the message set includes at least one of the following messages: a session message and a non-session message. Correspondingly, the processing unit 903 may be further configured to:

screen the message set to obtain session messages, and calculate a quantity of continuous and repeated session messages in the obtained session messages;

in a case that the calculated quantity is greater than or equal to a preset quantity, determine that a plurality of continuous and repeated session messages exist in the message set; and in a case that the calculated quantity is less than the preset quantity, determine that the plurality of continuous and repeated session messages do not exist in the message set.

The steps in the methods shown in FIG. 2 or FIG. 6 may all be performed by the units of the message display apparatus shown in FIG. 9. For example, step S201, step S203 and step S204 shown in FIG. 2 may be performed by the display unit 901 shown in FIG. 9, and step S202 may be performed by the obtaining unit 902 shown in FIG. 9. In another example, the step of "displaying a session interface of a target session" in step S601 and step S605 and step S606 shown in FIG. 6 may be performed by the display unit 901 shown in FIG. 9, the step of "obtaining a message set of the target session" in step S601 may be performed by the obtaining unit 902 shown in FIG. 9, and step S602 to step S604 may be performed by the processing unit 903 shown in FIG. 9.

The units of the message display apparatus shown in FIG. 9 may be separately or wholly combined into one or several other units, or one (or more) of the units herein may further be divided into multiple units of smaller functions. In this way, same operations can be implemented, and implementation of the technical effects of the embodiments of this application is not affected. The foregoing units are divided based on logical functions. During actual application, a function of one unit may be implemented by a plurality of units, or functions of a plurality of units are implemented by one unit. In this embodiment of this application, the message display apparatus may also include other units. In an actual application, the functions may also be cooperatively implemented by other units and may be cooperatively implemented by a plurality of units.

According to the embodiments of this application, a computer program (including program code) that can perform the steps in the corresponding method shown in FIG. 2 or FIG. 6 may be run on a general computing device, such as a computer, which includes processing elements and storage elements such as a central processing unit (CPU), a random access memory (RAM), and a read-only memory (ROM), to construct the message display apparatus shown in FIG. 9 and implement the message display method in the embodiments of this application. The computer program may be recorded in, for example, a computer-readable recording medium, and may be loaded into the foregoing computing device by using the computer-readable recording medium, and run in the computing device.

The term unit (and other similar terms such as module, submodule, subunit, etc.) in this disclosure may refer to a software module, a hardware module, or a combination thereof. A software module (e.g., computer program) may be developed using a computer programming language. A hardware module may be implemented using processing circuitry and/or memory. Each module can be implemented using one or more processors (or processors and memory). Likewise, a processor (or processors and memory) can be used to implement one or more modules. Moreover, each module can be part of an overall module that includes the functionalities of the module.

In this embodiment of this application, in a case that a plurality of continuous and repeated session messages exist in the message set of the target session, a target session message may be obtained according to the plurality of session messages; and the plurality of continuous and repeated session messages in the message set are replaced with the target session message, and a replaced message set is then displayed in the session interface of the target session. It can be learned that in the foregoing message display process, the social network client may replace the plurality of continuous and repeated session messages with the target session message in the session interface for display. In this way, the uninteresting screen swiping effect caused by directly displaying the plurality of session messages can be effectively reduced, the message display manner of the social network client can be enriched, and the user viscosity of the social network client can be effectively improved.

Figure 10:
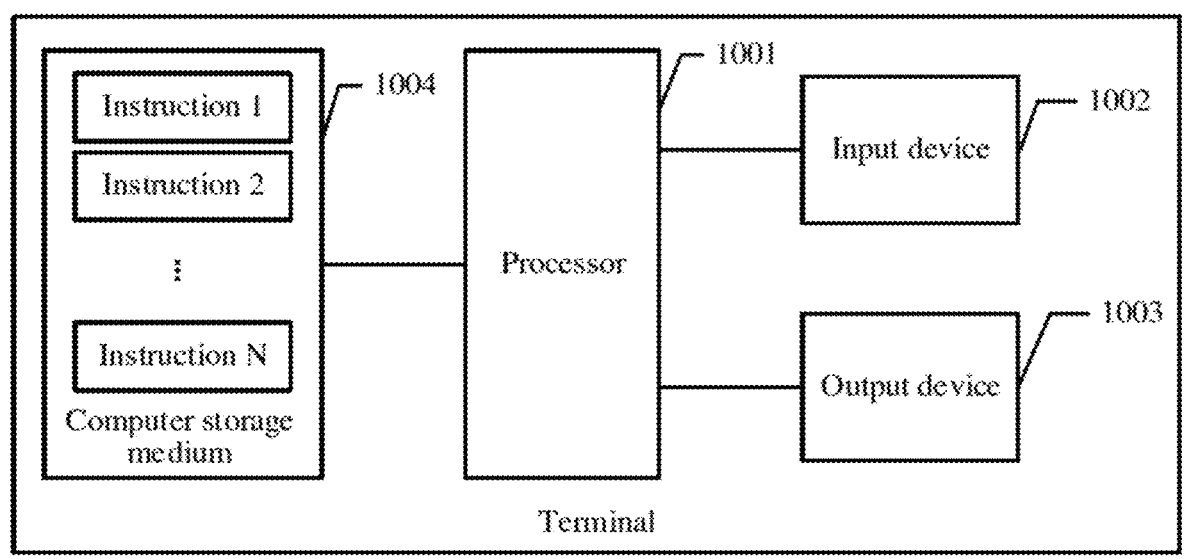
FIG. 10 is an example schematic structural diagram of a terminal according to an embodiment of this application.

Based on the descriptions of the foregoing method embodiments and apparatus embodiments, the embodiments of this application further provide a terminal. Referring to FIG. 10, the terminal at least includes a processor 1001, an input device 1002, an output device 1003, and a computer storage medium 1004. The processor 1001, the input device 1002, the output device 1003, and the computer storage medium 1004 of the terminal may be connected by using a bus or in another manner. In this embodiment of this application, the terminal may further run the social network client mentioned in the foregoing embodiments.

The computer storage medium 1004 may be stored in a memory of the terminal. The computer storage medium 1004 is configured to store a computer program. The computer program includes program instructions. The processor 1001 is configured to execute the program instructions stored in the computer storage medium 1004. The processor 1001 (or referred to as a CPU) is a computing core and control core of the terminal, and is suitable for implementing one or more instructions. For example, the processor loads and executes one or more instructions to implement corresponding method procedures or corresponding functions. In an embodiment, the processor 1001 in this embodiment of this application may be configured to perform a series of message display processing, including: displaying a session interface of a target session, and obtaining a message set of the target session; in a case that a plurality of continuous and repeated session messages exist in the message set, obtaining a target session message according to the plurality of session messages; and replacing the plurality of continuous and repeated session messages in the message set with the target session message, and displaying a replaced message set in the session interface of the target session.

The embodiments of this application further provide a computer storage medium. The computer storage medium is a memory device in a terminal and is configured to store programs and data. For example, the computer storage medium may be used for storing program code instructions for a social network client. The computer storage medium herein may include an internal storage medium of the terminal and may also include an extended storage medium supported by the terminal. The computer storage medium provides storage space, and the storage space stores an operating system of the terminal. In addition, the storage space further stores one or more instructions suitable for being loaded and executed by the processor 1001. The instructions may be one or more computer programs (including program code). The computer storage medium herein may be a high-speed RAM memory, or may be a non-volatile memory, for example, at least one magnetic disk memory. In some example implementations, the computer storage medium may be at least one computer storage medium far away from the foregoing processor.

In an embodiment, the processor 1001 may load and execute one or more instructions about the social network client stored in the computer storage medium, to implement corresponding steps of the methods in the foregoing embodiments related to the message display method. During implementation, the one or more instructions in the computer storage medium are loaded by the processor 1001 to perform the following steps:

displaying a session interface of a target session, and obtaining a message set of the target session;

in a case that a plurality of continuous and repeated session messages exist in the message set, obtaining a target session message according to the plurality of session messages; and replacing the plurality of continuous and repeated session messages in the message set with the target session message, and displaying a replaced message set in the session interface of the target session.

In this embodiment of this application, in a case that a plurality of continuous and repeated session messages exist in the message set of the target session, a target session message may be obtained according to the plurality of session messages; and the plurality of continuous and repeated session messages in the message set are replaced with the target session message, and a replaced message set is then displayed in the session interface of the target session. It can be learned that in the foregoing message display process, the social network client may replace the plurality of continuous and repeated session messages with the target session message in the session interface for display. In this way, the uninteresting screen swiping effect caused by directly displaying the plurality of session messages can be effectively reduced, the message display manner of the social network client can be enriched, and the user viscosity of the social network client can be effectively improved.

What are disclosed above are merely examples of embodiments of this application, and certainly are not intended to limit the protection scope of this application. Therefore, equivalent variations made in accordance with the claims of this application shall fall within the scope of this application.

What is claimed is:

1. A message display method, performed by a terminal, the method comprising:
    displaying a session interface of a target session, and obtaining a message set of the target session;
    determining from the message set a session message set only containing session messages by excluding non-session messages from the message set, the non-session messages comprising system announcement notification messages or system prompt message whereas the session messages comprising user messages;
    in response to that a plurality of continuous and repeated session messages are included in the session message set, obtaining a target session message derived from the plurality of continuous and repeated session messages; and
    replacing the plurality of continuous and repeated session messages identical to one another in the session message set with the target session message, and displaying the target session message in the session interface of the target session with a numerical value of a number of messages and a list of identifiers for senders of the plurality of continuous and repeated session messages in a displayed label for the target session message.

2. The method according to claim 1, wherein obtaining the target session message derived from the plurality of continuous and repeated session messages comprises:
    selecting a reference session message from the plurality of continuous and repeated session messages;
    folding remaining session messages other than the reference session message in the plurality of continuous and repeated session messages to obtain a first folding prompt; and
    forming the target session message by using the reference session message and the first folding prompt.

3. The method according to claim 2, wherein:
    each session message in the session message set is associated with a message reception time, and selecting the reference session message from the plurality of continuous and repeated session messages comprises:
    selecting a session message with an earliest message reception time as the reference session message from the plurality of continuous and repeated session messages; or
    sequentially selecting a preset quantity of session messages as reference session messages from the plurality of continuous and repeated session messages in chronological order of message reception times.

4. The method according to claim 3, wherein selecting the reference session message from the plurality of continuous and repeated session messages further comprises:
    in response to that there is a session message transmitted by a currently active user, using the session message transmitted by the currently active user as the reference session message,
    the target session being established by a social network client, and the currently active user has logged in to the social network client via a social network account.

5. The method according to claim 2, wherein:
    the first folding prompt comprises a folding identifier; and
    folding the remaining session messages other than the reference session message in the plurality of continuous and repeated session messages to obtain a first folding prompt comprises:
    determining a remaining quantity of the remaining session messages other than the reference session message in the plurality of continuous and repeated session messages; and
    generating the folding identifier according to the remaining quantity of the remaining session messages.

6. The method according to claim 2, wherein:
    the first folding prompt comprises a folding message; and
    folding the remaining session messages other than the reference session message in the plurality of continuous and repeated session messages to obtain a first folding prompt comprises:
    generating prompt content according to a remaining quantity of the remaining session messages other than the reference session message in the plurality of continuous and repeated session messages and message content of the remaining session messages, the prompt content being used for prompting that there are a remaining quantity of users who continuously transmit the message content, or being used for prompting that there are a remaining quantity of continuous messages that comprise the message content;
    obtaining user identifiers of message transmission users corresponding to the remaining session messages, the user identifier comprising at least one of a user name and a user image; and
    generating a folding message according to the obtained user identifiers and the prompt content.

7. The method according to claim 6, wherein:
    the folding message comprises a message link for triggering a display of the remaining messages; and
    the method further comprises:
    in response to that the message link in the folding message being triggered, displaying the remaining session messages and user identifiers of corresponding message transmission users in the session interface; or
    in response to that the message link in the folding message being triggered, outputting a message display window in the session interface, and displaying the remaining session messages and user identifiers of corresponding message transmission users in the message display window.

8. The method according to claim 1, further comprising:
    in response to that a selection trigger event for a displayed session message in the session interface is detected, outputting a message option of each displayed session message in the session interface, the message option being used for selecting the displayed session message;
    using a displayed session messages corresponding to a selected message option as a folded session message according to a selection operation for the message option in the session interface; and creating, in response to that a selection completion event is detected, a folded message according to the folded session message, and replacing the folded session message with the folded message in the session interface for display.

9. The method according to claim 8, wherein creating, in response to that a selection completion event is detected, a folded message according to the folded session message comprises:

in response to that the selection completion event is detected, outputting a message name-setting window;

obtaining a custom message name set for the folded session message in the message name-setting window; and in response to that a confirmation operation for the custom message name is detected, generating a folded message according to the custom message name and a user identifier of a message transmission user of the folded session message.

10. The method according to claim 8, further comprising:

in response to that the folded message is triggered, outputting an operation option window for the folded message, the operation option window comprising at least one of a copy option, a forward option, a reply option, an option of adding to favorites, or a selection option;

determining a selected operation option from the operation option window according to a selection operation detected in the operation option window; and performing the selected operation option on the folded message.

11. The method according to claim 1, wherein:

the method further comprises:

calculating a quantity of continuous and repeated session messages in the session message set;

in response to that the calculated quantity is greater than or equal to a preset quantity, determining that the plurality of continuous and repeated session messages exist in the session message set; and in response to that the calculated quantity is less than the preset quantity, determining that the plurality of continuous and repeated session messages do not exist in the session message set.

12. A message display method, performed by a terminal, the method comprising:

displaying a session interface of a target session, and obtaining a message set of the target session;

in response to that a plurality of continuous and repeated session messages identical to one another are included in the message set, obtaining a target session message derived from the plurality of continuous and repeated session messages; and replacing the plurality of continuous and repeated session messages in the message set with the target session message, and displaying the target session message in the session interface of the target session, wherein:

the target session message comprises an image message;

the image message comprises a message generated according to the plurality of continuous and repeated session messages and an image matching message content of the plurality of continuous and repeated session messages; and obtaining the target session message according to the plurality of continuous and repeated session messages comprises:

obtaining a message presentation template matching the message content of the plurality of continuous and repeated session messages, the message presentation template comprising a top region, a middle region, and a bottom region, and an image matching the message content being displayed in each region; and filling the plurality of continuous and repeated session messages into the middle region of the message presentation template, to obtain an image message; and adding the image message to the target session message.

13. The method according to claim 12, wherein:

each session message in the message set is associated with a message reception time;

filling the plurality of continuous and repeated session messages into the middle region of the message presentation template, to obtain an image message comprises:

sequentially selecting a preset quantity of session messages from the plurality of continuous and repeated session messages in chronological order of message reception times; and filling the selected session messages into the middle region of the message presentation template, to obtain an image message; and the method further comprises:

folding unselected session messages in the plurality of continuous and repeated session messages, to obtain a second folding prompt; and adding the second folding prompt to the target session message.

14. The method according to claim 12, further comprising:

in response to that a sharing operation for the target session message is detected, generating a shared picture according to the target session message; and switching from the session interface to a sharing interface, and displaying the shared picture in the sharing interface.

15. The method according to claim 12, wherein:

the plurality of continuous and repeated session messages comprise a session message transmitted by a login user; and the method further comprises:

in response to that a quantity of the plurality of continuous and repeated session messages is greater than a quantity threshold, obtaining an electronic resource collection amount corresponding to the login user, the electronic resource collection amount being calculated according to a total amount of electronic resources issued by a resource management user for the plurality of continuous and repeated session messages; and switching from the session interface to a resource collection interface, and displaying the electronic resource collection amount and a user identifier of the resource management user in the resource collection interface.

16. A message display terminal, comprising a memory for storing computer instructions, and a processor in communication with the memory, the processor being configured to executed the computer instructions to:

display a session interface of a target session;

obtain a message set of the target session;

determining from the message set a session message set only containing session messages by excluding non-session messages from the message set, the non-session messages comprising system announcement notification messages or system prompt message whereas the session messages comprising user messages;

in response to that a plurality of continuous and repeated session messages identical to one another are included in the session message set, obtain a target session message derived from the plurality of continuous and repeated session messages; and replace the plurality of continuous and repeated session messages in the session message set with the target session message, and display the target session message in the session interface of the target session with a numerical value of a number of messages and a list of identifiers for senders of the plurality of continuous and repeated session messages in a displayed label for the target session message.

17. The message display terminal of claim 16, wherein to obtain the target session message derived from the plurality of continuous and repeated session messages comprises:

to select a reference session message from the plurality of continuous and repeated session messages;

to fold remaining session messages other than the reference session message in the plurality of continuous and repeated session messages to obtain a first folding prompt; and to form the target session message by using the reference session message and the first folding prompt.

18. The message display terminal of claim 16, wherein:
the target session message comprises an image message;
the image message comprises a message generated according to the plurality of continuous and repeated session messages and an image matching message content of the plurality of continuous and repeated session messages; and to obtain the target session message according to the plurality of continuous and repeated session messages comprises:

to obtain a message presentation template matching the message content of the plurality of continuous and repeated session messages, the message presentation template comprising a top region, a middle region, and a bottom region, and an image matching the message content being displayed in each region; and to fill the plurality of continuous and repeated session messages into the middle region of the message presentation template, to obtain an image message; and adding the image message to the target session message.

19. The message display terminal according to claim 16, the processor is further configured to execute the computer instructions to:

in response to that a selection trigger event for a displayed session message in the session interface is detected, output a message option of each displayed session message in the session interface, the message option being used for selecting the displayed session message;

use a displayed session messages corresponding to a selected message option as a folded session message according to a selection operation for the message option in the session interface; and create, in response to that a selection completion event is detected, a folded message according to the folded session message, and replacing the folded session message with the folded message in the session interface for display.

* * * * *